(12) United States Patent
Alshina et al.

(10) Patent No.: US 10,034,008 B2
(45) Date of Patent: Jul. 24, 2018

(54) METHOD AND APPARATUS FOR SCALABLE VIDEO ENCODING USING SWITCHABLE DE-NOISING FILTERING, AND METHOD AND APPARATUS FOR SCALABLE VIDEO DECODING USING SWITCHABLE DE-NOISING FILTERING

(71) Applicant: SAMSUNG ELECTRONICS CO., LTD., Suwon-si (KR)

(72) Inventors: Elena Alshina, Suwon-si (KR); Alexander Alshin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 344 days.

(21) Appl. No.: 14/773,588

(22) PCT Filed: Mar. 6, 2014

(86) PCT No.: PCT/KR2014/001857
§ 371 (c)(1),
(2) Date: Sep. 8, 2015

(87) PCT Pub. No.: WO2014/137175
PCT Pub. Date: Sep. 12, 2014

(65) Prior Publication Data
US 2016/0050423 A1 Feb. 18, 2016

Related U.S. Application Data

(60) Provisional application No. 61/773,262, filed on Mar. 6, 2013.

(51) Int. Cl.
*H04N 19/87* (2014.01)
*H04N 19/117* (2014.01)
(Continued)

(52) U.S. Cl.
CPC ......... *H04N 19/187* (2014.11); *H04N 19/117* (2014.11); *H04N 19/154* (2014.11);
(Continued)

(58) Field of Classification Search
CPC .. H04N 19/187; H04N 19/117; H04N 19/154; H04N 19/30; H04N 19/503; H04N 19/82; H04N 19/86
(Continued)

(56) References Cited

U.S. PATENT DOCUMENTS 7,864,219 B2   1/2011  Shimauchi
9,854,259 B2 *  12/2017  Rapaka .................. H04N 19/30
(Continued)

FOREIGN PATENT DOCUMENTS

| JP | 2008-22530 A | 1/2008 |
|---|---|---|
| WO | 2013/002579 A2 | 1/2013 |
| WO | 2013/009716 A2 | 1/2013 |

OTHER PUBLICATIONS

Communication dated Jun. 17, 2014 issued by the Int. Searching Authority in counterpart Application No. PCT/KR2014/001857 (PCT/ISA/210).
(Continued)

*Primary Examiner* — William C Vaughn, Jr.
*Assistant Examiner* — Jae N Noh
(74) *Attorney, Agent, or Firm* — Sughrue Mion, PLLC

(57) ABSTRACT

Provided are scalable video encoding and decoding methods by using a de-noise filtering. The scalable video decoding method includes generating reconstructed base layer images from a base layer image stream; determining a reference picture list including at least one of a de-noise reconstructed base layer image obtained from an enhancement layer image stream and one of the reconstructed base layer images that corresponds to a current enhancement layer image; and
(Continued)

reconstructing the current enhancement layer image based on a reference image that is included on the reference picture list.

15 Claims, 28 Drawing Sheets

(51) Int. Cl.
    *H04N 19/86*     (2014.01)
    *H04N 19/187*     (2014.01)
    *H04N 19/503*     (2014.01)
    *H04N 19/30*     (2014.01)
    *H04N 19/154*     (2014.01)
    *H04N 19/82*     (2014.01)

(52) U.S. Cl.
    CPC ........... *H04N 19/30* (2014.11); *H04N 19/503* (2014.11); *H04N 19/82* (2014.11); *H04N 19/86* (2014.11)

(58) Field of Classification Search
    USPC .................................................. 375/240.12
    See application file for complete search history.

(56) References Cited

U.S. PATENT DOCUMENTS

| | | | |
|---|---|---|---|
| 2004/0017852 A1* | 1/2004 | Garrido ................ | H04N 7/0125 375/240.16 |
| 2004/0228535 A1* | 11/2004 | Honda ................... | H04N 19/30 382/233 |
| 2012/0033040 A1 | 2/2012 | Pahalawatta et al. | |
| 2012/0050457 A1 | 3/2012 | Gu | |
| 2012/0213276 A1 | 8/2012 | Hagai et al. | |
| 2014/0010294 A1* | 1/2014 | Ye ......................... | H04N 19/70 375/240.12 |
| 2015/0189314 A1 | 7/2015 | Alshina | |

OTHER PUBLICATIONS

Communication dated Jun. 17, 2014 issued by the Int. Searching Authority in counterpart Application No. PCT/KR2014/001857 (PCT/ISA/237).

* cited by examiner

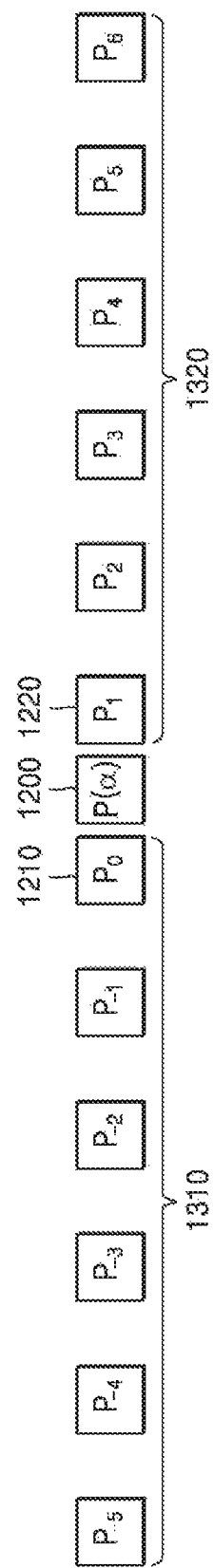

| NUMBER OF TAPS | FILTER COEFFICIENTS |
|---|---|
| 5 | {0, −4, 13, 46, 13, −4, 0, 0}/64 |
|  | {0, −4, 14, 44, 14, −4, 0, 0}/64 = {0, −2, 7, 22, 7, −2, 0, 0}/32 |
|  | {0, −4, 12, 48, 12, −4, 0, 0}/64 = {0, −1, 3, 12, 3, −1, 0, 0}/16 |
| 7 | {1, −5, 11, 50, 11, −5, 1, 0} |
| 7 | {1, −5, 10, 52, 10, −5, 1, 0} |
| 5 | {0, −3, 8, 54, 8, −3, 0, 0} |
| 5 | {0, −1, 3, 60, 3, −1, 0, 0} |

FIG. 12

```
coding_unit( x0, y0, log2CbSize ) {
    if( transquant_bypass_enable_flag )
        cu_transquant_bypass_flag
    if( slice_type != I )
        cu_skip_flag[ x0 ][ y0 ]
    nCbS = ( 1 << log2CbSize )
    if( cu_skip_flag[ x0 ][ y0 ] )
        prediction_unit( x0, y0, nCbS, nCbS )
    else {
        if( nuh_layer_id > 0 && InterLayerTextureRlEnableFlag) {
            texture_rl_flag[ x0 ][ y0 ]
            if( texture_rl_flag[ x0 ][ y0 ] && nPicWRL == nPicW && nPicHRL == nPicH
                && deltaQP > deltaQPThr ) {
                denosing_flt_flag[ x0 ][ y0 ]
            }
        }
        if( ! texture_rl_flag[ x0 ][ y0 ] ) {
            if( slice_type != I )
                pred_mode_flag
            if( PredMode[ x0 ][ y0 ] != MODE_INTRA || log2CbSize ==
Log2MinCbSizeY )
                part_mode
            if( PredMode[ x0 ][ y0 ] == MODE_INTRA ) {
                ....
            } else {
                if( PartMode == PART_2Nx2N )
                    prediction_unit( x0, y0, nCbS, nCbS )
                ....
            }
            if( !pcm_flag[ x0 ][ y0 ] ) {
                ....
                if( !no_residual_syntax_flag ) {
                    MaxTrafoDepth = ( PredMode[ x0 ][ y0 ] == MODE_INTRA ?
                        max_transform_hierarchy_depth_intra + IntraSplitFlag
                        max_transform_hierarchy_depth_inter )
                    transform_tree( x0, y0 x0, y0, log2CbSize, 0, 0 )
                }
            }
        }
    }
}
```

121

123 { (brace around the texture_rl_flag condition block)

125 — denosing_flt_flag[ x0 ][ y0 ]

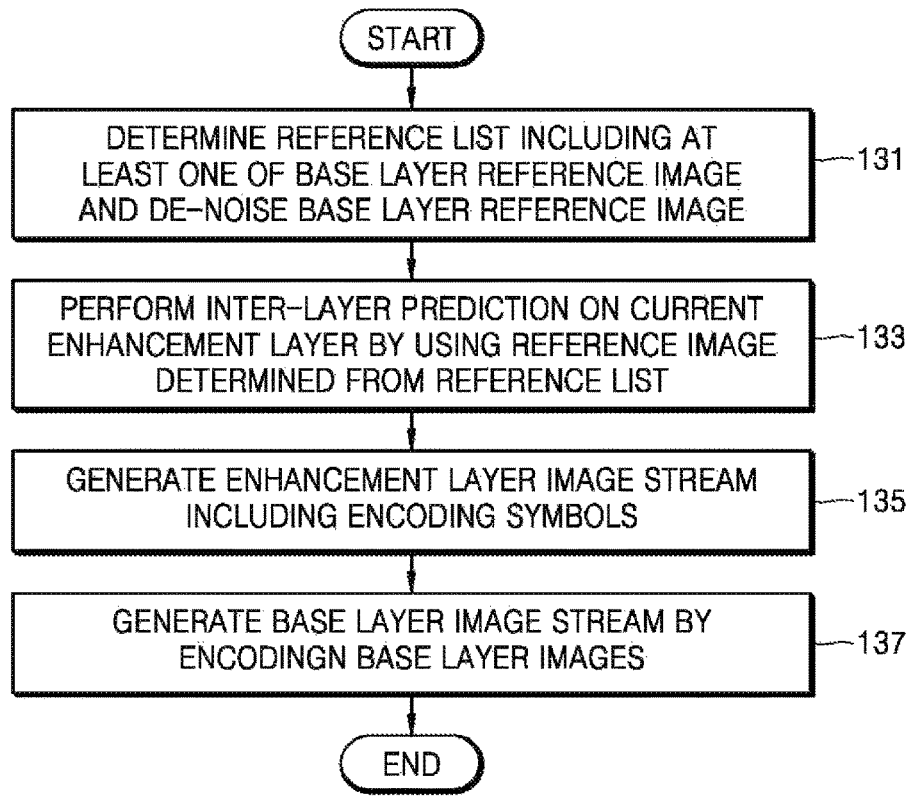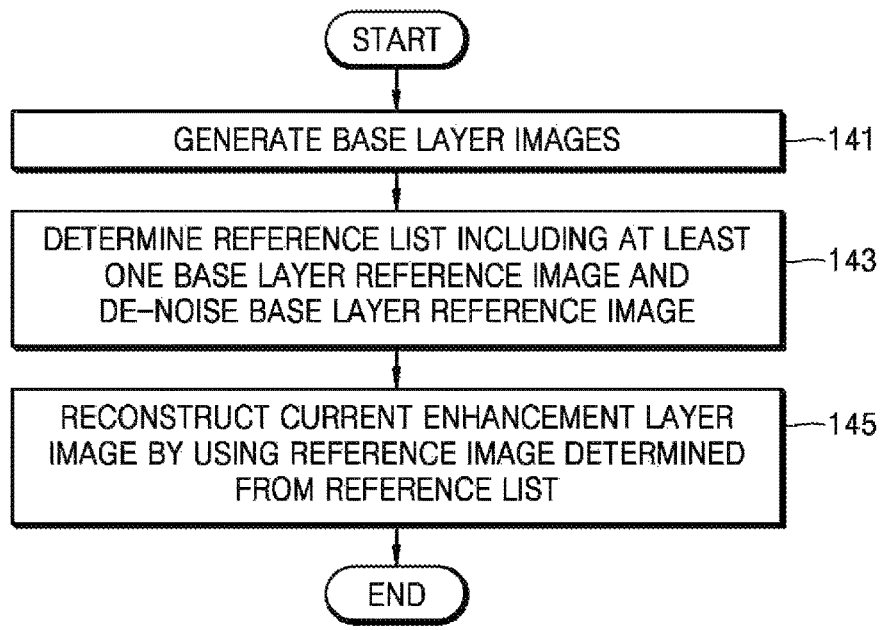

FIG. 21
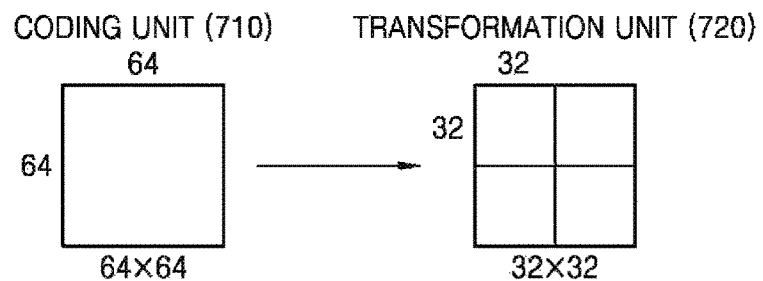
FIG. 22
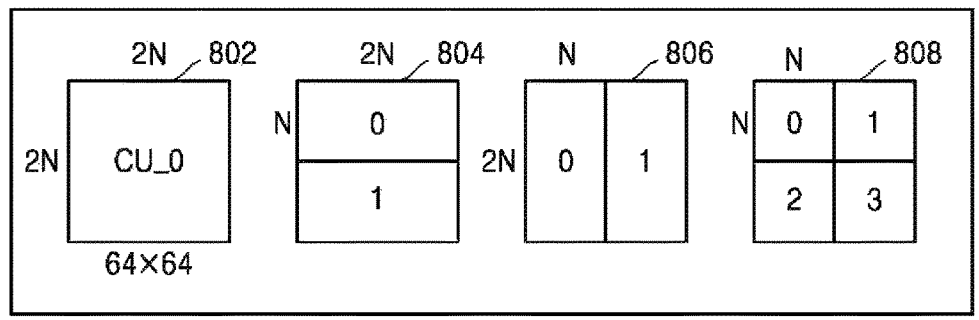
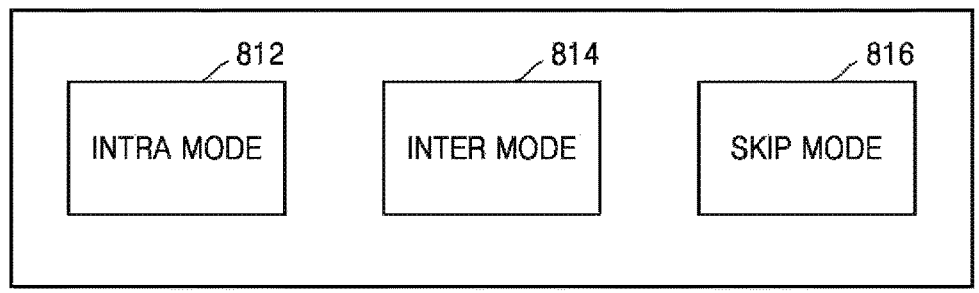
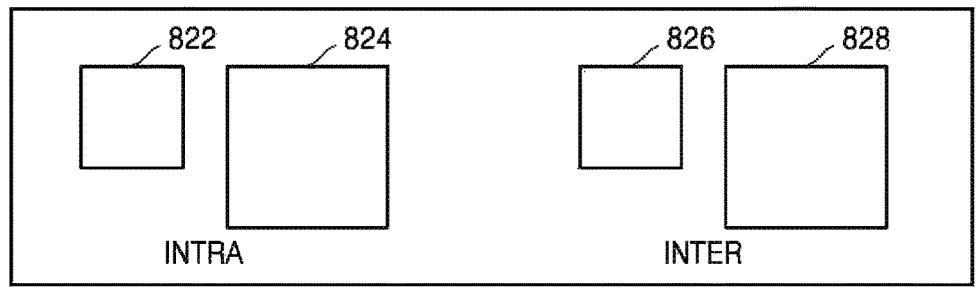

CODING UNIT (1010)

PREDICTION UNIT (1060)

METHOD AND APPARATUS FOR SCALABLE VIDEO ENCODING USING SWITCHABLE DE-NOISING FILTERING, AND METHOD AND APPARATUS FOR SCALABLE VIDEO DECODING USING SWITCHABLE DE-NOISING FILTERING

CROSS-REFERENCE TO RELATED APPLICATIONS

This application is a U.S. national stage application under 35 USC 371 of International Application No. PCT/KR2014/001857, filed on Mar. 6, 2014, in the Korean Intellectual Property Office, which claims priority from U.S. Provisional Application No. 61/773,262 filed on Mar. 6, 2013, in the U.S. Patent and Trademark Office, the disclosures of which are incorporated herein by reference in their entireties.

BACKGROUND

1. Field

Apparatuses and methods consistent with exemplary embodiments relate to a scalable video encoding and decoding, and more particularly, to a scalable video encoding and decoding to determine whether to perform a de-noise filtering selectively on reference layer images when performing an inter-layer prediction.

2. Description of Related Art

As hardware for reproducing and storing high resolution or high quality video content is being developed and supplied, a need for a video codec for effectively encoding or decoding the high resolution or high quality video content is increasing. According to a related art video codec, a video is encoded according to a limited encoding method based on a macroblock having a predetermined size.

Image data of a spatial region is transformed into coefficients of a frequency domain via frequency transformation. According to a video codec, an image is split into blocks having a predetermined size, discrete cosine transformation (DCT) is performed for each respective block, and frequency coefficients are encoded in block units, for rapid calculation for frequency transformation. Compared with image data of a spatial domain, coefficients of a frequency region are easily compressed. In particular, since an image pixel value of a spatial region is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

A multi-layer video codec encodes and decodes a base layer video and at least one enhancement layer video. Amounts of data of the base layer video and the enhancement layer video may be reduced by removing temporal/spatial redundancy respectively from the base layer video and the enhancement layer video. The base layer video may only be decoded or both the base layer video and the enhancement layer video may be encoded, according to a reproduction capability at a receiving end.

SUMMARY

One or more exemplary embodiments provide a scalable video encoding method and apparatus for performing selective de-noise filtering with respect to a reference layer image used to perform an inter layer prediction.

Further, one or more exemplary embodiments provide a scalable video decoding method and apparatus for determining whether to perform a de-noise filtering with respect to a reference layer image by using information representing whether to perform a de-noise filtering selectively.

According to an aspect of an exemplary embodiment, there is provided a scalable video decoding method including: generating reconstructed base layer images from a base layer image stream; determining a reference picture list including at least one of a de-noise reconstructed base layer image obtained from an enhancement layer image stream and one of the reconstructed base layer images that corresponds to a current enhancement layer image; and reconstructing the current enhancement layer image based on a reference image that is included on the reference picture list.

The determining the reference picture list may includes obtaining, from the enhancement layer image stream, an inter-layer de-noise filtering parameter that indicates whether to perform a de-noise filtering on the reconstructed base layer image to perform an inter-layer prediction of the current enhancement layer image, the reference picture list including the de-noise reconstructed base layer image in response to the de-noise filtering being performed on the reconstructed base layer image based on the inter-layer de-noise filtering parameter.

The obtaining the inter-layer de-noise filtering parameter comprises determining whether the inter-layer de-noise filtering parameter is obtained from each of blocks in the current enhancement layer image or from a syntax associated with at least one data unit selected from a picture, a slice segment, a maximum coding unit, a coding unit, and a prediction unit.

The determining whether the inter-layer de-noise filtering parameter is obtained may include obtaining the inter-layer de-noise filtering parameter from the enhancement layer image stream in response to a resolution of the enhancement layer image being equal to a resolution of the reconstructed base layer image.

The obtaining the inter-layer de-noise filtering parameter may include obtaining the inter-layer de-noise filtering parameter from the enhancement layer image stream in response to a difference between a quantization parameter for a current block of the current enhancement layer image and a quantization parameter of a reference block of the reconstructed base layer image being greater than a predetermined threshold value.

The de-noise filtering is performed based on a 4-bit accuracy filter having filter coefficients of $\{0, -4, 12, 48, 12, -4, 0, 0\}/64$ or $\{0, -1, 3, 12, 3, -1, 0, 0\}/16$.

According to an aspect of another exemplary embodiment, there is provided a scalable video encoding method including: determining a reference picture list including at least one of a reconstructed base layer image corresponding to a current enhancement layer image and a de-noise reconstructed base layer image; performing an inter-layer prediction on the current enhancement layer image based on a reference image included on the reference picture list; and generating an enhancement layer image stream including encoding symbols that are generated via the inter-layer prediction.

The determining the reference picture list may include adding, to the reference picture list, the de-noise reconstructed base layer image that is obtained in response to performing a de-noise filtering on the reconstructed base layer image, and the generating the enhancement layer image stream comprises generating the enhancement layer image stream including an inter-layer de-noise filtering parameter that indicates whether the de-noise filtering has been performed on the reconstructed base layer image.

The determining the reference picture list may include determining whether to perform the de-noise filtering on each of blocks in the current enhancement layer image, and the generating the enhancement layer image stream may include determining whether to generate the inter-layer de-noise filtering parameter for each block of the current enhancement layer image. The inter-layer de-noise filtering parameter may be included in a syntax associated with at least one data unit selected from a picture, a slice segment, a maximum coding unit, a coding unit, and a prediction unit.

The determining whether to perform the de-noise filtering may include performing the de-noise filtering on the reconstructed base layer image in response to a resolution of an enhancement layer image being equal to a resolution of the reconstructed base layer image. The determining whether to generate the inter-layer de-noise filtering parameter may include generating the enhancement layer image stream including the inter-layer de-noise filtering parameter in response to the resolution of the enhancement layer image being equal to the resolution of the reconstructed base layer image.

The determining whether to perform the de-noise filtering may include performing the de-noise filtering on the reconstructed base layer imagein response to a difference between a quantization parameter for a current block of the current enhancement layer image and a quantization parameter of a reference block of the reconstructed base layer image being greater than a predetermined threshold value. The determining whether to generate the inter-layer de-noise filtering parameter may include generating the enhancement layer image stream including the inter-layer de-noise filtering parameter in response to the difference between the quantization parameters being greater than the predetermined threshold value.

According to an aspect of another exemplary embodiment, there is provided a scalable video decoding apparatus including: a base layer decoder configured to generate reconstructed base layer images from a base layer image stream; and an enhancement layer decoder configured to determine a reference picture list including at least one of a de-noise reconstructed base layer image obtained from an enhancement layer image stream and one of the reconstructed base layer images that corresponds to a current enhancement layer image, and reconstruct the current enhancement layer image based on a reference image included on the reference picture list.

According to an aspect of another exemplary embodiment, there is provided a scalable video encoding apparatus including: a base layer encoder configured to generate a reconstructed base layer image corresponding to a current enhancement layer image; and an enhancement layer encoder configured to determine a reference picture list including at least one of the reconstructed base layer image and a de-noise reconstructed base layer image, and generate an enhancement layer image stream including encoding symbols, the encoding symbols being generated via an inter-layer prediction performed on the current enhancement layer image based on a reference image that is included on the reference picture list.

According to an aspect of another exemplary embodiment, there is provided a non-transitory computer readable storage medium storing a program executable by a computer to perform the scalable video decoding method.

According to an aspect of another exemplary embodiment, there is provided a non-transitory computer readable storage medium storing a program executable by a computer to perform the scalable video encoding method.

According to an aspect of another exemplary embodiment, there is provided a scalable video decoding method including: generating from a base layer image stream a reconstructed base layer image that corresponds to a current enhancement layer image; upsampling the reconstructed base layer image in response to a resolution of the reconstructed base layer image being different from a resolution of the enhancement layer image; applying a de-noise filter to the reconstructed base layer image in response to the resolution of the reconstructed base layer image being equal to the resolution of an enhancement layer image; and reconstructing the current enhancement layer image based on a reference image that corresponds to the upsampled base layer image or the de-noise filtered base layer image.

The scalable video decoding method may further include applying an interpolation filter to the reconstructed base layer image based on an interpolation location of each sub-pet unit of the reconstructed base layer image.

When an enhancement layer image is encoded according to an inter-layer prediction structure, a parameter indicating whether to perform a de-noise filtering on a reference layer image is used as an encoding symbol to perform an inter-layer prediction by using a de-noise reference layer image, thereby improving a scalable video encoding efficiency.

When an enhancement layer image is decoded according to an inter-layer prediction structure, a parameter indicating whether to perform a de-noise filtering on a reference layer image is obtained, and the enhancement layer image may be reconstructed by using a reference picture list including a de-noise reference layer image.

BRIEF DESCRIPTION OF THE DRAWINGS

The above and/or other aspects will be more apparent by describing exemplary embodiments, with reference to the accompanying drawings, in which:

FIG. 8 is a diagram illustrating integer-pel-unit pixel groups to be referred to so as to determine a sub-pel-unit pixel value, according to an exemplary embodiment;

FIG. 12 is a diagram showing a syntax including a de-noise filtering parameter, according to an exemplary embodiment;

FIG. 13 is a flowchart illustrating a scalable video encoding method according to one or more exemplary embodiments;

FIG. 14 is a flowchart illustrating a scalable video decoding method according to one or more exemplary embodiments;

FIG. 21 is a diagram for describing a relationship between a coding unit and transformation units, according to one or more exemplary embodiments;

FIG. 22 is a diagram for describing encoding information of coding units corresponding to a coded depth, according to one or more exemplary embodiments;

DETAILED DESCRIPTION

Figure 1:
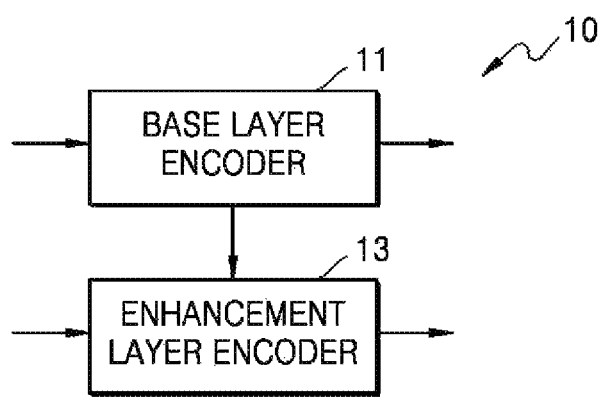
FIG. 1 is a block diagram of a scalable video encoding apparatus according to one or more exemplary embodiments.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

It will be understood that the terms "comprises" and/or "comprising" used herein specify the presence of stated features or components, but do not preclude the presence or addition of one or more other features or components. In addition, the terms such as "unit", "-er (-or)", and "module" described in the specification refer to an element for performing at least one function or operation, and may be implemented in hardware, software, or the combination of hardware and software.

Hereinafter, a scalable video encoding apparatus, a scalable video decoding apparatus, a scalable video encoding method, and a scalable video decoding method according to one or more exemplary embodiments will be described with reference to FIGS. 1 to 8, 9A, 9B, 10A, 10B, 11A, 11B, and 12 to 14. In addition, a video encoding apparatus, a video decoding apparatus, a video encoding method, and a video decoding method based on coding units having a tree structure according to one or more exemplary embodiments will be described with reference to FIGS. 15 to 27. Also, various exemplary embodiments to which a scalable video encoding method, a scalable video decoding method, a video encoding method, and a video decoding method according to the exemplary embodiments with reference to FIGS. 1 to 8, 9A, 9B, 10A, 10B, 11A, 11B, and 12 to 27 are applicable will be described with reference to FIGS. 28 to 34.

Hereinafter, an 'image' may denote a still image or a moving image of a video, or a video itself.

Hereinafter, a 'sample' denotes data assigned to a sampling location of an image, wherein the data is a processing target. For example, pixels of an image in a spatial domain may be samples.

Hereinafter, a 'symbol' denotes a value of each syntax, wherein the value is determined by performing an encoding with respect to an image. Bit strings that are generated by performing an entropy encoding with respect to symbols are continuously output to generate a bitstream. Bit strings that are parsed from a bitstream are entropy decoded to reconstruct symbols, and a decoding may be performed by using the symbols to reconstruct images.

First, a scalable video encoding apparatus and a scalable video encoding method, and a scalable video decoding apparatus and a scalable video decoding method will be described with reference to FIGS. 1 to 8, 9A, 9B, 10A, 10B, 11A, 11B, and 12 to 14.

FIG. 1 is a block diagram of a scalable video encoding apparatus 10 according to one or more exemplary embodiments.

The scalable video encoding apparatus 10 according to one or more exemplary embodiments includes a base layer encoder 11 and an enhancement layer encoder 13.

The scalable video encoding apparatus 10 according to one or more exemplary embodiments encodes a plurality of image sequences according to a scalable video coding method after classifying the image sequences in layer units, and may output a separate stream including data encoded by layer units. The scalable video encoding apparatus 10 may encode a base layer image sequence and an enhancement layer image sequence as different layers from each other.

The base layer encoder 11 may encode base layer images and output a base layer stream including data encoded from the base layer images.

The enhancement layer encoder 13 may encode enhancement layer images, and output an enhancement layer stream including data encoded from the enhancement layer images.

For example, according to a scalable video coding method based on spatial scalability, low resolution images may be encoded as base layer images, and high resolution images may be encoded as enhancement layer images. Encoding results of the base layer images may be output as a base layer stream, and encoding results of the enhancement layer images may be output as an enhancement layer stream. Images obtained by down-sampling the enhancement layer images may be encoded as base layer images.

As another example, according to a scalable video coding method based on a signal-noise-ratio (SNR) scalability, the base layer images and the enhancement layer images are same in resolutions and sizes and are different in a quantization parameter (QP) in encoding. When the QP is increased, a quantization section is increased, such that a quality of a reconstructed image deteriorates. The low resolution images having a relatively high QP applied thereto may be encoded as the base layer images, and the high resolution images having a relatively low QP applied thereto may be encoded as the enhancement layer images.

As another example, a multiview video may be encoded according to the scalable video coding method. Left-view images may be encoded as the base layer images, and right-view images may be encoded as the enhancement layer images. Alternatively, each of center-view images, left-view images, and right-view images may be encoded, and among these images, the center-view images may be encoded as the base layer images, the left-view images may be encoded as first enhancement-layer images, and the right-view images may be encoded as second enhancement-layer images.

As another example, the scalable video coding method may be performed according to temporal hierarchical prediction based on temporal scalability. A base layer stream including encoding information may be output. The encoding information may be generated by encoding images with a base frame rate. Additionally, images may be encoded with a high speed frame rate in reference to the images of the base frame rate, and an enhancement layer stream including encoding information about the high speed frame rate may be output.

The scalable video encoding apparatus 10 according to the one or more exemplary embodiments may perform inter prediction to predict a current image based on images of a single layer. Via the inter prediction, a motion vector indicating motion information between the current image and a reference image, and a residue component between the current image and the reference image may be generated.

Also, the scalable video encoding apparatus 10 may perform inter-layer prediction to predict enhancement layer images based on base layer images. Here, a current layer image on which the inter-layer prediction is performed may be an enhancement layer image, and a reference layer image that is used for the inter-layer prediction may be a base layer image. Via the inter-layer prediction, a location difference component between a reference image of another layer and the current image, and a residue component between the reference image of the other layer and the current image may be generated.

An inter-layer prediction structure will be described in detail with reference to FIG. 1.

The scalable video encoding apparatus 10 according to one or more exemplary embodiments may select at least one of a reconstructed base layer image and a reconstructed de-noise base layer image, as a reference layer image for inter layer prediction. The scalable video encoding apparatus 10 may select the reconstructed base layer image as the reference layer image, and may determine whether to perform a de-noise filtering on the reconstructed base layer image.

The scalable video encoding apparatus 10 according to one or more exemplary embodiments encodes each of blocks of each of images of a video according to layers. A type of a block may be a square, a rectangle, or a random geometric shape. A block is not limited to a data unit of a constant size. The block according to an exemplary embodiment may be a maximum coding unit, a coding unit, a prediction unit, a transformation unit, etc. from among coding units of a tree structure. A maximum coding unit including coding units of a tree structure may be variously called a coding block tree, a block tree, a root block tree, a coding tree, a coding root, or a tree trunk. Video encoding and decoding methods using the coding units of the tree structure will be described with reference to FIGS. 8, 9A, 9B, 10A, 10B, 11A, 11B, and 12 through 20.

The inter prediction and the inter-layer prediction may be performed by using a data unit of the coding unit, the prediction unit, or the transformation unit.

The base layer encoder 11 according to one or more exemplary embodiments may generate symbol data by performing source coding operations including the inter prediction or intra prediction on the base layer images. For example, the base layer encoder 11 may generate the symbol data by performing the inter prediction or intra prediction, transformation, and quantization on samples of a data unit of the base layer images, and may generate the base layer stream by performing entropy encoding on the symbol data.

The enhancement layer encoder 13 may encode the enhancement layer images, based on the coding units of the tree structure. The enhancement layer encoder 13 may generate symbol data by performing the inter/intra predictions, the transformation, and the quantization on samples of an encoding unit of an enhancement layer image, and may generate the enhancement layer stream by performing entropy encoding on the symbol data.

The enhancement layer encoder 13 according to one or more exemplary embodiments may perform inter-layer prediction to predict the enhancement layer image, by using a reconstructed sample of the base layer image. In order to encode an enhancement layer original image among the enhancement layer image sequence via the inter-layer prediction structure, the enhancement layer encoder 13 may generate an enhancement layer prediction image by using a reconstructed base layer image, and may encode a prediction error between the enhancement layer original image and the enhancement layer prediction image.

The enhancement layer encoder 13 may perform the inter-layer prediction on the enhancement layer image according to blocks such as the coding unit or the prediction unit. A block of the base layer image to be referred to by a block of the enhancement layer image may be determined.

A collocated picture that is located at the same point as an enhancement layer current image may be determined as a reference image. For example, a reconstructed image of a base layer image to which a same Picture Order Count (POC) as the enhancement layer image is applied may be determined as a reference image. Also, a block that is from among blocks of the reconstructed base layer image and is positioned while corresponding to a position of a current block in the enhancement layer image may be determined as a reference block. The enhancement layer encoder 13 may determine an enhancement layer prediction block by using a reconstructed base layer block corresponding to an enhancement layer block.

The enhancement layer encoder 13 may encode a current layer image sequence by using reconstructed base layer images via the inter-layer prediction structure. Also, the enhancement layer encoder 13 according to the one or more exemplary embodiments may encode the enhancement layer image sequence according to a single layer prediction structure, without using other layer samples. As another example, the enhancement layer encoder 13 may combine inter prediction and inter-layer prediction in a single layer.

The single layer prediction structure is an inter-prediction structure for predicting and encoding a current image by using at least one image that has been encoded and reconstructed before the current image in the enhancement layer. Therefore, descriptions about the single layer prediction structure are omitted in the present specification.

Hereinafter, an example in which the enhancement layer images are encoded by using the base layer images, according to inter-layer prediction will be described below.

For the inter-layer prediction structure according to the exemplary embodiment, a reconstructed base layer image that is a reference layer image is necessary. Therefore, the reference layer image that allows the enhancement layer encoder 13 to inter-layer predict the enhancement layer image, may be selected from among the reconstructed base layer images that are generated by the base layer encoder 11 by performing an inter prediction on the base layer images.

In addition, the inter-layer prediction may be performed by block unit. The base layer encoder 11 may reconstruct samples included in a current maximum coding unit by decoding samples that are encoded in each of coding units of tree structure of the base layer image through inverse-quantization, inverse-transformation, inter prediction, or motion compensation. A reconstructed image of a previous slice may be generated by performing encoding samples in the previous slice and then decoding on the encoded samples. In order to perform inter prediction on a current slice, a reconstructed image of the previous slice may be referred to.

The enhancement layer encoder 13 according to the exemplary embodiment may use the enhancement layer prediction block as a reference image for inter-layer prediction using an enhancement layer original block. The enhancement layer prediction block may be determined by using the reconstructed base layer block via the inter-layer prediction structure. The enhancement layer encoder 13 may encode an error between a sample value of the enhancement layer prediction block and a sample value of the enhancement layer original block by using the reconstructed base layer block, i.e., may encode a residue component according to the inter-layer prediction.

As spatial scalability, when resolution varies in a base layer image and an enhancement layer image, image sizes are also different. Therefore, in order to generate a reference layer image for the enhancement layer image, the enhancement layer encoder 13 may perform interpolation filtering to upsample a reconstructed base layer image to a resolution of the enhancement layer image. In general, an interpolation filtering may be also performed to determine a reference block according to a sub-pixel unit when an inter prediction is performed according to a sub-pixel unit.

According to the scalable video coding method based on SNR scalability, although resolutions and sizes of the base layer images and the enhancement layers are equal to each other, QPs are different and reconstructed base layer images have noise relatively more than in reconstructed enhancement layer images. Therefore, the enhancement layer encoder 13 may perform a de-noise filtering on a reconstructed base layer image for performing the inter-layer prediction that refers to the reconstructed base layer image.

A de-noise filter coefficient may be equal to an interpolation filter coefficient for the inter prediction.

However, it has to be noted that the de-noise filtering for the inter-layer prediction is not limited to the scalable video coding method based on the SNR scalability.

The enhancement layer encoder 13 according to one or more exemplary embodiments may perform at least one of an inter prediction that uses a reference image determined from among reconstructed images of a same layer and an inter-layer prediction that uses a reference image determined from among reconstructed reference layer images, in order to perform a prediction on a current enhancement layer image.

Therefore, the enhancement layer encoder 13 may determine a reference picture list for at least one of the inter prediction and the inter-layer prediction to perform a prediction on a current enhancement layer image.

A reference picture list for performing an inter prediction on a current enhancement layer image may include at least one of enhancement layer reference images that have been encoded and reconstructed earlier than the current image. An L0 list may priorly include reference index indicating reconstructed images of a forward direction from a current enhancement layer image, and an L1 list may priorly include reference index indicating reconstructed images in a backward direction. In a case of a mono-directional prediction mode, the reference image may be determined by using one of the L0 list and the L1 list. In a case of a bi-directional prediction mode, the reference image may be determined by using the L0 list and the L1 list.

When the enhancement layer encoder 13 performs an inter-layer prediction, a reference picture list may include a reference index indicating reconstructed reference layer images. Therefore, the enhancement layer encoder 13 may determine a reference picture list including at least one of a reconstructed base layer image corresponding to a current enhancement layer image and a reconstructed de-noise base layer image.

For example, in a case in which the inter prediction is performed only on the current enhancement layer, the reference picture list may include only enhancement layer reference images.

As another example, in a case in which the inter prediction and the inter-layer prediction are performed on the current enhancement layer image, the reference picture list may include reconstructed enhancement layer images and reconstructed base layer images.

In addition, in a case of performing the inter-layer prediction, images included in the reference picture list may vary depending on whether to perform a de-noise filtering.

According to the exemplary embodiment, when the inter-layer prediction accompanied with the de-noise filtering and the general inter prediction are performed on the current enhancement layer image, the reference picture list may include reconstructed enhancement layer images and reconstructed de-noise base layer images.

As another example, when the inter-layer prediction that is selectively accompanied with the de-noise filtering and a general inter prediction are performed on a current enhancement layer image, the reference picture list may include at least one of a reconstructed base layer image and a reconstructed de-noise base layer image, and a reconstructed enhancement layer image.

The enhancement layer encoder 13 may generate encoding symbols by performing the inter-layer prediction on the current enhancement layer image by using the reference image determined from the reference picture list.

The enhancement layer encoder 13 may generate an enhancement layer image stream including the encoding symbols generated through an encoding operations on the enhancement layer images, as well as the inter-layer prediction, and quantized transformation coefficients of a residue component.

The enhancement layer encoder 13 may generate an enhancement layer image stream including an inter-layer de-noise filtering parameter indicating whether a de-noise filtering is performed on a reconstructed base layer image. The inter-layer de-noise filtering parameter may be included in a syntax for at least one data unit from among a picture, a slice segment, a maximum coding unit, a coding unit, and a prediction unit.

The enhancement layer encoder 13 may determine whether to perform the de-noise filtering for the inter-layer prediction on each of the blocks in the current enhancement layer image. Accordingly, the enhancement layer encoder 13 may determine whether to generate an inter-layer de-noise filtering parameter for each block in the current enhancement layer image.

For example, the enhancement layer encoder 13 may perform a de-noise filtering on the reconstructed base layer image provided that resolutions of the enhancement layer image and the reconstructed base layer image are equal to each other. Therefore, the enhancement layer encoder 13 may add the inter-layer de-noise filtering parameter in the enhancement layer image stream, provided that the resolution of the enhancement layer image is equal to that of the reconstructed base layer image.

As another example, the enhancement layer encoder 13 may perform a de-noise filtering on a reconstructed base layer image, when a difference between a QP for a current block of a current enhancement layer image and a QP of a reference block in the reconstructed base layer image is greater than a predetermined threshold value. Therefore, the enhancement layer encoder 13 may add the inter-layer de-noise filtering parameter to the enhancement layer image stream when the difference between the QPs is greater than a predetermined threshold value.

As another example, the enhancement layer encoder 13 may determine whether to perform a de-noise filtering on a reconstructed base layer image, when resolutions of the enhancement layer image and the reconstructed base layer image are equal to each other and the difference between the QP for the current block of the current enhancement layer image and the QP of the reference block of the reconstructed base layer image is greater than a predetermined threshold value. An inter-layer de-noise filtering parameter indicating whether to perform the de-noise filtering may be included in the image stream.

The enhancement layer encoder 13 may generate an enhancement layer bitstream by performing an entropy encoding including a context-adaptive binary arithmetic coding (CABAC) on encoding symbols and quantized coefficients of a residue component.

The scalable video encoding apparatus 10 according to one or more exemplary embodiments may include a central processor that generally controls the base layer encoder 11 and the enhancement layer encoder 13. Alternatively, each of the base layer encoder 11 and the enhancement layer encoder 13 may be driven by its own processor, and the processors may interoperate with each other, so that the scalable video encoding apparatus 10 may operate. Alternatively, according to control by an external processor of the scalable video encoding apparatus 10, the base layer encoder 11 and the enhancement layer encoder 13 may be controlled.

The scalable video encoding apparatus 10 according to the exemplary embodiment may include one or more data storage units for storing input and output data of the base layer encoder 11 and the enhancement layer encoder 13. The scalable video encoding apparatus 10 may include a memory controller that manages an input and output of data of the one or more data storage units.

The scalable video encoding apparatus 10 according to the exemplary embodiment may interoperate with an internal video encoding processor that is internally embedded or an external video encoding processor to output a video encoding result, so that the scalable video encoding apparatus 10 may perform a video encoding operation including transformation. The internal video encoding processor of the scalable video encoding apparatus 10 according to the exemplary embodiment may perform, as a separate processor, a video encoding operation. Also, the scalable video encoding apparatus 10 may correspond to a case in which a central processing unit (CPU) or a graphical operational unit of the scalable video encoding apparatus 10 includes a video encoding processing module and thus performs a basic video encoding operation.

Therefore, the base layer encoder 11 of the scalable video encoding apparatus 10 may generate a base layer bitstream by encoding a base layer image sequence, and the enhancement layer decoder 13 may generate an enhancement layer bitstream by encoding an enhancement layer image sequence.

A scalable video decoding apparatus 20 that receives and decodes the base layer bitstream and the enhancement layer bitstream generated by the scalable video encoding apparatus 10 is described below with reference to FIG. 2.

Figure 2:
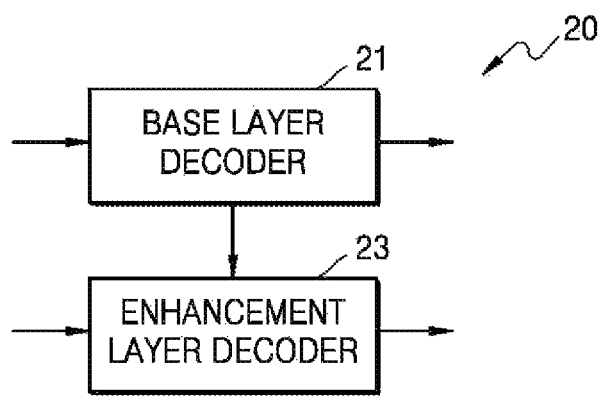
FIG. 2 is a block diagram of a scalable video decoding apparatus according to one or more exemplary embodiments.

FIG. 2 is a block diagram of a scalable video decoding apparatus 20, according to one or more exemplary embodiments.

The scalable video decoding apparatus 20 according to the one or more exemplary embodiments includes a base layer decoder 21 and an enhancement layer decoder 23.

The scalable video decoding apparatus 20 according to the one or more exemplary embodiments may receive bitstreams according to layers, based on a scalable encoding method. The number of layers of the bitstreams that the scalable video decoding apparatus 20 receives is not limited. However, for convenience of description, hereinafter, in an exemplary embodiment, the base layer decoder 21 of the scalable video decoding apparatus 20 is described as receiving and decoding a base layer stream, and the enhancement layer decoder 23 is described as receiving and decoding an enhancement layer stream.

For example, the scalable video decoding apparatus 20 based on spatial scalability may receive a stream in which image sequences having different resolutions are encoded to different layers. A low resolution image sequence may be reconstructed by decoding a base layer stream, and a high resolution image sequence may be reconstructed by decoding an enhancement layer stream.

As another example, the scalable video decoding apparatus 20 based on SNR scalability may receive an image bitstream in which a base layer and an enhancement layer are encoded by using different QPs. Low resolution images to which relatively high QP is applied may be decoded from a base layer bitstream, and high resolution images to which relatively low QP is applied may be decoded from an enhancement layer bitstream.

As another example, a multiview video may be decoded by using a scalable video coding method. When a stereoscopic video stream having a plurality of layers is received, left-view images may be reconstructed by decoding a base layer stream. By further decoding an enhancement layer stream in addition to the base layer stream, right-view images may be reconstructed.

Alternatively, when a multiview video stream having a plurality of layers is received, center-view images may be reconstructed by decoding a base layer stream. By further decoding a first enhancement layer stream in addition to the base layer stream, left-view images may be reconstructed. By further decoding a second enhancement layer stream in addition to the base layer stream, right-view images may be reconstructed.

As another example, a scalable video coding method based on temporal scalability may be performed. By decoding the base layer stream, images with a base frame rate may be reconstructed. By further decoding the enhancement layer stream in addition to the base layer stream, images with a high speed frame rate may be reconstructed.

The scalable video decoding apparatus 20 may obtain encoded data of the base layer images and the enhancement layer images from the base layer stream and the enhancement layer stream, and may further obtain a motion vector generated by inter prediction, and prediction information generated by inter-layer prediction.

For example, the scalable video decoding apparatus 20 may decode inter-predicted data of each of layers, and may decode data that is inter-layer predicted between a plurality of layers. The reconstruction may be performed by using motion compensation and inter-layer decoding, based on a coding unit or a prediction unit according to the exemplary embodiment.

Images of each layer stream may be reconstructed by performing motion compensation for a current image by referring to reconstructed images that are predicted via inter prediction using a same layer. The motion compensation means an operation of reconstructing a reconstructed image of the current image by synthesizing a reference image and a residue component of the current image, wherein the reference image is determined by using a motion vector of the current image.

Also, the scalable video decoding apparatus 20 according to the exemplary embodiment may perform the inter-layer decoding by referring to the base layer images, so as to reconstruct the enhancement layer image predicted via the inter-layer prediction. The inter-layer decoding means an operation of reconstructing a reconstructed image of the current image by synthesizing a reference image of another layer and the residue component of the current image, wherein the reference image is determined to predict the current image.

An inter-layer prediction structure will be described in detail with reference to FIG. 2.

The scalable video decoding apparatus 20 decodes each of blocks of each of images of a video. The block according to the exemplary embodiment may be a maximum coding unit, a coding unit, a prediction unit, a transformation unit, etc. from among coding units of a tree structure.

The base layer decoder 21 may decode the base layer image by using encoding symbols of a parsed base layer image. If the scalable video decoding apparatus 20 receives streams that are encoded based on the coding units of the tree structure, the base layer decoder 21 may perform decoding on each maximum coding unit of the base layer stream, based on the coding units of the tree structure.

The base layer decoder 21 may perform entropy decoding on each maximum coding unit, and thus may obtain encoding information and the encoded data. The base layer decoder 21 may perform inverse-quantization and inverse-transformation on the encoded data obtained from the stream, and thus may reconstruct a residue component. The base layer decoder 21 according to another exemplary embodiment may directly receive a bitstream of quantized transform coefficients. As a result of the inverse-quantization and the inverse-transformation that are performed on the quantized transform coefficients, a residue component of images may be reconstructed.

The base layer decoder 21 may reconstruct the base layer images by combining a prediction image and the residue component, via motion compensation on same layer images.

The enhancement layer decoder 23 may perform inter-layer prediction on the enhancement layer image according to blocks such as a coding unit or a prediction unit. A block of the base layer image which is to be referred to by a block of the enhancement layer image may be determined.

The scalable video decoding apparatus 20 according to one or more exemplary embodiments may select at least one of a reconstructed base layer image and a reconstructed de-noise base layer image, as a reference layer image for the inter-layer prediction. The scalable video decoding apparatus 20 may select the reconstructed base layer image as the reference layer image, and may determine whether to perform a de-noise filtering on the reconstructed base layer image.

The enhancement layer decoder 23 may determine a reconstructed block of a base layer image, which is located corresponding to a current block in a current enhancement layer image. The enhancement layer decoder 23 may determine a prediction block of an enhancement layer by using a reconstructed block of the base layer, corresponding to the enhancement layer block. For example, from among blocks of the reconstructed base layer image to which the POC that is the same as that applied to the enhancement layer image is applied, a collocated block positioned at the same locations as the enhancement layer block may be determined as the reference block.

In more detail, the base layer decoder 21 may reconstruct samples included in a current maximum coding unit by decoding encoded samples of each coding unit of a tree structure in the base layer image through inverse-quantization, inverse-transformation, intra prediction, or motion compensation. A reconstructed image of a previous slice may be generated by performing encoding samples in the previous slice and then decoding the encoded samples. In order to perform inter prediction on a current slice, a reconstructed image of the previous slice may be referred to. Thus, the reconstructed image of the previous slice may be used as a prediction image for a current slice.

According to the inter-layer prediction structure, the enhancement layer decoder 23 may generate an enhancement layer prediction image by using samples of the reconstructed base layer image. The enhancement layer decoder 23 may decode the enhancement layer stream, and may obtain a prediction error due to the inter-layer prediction. The enhancement layer decoder 23 may generate the reconstructed enhancement layer image by combining the enhancement layer prediction image with the prediction error.

As described above, the enhancement layer decoder 23 may reconstruct the enhancement layer images by referring to reconstructed base layer images via the inter-layer prediction structure. Alternatively, the enhancement layer decoder 23 according to the one or more exemplary embodiments may reconstruct the enhancement layer images via a single layer prediction structure, without referring to other layer samples. As another example, the enhancement layer decoder 23 may combine inter prediction (motion compensation) in a single layer and inter-layer prediction.

Hereinafter, an example in which the enhancement layer images are decoded by using the reconstructed base layer images according to inter-layer prediction will be described below.

The base layer decoder 21 may decode encoded symbols in each of coding units of a tree structure of a base layer image by performing inverse-quantization, inverse-transformation, inter prediction, or motion compensation, and thus may reconstruct samples included in a current maximum coding unit. A reconstructed image may be generated by performing decoding on a previous slice. In order to perform motion compensation on a current slice, a reconstructed image of the previous slice may be referred to.

The enhancement layer decoder 23 according to the exemplary embodiment may use the enhancement layer prediction block as a reference image for inter-layer prediction of an enhancement layer original block. The enhancement layer prediction block may be determined by using the reconstructed base layer block according to the inter-layer prediction structure. The enhancement layer decoder 23 may reconstruct the enhancement layer block by combining a reconstructed base layer image and a residue component obtained via the inter-layer prediction. The residue component may correspond to an error between a sample value of the enhancement layer prediction block and a sample value of the enhancement layer original block.

As spatial scalability, when resolution varies in a base layer image and an enhancement layer image, image sizes are also different. Therefore, in order to generate a reference layer image for the enhancement layer image, the enhancement layer decoder 23 may perform interpolation filtering to upsample a reconstructed base layer image to a resolution of the enhancement layer image. Also, when an inter prediction is performed by a sub-pixel unit, an interpolation filtering may be performed to determine a reference block according to sub-pixel unit.

As described above, for the inter-layer prediction structure, a reconstructed base layer image is required as the reference layer image. Thus, the enhancement layer decoder 23 may perform inter-layer prediction on a current enhancement layer image by using reconstructed base layer images. The reconstructed base layer images may be generated by the base layer decoder 21 in response to performing motion compensation on base layer images.

The enhancement layer decoder 23 may determine a reference layer image from among reconstructed base layer images to perform inter-layer prediction on the enhancement layer image. For example, the enhancement layer decoder 23 may obtain a residue component for inter-layer prediction of the enhancement layer image and a reference index representing a reference layer image. The reference layer image may be determined from among the reconstructed base layer images based on the reference index.

For example, an upsampled reference layer image may be generated by performing an IL interpolation filtering on the reference layer image, when resolutions of the reference layer image and the enhancement layer image are different from each other.

As another example, when the reference layer image and the enhancement layer image have the same resolution as each other, the enhancement layer decoder 23 may perform a de-noise filtering on the reconstructed base layer image to perform the inter-layer prediction based on the reconstructed base layer image. In general, the reference layer image and the enhancement layer image have the same resolution as each other during a scalable video coding based on SNR scalability. However, it has to be noted that the de-noise filtering for the inter-layer prediction is not limited to the scalable video coding method based on the SNR scalability.

In order to perform prediction on a current enhancement layer image, the enhancement layer decoder 23 according to one or more exemplary embodiments may perform at least one of the inter prediction using the reference image determined from among reconstructed images of the same layer and the inter-layer prediction using the reference image determined from among the reconstructed reference layer images.

Therefore, the enhancement layer decoder 23 may determine a reference picture list for at least one of the inter prediction and the inter-layer prediction, in order to perform the prediction on the current enhancement layer image.

For the inter prediction on the current enhancement layer image, the reference picture list may include at least one of enhancement layer reference images that have been encoded and reconstructed prior to the current image. In a mono-directional prediction mode, the reference image may be determined by using one of an L0 list and an L1 list. In a bi-directional prediction mode, the reference image may be determined by using the L0 list and the L1 list.

When the enhancement layer decoder 23 performs the inter-layer prediction, the reference picture list may include a reference index indicating a reconstructed reference layer image. Therefore, the enhancement layer decoder 23 may determine the reference picture list including at least one of a reconstructed base layer image corresponding to the current enhancement layer and a reconstructed de-noise base layer image.

For example, if the inter prediction is performed only on the current enhancement layer image, the reference picture list may include only the enhancement layer reference image.

As another example, when the inter prediction and the inter-layer prediction are performed on the current enhancement layer image, the reference picture list may include a reconstructed enhancement layer image and a reconstructed base layer image.

According to the exemplary embodiment, when the inter-layer prediction accompanied with de-noise filtering and a general inter prediction are performed on a current enhancement layer image, the reference picture list may include a reconstructed enhancement layer image and a reconstructed de-noise base layer image.

As another example, when the inter-layer prediction selectively accompanied with de-noise filtering and a general inter prediction are performed on a current enhancement layer image, the reference picture list may include at least one of a reconstructed base layer image and a reconstructed de-noise base layer image, and a reconstructed enhancement layer image.

The enhancement layer decoder 23 may obtain, from an enhancement layer image stream, encoding symbols and quantized transformation coefficients of a residue component. The encoding symbols may be generated by encoding operations on enhancement layer images, as well as the inter-layer prediction.

The enhancement layer decoder 23 determines a reference block by using the reference image determined from the reference picture list, and may restore an enhancement layer current block by synthesizing the reference block and the residue component.

The enhancement layer decoder 23 may obtain an inter-layer de-noise filtering parameter indicating whether the de-noise filtering is performed on the reconstructed base layer image, from the enhancement layer image stream. The inter-layer de-noise filtering parameter may be obtained from a syntax for at least one data unit of a picture, a slice segment, a maximum coding unit, an encoding unit, and a prediction unit.

For example, the enhancement layer decoder 23 may obtain the inter-layer de-noise filtering parameter for each of the blocks in the current enhancement layer image. The enhancement layer decoder 23 may determine whether to perform de-noise filtering when performing the inter-layer prediction on the current block, based on the de-noise filtering parameter in each of the blocks of the current enhancement layer image.

For example, the enhancement layer decoder 23 may obtain the inter-layer de-noise filtering parameter from the enhancement layer image stream, provided that a resolution of the enhancement layer image is equal to that of a reconstructed base layer image. Therefore, the enhancement layer decoder 23 may determine whether to perform the de-noise filtering on the reconstructed base layer image based on the inter-layer de-noise filtering parameter, if the resolution of the enhancement layer image is equal to that of the reconstructed base layer image.

As another example, the enhancement layer decoder 23 may obtain the inter-layer de-noise filtering parameter from the enhancement layer image stream, if a difference between a QP for the current block of the current enhancement layer image and a QP of a reference block in the reconstructed base layer image is greater than a predetermined threshold value. The enhancement layer decoder 23 may determine whether to perform the de-noise filtering on the reconstructed base layer image based on the inter-layer de-noise filtering parameter, if the difference between the QP for the current block of the current enhancement layer image and the QP of the reference block of the reconstructed base layer image is greater than a predetermined threshold value.

As another example, the enhancement layer decoder 23 may determine whether to perform the de-noise filtering on the reconstructed base layer image based on the inter-layer de-noise filtering parameter, if the resolution of the enhancement layer image is equal to that of the reconstructed base layer image and the difference between the QP for the current block of the current enhancement layer image and the QP of the reference block in the reconstructed base layer image is greater than the predetermined threshold value.

Therefore, the enhancement layer decoder 23 may reconstruct the enhancement layer block by synthesizing the reference block of the reference layer image with the residue component in each of the blocks. The enhancement layer image may be reconstructed by combining the residue component between the enhancement layer images with the reference layer image.

Therefore, the base layer decoder 21 of the scalable video decoding apparatus 20 may reconstruct a base layer image sequence by decoding a base layer stream, and the enhancement layer decoder 23 may reconstruct an enhancement layer image sequence by decoding an enhancement layer stream.

The scalable video decoding apparatus 20 according to one or more exemplary embodiments may include a central processor that generally controls the base layer decoder 21 and the enhancement layer decoder 23. Alternatively, each of the base layer decoder 21 and the enhancement layer decoder 23 may be driven by its own processor, and the processors may interoperate with each other, so that the scalable video decoding apparatus 20 may operate. Alternatively, according to control by an external processor of the scalable video decoding apparatus 20 according to the one or more exemplary embodiments, the base layer decoder 21 and the enhancement layer decoder 23 may be controlled.

The scalable video decoding apparatus 20 according to the one or more exemplary embodiments may include one or more data storage units that store input and output data of the base layer decoder 21 and the enhancement layer decoder 23. The scalable video decoding apparatus 20 may include a memory controller that manages an input and output of data of the one or more data storage units.

The scalable video decoding apparatus 20 according to the one or more exemplary embodiments may interoperate with an internal video decoding processor that is internally embedded or an external video decoding processor to reconstruct a video via video decoding, so that the scalable video decoding apparatus 20 may perform a video decoding operation including inverse-transformation. The internal video decoding processor of the scalable video decoding apparatus 20 according to the one or more exemplary embodiments may correspond to not only a separate processor but also may correspond to a case in which a CPU or a graphical operational unit of the scalable video decoding apparatus 20 includes a video decoding processing module and thus performs a basic video decoding operation.

According to the scalable video encoding apparatus 10 according to the one or more exemplary embodiments illustrated in FIG. 1, when the enhancement layer image is encoded according to the inter-layer prediction structure, a parameter indicating whether to perform the de-noise filtering on the reference layer image may be generated as an encoding symbol. The inter-layer prediction is performed by using the de-noise reference layer image, and accordingly, a scalable video encoding efficiency may be improved.

Likewise, in the scalable video decoding apparatus 20 according to the one or more exemplary embodiments illustrated with reference to FIG. 2, when the enhancement layer image is decoded according to the inter-layer prediction structure, a parameter indicating whether to perform the de-noise filtering on the reference layer image may be obtained as the encoding symbol. If the de-noise filtering is necessary by using the obtained parameter, the enhancement layer image may be reconstructed by using the reference picture list including the de-noise reference layer image.

Figure 3:
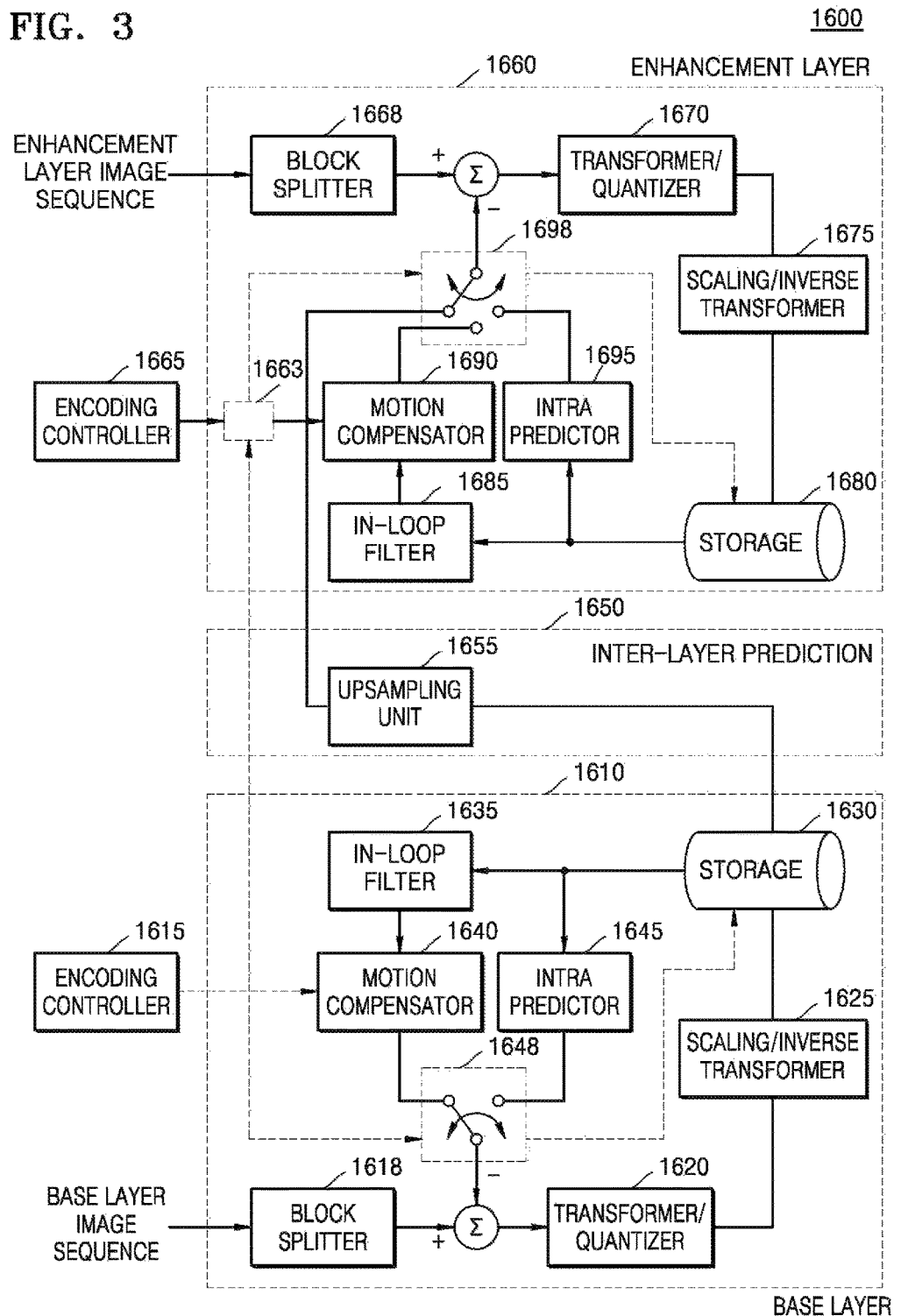
FIG. 3 is a diagram describing a detailed structure of the scalable video encoding apparatus according to one or more exemplary embodiments.

FIG. 3 illustrates in detail a structure of the scalable video encoding apparatus 10, according to one or more exemplary embodiments.

An inter-layer encoding system 1600 includes a base layer encoding terminal 1610, an enhancement layer encoding terminal 1660, and an inter-layer prediction terminal 1650 between the base layer encoding terminal 1610 and the enhancement layer encoding terminal 1660. The base layer encoding terminal 1610 and the enhancement layer encoding terminal 1660 may exhibit particular configurations of the base layer encoder 11 and the enhancement layer encoder 13, respectively.

The base layer encoding terminal 1610 receives an input of a base layer image sequence and encodes each image. The enhancement layer encoding terminal 1660 receives an input of a sequence of enhancement layer images and encodes each of the images. Overlapping operations between operations of the base layer encoding terminal 1610 and operations of the enhancement layer encoding terminal 1660 are simultaneously described below.

The block splitter 1618 or 1668 splits an input image (low resolution image or high resolution image) as maximum coding units, coding units, prediction units, transformation units, or the like. In order to encode the coding unit that is output from the block splitter 1618 or 1668, intra prediction or inter prediction may be performed with respect to each prediction unit of the coding unit. A prediction switch 1648 or 1698 may switch a prediction mode from an intra prediction mode to an inter prediction mode, or vice versa. In the inter prediction mode, the inter prediction may be performed with reference to a reconstructed previous image output from a motion compensator 1640 or 1690. In the intra prediction mode, the intra prediction may be performed by using a neighbouring prediction unit of a current prediction unit in a current input image output from an intra predictor 1645 or 1695. Residual information may be generated with respect to each prediction unit via the inter prediction.

A residue component between the prediction unit and a peripheral image is input to a transformer/quantizer 1620 or 1670, according to each prediction unit of the coding unit. The transformer/quantizer 1620 or 1670 may perform transformation and quantization with respect to each transformation unit, based on the transformation unit of the coding unit, and may output a quantized transformation coefficient.

A scaling/inverse transformer 1625 or 1675 may perform scaling and inverse-transformation on the quantized transformation coefficient, according to each transformation unit of the coding unit, and may generate a residue component of a spatial domain. When it is controlled to an inter mode due to the prediction switch 1648 or 1698, the residue component may be synthesized with the reconstructed previous image or the neighbouring prediction unit, so that a reconstructed image including the current prediction unit may be generated and a reconstructed current image may be stored in a storage 1630 or 1680. The reconstructed current image may be transferred to the intra predictor 1645 or 1695, or transferred to the motion compensator 1640 or 1690, according to a prediction mode of a prediction unit to be encoded subsequently.

In particular, during the inter mode, an in-loop filter 1635 or 1685 may perform at least one of deblocking filtering and Sample Adaptive Offset (SAO) filtering on the reconstructed image stored in the storage 1630 or 1680, according to each coding unit. At least one of the deblocking filtering and the SAO filtering may be performed on the coding unit and at least one of a prediction unit and a transformation unit included in the coding unit.

The deblocking filtering is filtering for smoothing a blocking phenomenon of a data unit, and the SAO filtering is filtering for compensating for a pixel value that has been corrupted while data is encoded and decoded. Data that is filtered by the in-loop filter 1635 or 1685 may be transferred to the motion compensator 1640 or 1690, according to each prediction unit. In order to encode a next coding unit output from the block splitter 1618 or 1668, a residue component between the reconstructed current image and the next coding unit may be generated. The reconstructed current image is output from the motion compensator 1640 or 1690 and the next coding unit is output from the block splitter 1618 or 1668.

In this manner, the aforementioned encoding procedure may be repeated with respect to each coding unit of the input image.

Also, for inter-layer prediction, the enhancement layer encoding terminal 1660 may refer to the reconstructed image stored in the storage 1630 of the base layer encoding terminal 1610. An encoding controller 1615 of the base layer encoding terminal 1610 may control the storage 1630 of the base layer encoding terminal 1610, and may transfer the reconstructed image of the base layer encoding terminal 1610 to the enhancement layer encoding terminal 1660. The transferred reconstructed base layer image may be used as a prediction image of the enhancement layer.

An in-loop filter (e.g., upsampling unit) 1655 of an inter-layer prediction terminal 1650 may upsample and transfer a reconstructed base layer image to the enhancement layer encoding terminal 1660, if resolutions of a base layer image and an enhancement layer image are different from each other. Therefore, the reconstructed base layer image that is upsampled may be used as a prediction image of the enhancement layer. If the resolutions of the base layer image and the enhancement layer image are equal to each other, the in-loop filter 1655 may perform a de-noise filtering on the reconstructed base layer image.

When the inter-layer prediction is performed in a manner that an encoding controller 1665 of the enhancement layer encoding terminal 1660 controls the switch 1698, the enhancement layer image may be predicted by referring to the reconstructed base layer image that is transferred via the inter-layer prediction terminal 1650.

In order to encode an image, various encoding modes for a coding unit, a prediction unit, and a transformation unit may be set. For example, as an encoding mode for the coding unit, a depth, split information (e.g., a split flag), or the like may be set. As an encoding mode for the prediction unit, a prediction mode, a partition type, intra direction information, reference picture list information, or the like may be set. As an encoding mode for the prediction unit, a transformation depth, split information or the like may be set.

The base layer encoding terminal 1610 may perform encoding by using each of various depths for the coding unit, each of various modes for the prediction unit, each of various partition types, each of various intra directions, each of various reference picture lists, and each of various transformation depths for the transformation unit. According to results of the performances, the base layer encoding terminal 1610 may determine an encoding depth, a prediction mode, a partition type, intra direction/reference list, a transformation depth, etc. that have the highest encoding efficiency. However, an encoding mode determined by the base layer encoding terminal 1610 is not limited to the aforementioned encoding modes.

The encoding controller 1615 of the base layer encoding terminal 1610 may control various encoding modes to be appropriately applied to operations of each configuring element. Also, for inter-layer encoding in the enhancement layer encoding terminal 1660, the encoding controller 1615 may control the enhancement layer encoding terminal 1660 to determine an encoding mode or a residue component by referring to the encoding results from the base layer encoding terminal 1610.

For example, the enhancement layer encoding terminal 1660 may use an encoding mode of the base layer encoding terminal 1610 as an encoding mode for the enhancement layer image, or may determine the encoding mode for the enhancement layer image by referring to the encoding mode of the base layer encoding terminal 1610. The encoding controller 1615 of the base layer encoding terminal 1610 may use a current encoding mode from the encoding mode of the base layer encoding terminal 1610 to determine a current encoding mode of the enhancement layer encoding terminal 1660 by controlling a control signal 1663 of the encoding controller 1665 of the enhancement layer encoding terminal 1660.

Similar to the inter-layer encoding system 1600 based on an inter-layer prediction technique shown in FIG. 3, an inter-layer decoding system based on the inter-layer prediction technique may be embodied. That is, the inter-layer decoding system may receive a base layer bitstream and an enhancement layer bitstream. A base layer decoding terminal of the inter-layer decoding system may decode the base layer bitstream and may reconstruct base layer images. An enhancement layer decoding terminal of the inter-layer decoding system for a multilayer video may decode the enhancement layer bitstream by using a reconstructed base layer image and parsed encoding information and may reconstruct enhancement layer images.

If the enhancement layer encoder 13 of the scalable video encoding apparatus 10 according to the one or more exemplary embodiments performs the inter-layer prediction, the enhancement layer decoder 23 of the scalable video decoding apparatus 20 may reconstruct the enhancement layer images, according to the above-described inter-layer decoding system.

Figure 4:
FIG. 4 is a diagram for describing an inter layer prediction process according to an exemplary embodiment.

FIG. 4 illustrates inter-layer prediction processes according to an exemplary embodiment.

In particular, the scalable video encoding apparatus 10 and the scalable video decoding apparatus 20 according to the exemplary embodiment may perform an inter-layer prediction on enhancement layer images by referring to a reconstructed base layer image 41. When noise is removed from the reconstructed base layer image 41 by performing a de-noise filtering 42 on the reconstructed base layer image 41, a prediction error between a current enhancement layer image and the reconstructed base layer image 41 that is de-noised may be reduced. Since an amount of data generated as a prediction result is reduced as the prediction error is reduced, an encoding efficiency of the inter-layer prediction 43 between the reconstructed base layer image 41 that is de-noised and the current enhancement layer image may be improved.

If the resolution of the enhancement layer image is different from that of the base layer image in the inter-layer decoding system, an upsampling filtering is necessary in order to generate a reference layer image for the enhancement layer image, as described above. An interpolation of a sub-pixel unit may be necessary according to a ratio between the resolutions of the both layers during the upsampling filtering, and a location of a sub-pixel according to an upsampling ratio may be determined by adjusting a phase difference of the filter coefficients.

Hereinafter, a method of determining an upsampling filter having a predetermined phase difference will be described below with reference to FIGS. 5 to 7.

Figure 5:
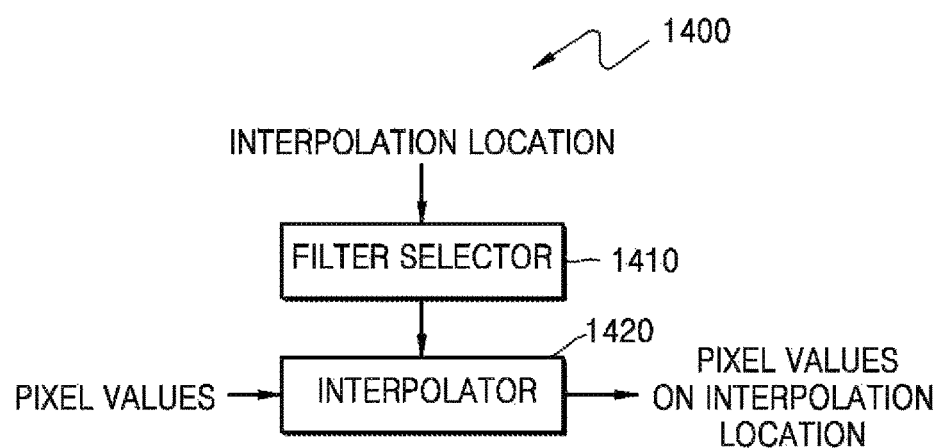
FIG. 5 is a block diagram of an image interpolation apparatus according to an exemplary embodiment.

FIG. 5 is a block diagram of an image interpolation apparatus 1400 according to an exemplary embodiment.

The image interpolation apparatus 1400 using a symmetric/asymmetric interpolation filter according to an exemplary embodiment may include a filter selector 1410 and an interpolator 1420. Operations of the filter selector 1410 and the interpolator 1420 of the image interpolation apparatus 1400 may be controlled by a video encoding processor, a CPU, a graphic processor, and the like.

The image interpolation apparatus 1400 according to the exemplary embodiment may receive an image and interpolate pixels of integer-pel-unit to generate pixel values of sub-pel unit. The input image may be a picture sequence, a picture, a frame, or blocks of a video.

The filter selector 1410 according to the exemplary embodiment may select an interpolation filter differently from an interpolation location of a sub-pel unit, from among interpolation filters for generating at least one pixel value of a sub-pel unit located between inter-pel units.

The interpolator 1420 according to the exemplary embodiment may interpolate inter-pel-unit pixels adjacent to an interpolation location of the sub-pel unit by using the selected interpolation filter to generate a pixel value of the sub-pel unit. The interpolation filtering on the integer-pel unit pixels for generating pixel values of the sub-pel unit may include an operation of performing an interpolation filtering on reference pixel value of the integer-pel unit, including the integer-pel unit pixels adjacent to the interpolation location of the sub-pel unit.

An interpolation filter according to the exemplary embodiment may include filter coefficients for transforming integer-pel-unit pixels based on a plurality of basis functions, and for inversely transforming a plurality of coefficients generated as a transformation result.

The interpolation filter according to the exemplary embodiment may be a one-dimensional filter or a two-dimensional filter. If the selected interpolation filter is a one-dimensional filter, the interpolator 1420 according to the exemplary embodiment may continuously perform filtering by using one-dimensional interpolation filters in two or more directions, thereby generating a current sub-pel-unit pixel value.

The filter selector 1410 according to the exemplary embodiment may individually select an interpolation filter according to the sub-pel-unit interpolation location, from among interpolation filters. The interpolation filters according to the exemplary embodiment may include symmetric interpolation filters including the same numbers of filter coefficients based on an interpolation location, and asymmetric interpolation filters including different numbers of filter coefficients based on the interpolation location. The filter selector 1410 may individually select a symmetric interpolation filter and an asymmetric interpolation filter according to the sub-pel-unit interpolation location.

The interpolation filters according to the exemplary embodiment may include asymmetric odd-number-tap interpolation filters including an odd number of filter coefficients, and symmetric even-number-tap interpolation filters including an even number of filter coefficients. The filter selector 1410 may individually select an asymmetric odd-number-tap interpolation filter and a symmetric even-number-tap interpolation filter according to the sub-pel-unit interpolation location. For example, a ½-pel-unit interpolation filter and a ¼-pel-unit interpolation filter may be individually and differently selected. Thus, an 8-tap interpolation filter, i.e., a symmetric even-number-tap interpolation filter, may be selected as the ½-pel-unit interpolation filter, and a 7-tap interpolation filter, i.e., an asymmetric odd-number-tap interpolation filter, may be selected as the ¼-pel-unit interpolation filter.

In order to interpolate integer-pel-unit pixels in a spatial domain, each interpolation filter according to the exemplary embodiment may include filter coefficients for performing transformation and inverse transformation by using a plurality of basis functions, and filter coefficients obtained by combining window filter coefficients for performing low pass filtering.

The asymmetric interpolation filter according to the exemplary embodiment may be generated by combining a filter for performing transformation and inverse transformation based on a plurality of basis functions, and an asymmetric window filter.

If an odd-number-tap interpolation filter is selected according to the exemplary embodiment, the interpolator 1420 may perform filtering on an odd number of integer-pel-unit pixels located with respect to an interpolation location, by using an odd number of filter coefficients of the odd-number-tap interpolation filter.

If an even-number-tap interpolation filter is selected according to the exemplary embodiment, the interpolator 1420 may perform filtering on an even number of integer-pel-unit pixels located with respect to an interpolation location, by using an even number of filter coefficients of the even-number-tap interpolation filter.

The odd-number-tap interpolation filter according to the exemplary embodiment may include different numbers of filter coefficients about an interpolation location and thus may be an asymmetric interpolation filter. The even-number-tap interpolation filter according to the exemplary embodiment may be a symmetric interpolation filter including the same numbers of filter coefficients about an interpolation location.

A smoothed interpolation filter according to the exemplary embodiment may include different filter coefficients according to its length as well as the sub-pel-unit interpolation location and its smoothness.

Also, the smoothed interpolation filters according to the exemplary embodiment may include different filter coefficients according to a scaling ratio as an interpolation result, as well as the sub-pel-unit interpolation location, its smoothness, and its length. The filter selector 1410 according to the exemplary embodiment may select a smoothed interpolation filter of which filter coefficients are increased to integers. The interpolator 1420 according to the exemplary embodiment regularizes pixel values generated by using the smoothed interpolation filter selected by the filter selector 1410.

Also, the filter selector 1410 according to the exemplary embodiment may select different interpolation filters from among the interpolation filters, according to pixel characteristics. The interpolator 1420 according to the exemplary embodiment may generate sub-pel-unit pixel values by using the interpolation filter differently selected according to pixel characteristics.

According to another exemplary embodiment, the filter selector 1410 may differently select an interpolation filter from among the interpolation filters, based on the sub-pel-unit interpolation location and a color component of a current pixel. According to another exemplary embodiment, the interpolator 1420 may interpolate integer-pel-unit pixels by using the selected interpolation filter, thereby generating at least one sub-pel-unit pixel value.

For example, the filter selector 1410 may differently determine an interpolation filter for a luma component and an interpolation filter for a chroma component.

The image interpolation apparatus 1400 may include an additional processor including a circuit for performing image interpolation. Alternatively, the image interpolation apparatus 1400 may include a storage medium on which an image interpolation module is recorded, and the CPU may call and drive the image interpolation module to perform image interpolation.

Image interpolation is used to transform a low-quality image into a high-quality image, to transform an interlaced image into a progressive image, or to up-sample a low-quality image into a high-quality image. Also, when a video encoding apparatus encodes an image, a motion estimator and compensator may perform inter prediction by using an interpolated reference frame. The accuracy of inter prediction may be increased by interpolating a reference frame to generate a high-quality image, and performing motion estimation and compensation based on the high-quality image. Similarly, when an image decoding apparatus decodes an image, a motion compensator may perform motion compensation by using an interpolated reference frame. As a result, the accuracy of inter prediction increases.

Figure 6:
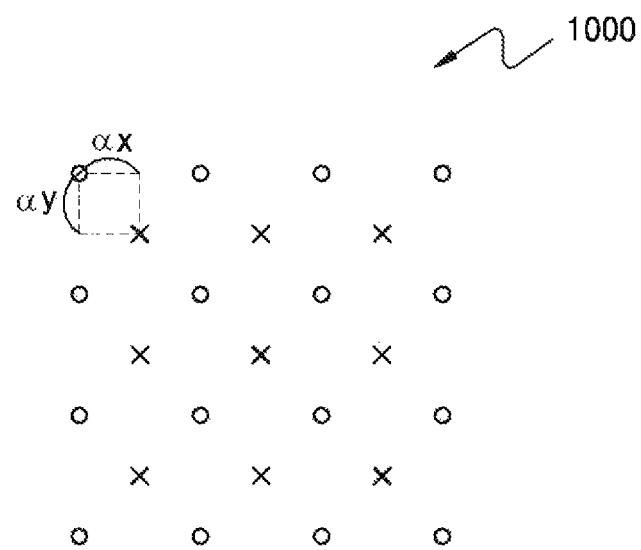
FIG. 6 is a diagram for describing a relationship between an integer-pel unit and a sub-pel unit.

FIG. 6 is a diagram for describing a relationship between an integer-pel unit and a sub-pel unit.

Referring to FIG. 6, the image interpolation apparatus generates pixel values of locations 'X' by interpolating integer-pel-unit pixel values of locations 'O' of a predetermined block 1000 in a spatial domain. The pixel values of the locations 'X' are sub-pel-unit pixel values of interpolation locations determined by $\alpha x$ and $\alpha y$. Although FIG. 6 illustrates that the predetermined block 1000 is a 4×4 block, it will be understood by one of ordinary skill in the art that the block size is not limited to 4×4 and the sub-pel-unit pixel values may be generated by interpolation filtering on a block greater or smaller than 4×4.

In video processing, a motion vector is used to perform motion compensation and prediction on a current image. According to prediction encoding, a previously decoded image is referred to predict a current image, and a motion vector indicates a predetermined point of a reference image. Therefore, a motion vector indicates an integer-pel-unit pixel of a reference image.

However, a pixel to be referred to by a current image may be located between integer-pel-unit pixels of a reference image. Such a location is referred to as a sub-pel-unit location. Since a pixel does not exist at a sub-pel-unit location, a sub-pel-unit pixel value is merely predicted by using integer-pel-unit pixel values. In other words, a sub-pel-unit pixel value is estimated by interpolating integer-pel-unit pixels.

Figure 7:
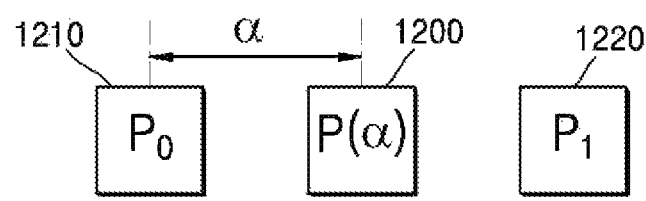
FIG. 7 is a diagram illustrating adjacent integer-pel-unit pixels to be referred to so as to determine a sub-pel-unit pixel value.

FIG. 7 is a diagram illustrating adjacent integer-pel-unit pixels to be referred to determine a sub-pel-unit pixel value.

Referring to FIG. 7, the image interpolation apparatus generates a sub-pel-unit pixel value 1200 of an interpolation location by interpolating integer-pel-unit pixel values 1210 and 1220 in a spatial domain. An interpolation location of the sub-pel-unit pixel value 1200 is determined by $\alpha$.

FIG. 8 is a diagram illustrating examples of integer-pel-unit pixel groups to be referred to determine a sub-pel-unit pixel value according to an exemplary embodiment.

In order to generate the sub-pel-unit pixel value 1200 by interpolating the two integer-pel-unit pixel values 1210 and 1220, a plurality of adjacent integer-pel-unit pixels values 1310 and 1320 including the integer-pel-unit pixel values 1210 and 1220 are used. That is, 0th and 1st pixels may be interpolated by performing one-dimensional interpolation filtering on 2M pixel values from an −(M−1)th pixel value to an Mth pixel value.

Also, although FIG. 8 illustrates that pixel values in a horizontal direction are interpolated, one-dimensional interpolation filtering may be performed by using pixel values in a vertical or diagonal direction.

In a case of interpolation filtering in the vertical direction, a pixel value P(α) of an interpolation location α may be generated by interpolating pixels of an integer number that are adjacent to each other in a vertical direction. When comparing with FIG. 8, their interpolation filtering methods are similar and the only difference therebetween is that pixel values aligned in a vertical direction are interpolated while the pixel values aligned in a horizontal direction are interpolated in FIG. 8.

In addition to the one-dimensional interpolation filtering in the direction exemplarily shown in FIG. 8, the pixel values of interpolation locations may be generated in various directions.

Various interpolation filter generation methods according to an exemplary embodiment are based on an arithmetic expression for generating a floating point number instead of an integer, and absolute values of filter coefficients are usually not greater than 1. Specifically, a calculation result of a real number instead of an integer may be generated by a sub-pel-unit interpolation location α.

The efficiency of integer-based calculation is greater than that of floating-point-based calculation. As such, the image interpolation apparatus 1400 may improve the calculation efficiency of interpolation filtering by scaling filter coefficients into integers by using a scaling ratio. Also, since a bit depth of pixel values is increased, the accuracy of interpolation filtering may also be improved.

The image interpolation apparatus 1400 may multiply filter coefficients $f_m(\alpha)$ by a predetermined value, and may perform image interpolation based on large filter coefficients $F_m(\alpha)$. For example, the filter coefficients $F_m(\alpha)$ may be scaled from the filter coefficients $f_m(\alpha)$ as represented in Equation 1.

$$F_m(\alpha)=\text{int}(f_m(\alpha) \cdot 2^n) \quad (1)$$

For efficiency of calculation, the scaling ratio may be in the form of $2^n$. n may be 0 or a positive integer. An interpolation filtering result using filter coefficients scaled by $2^n$ may have a bit depth scaled by n bits in comparison to a result obtained by using original filter coefficients.

Integer calculation interpolation filtering using the scaled filter coefficients $F_m(\alpha)$ may satisfy Equation 2. That is, after interpolation filtering is performed by using the scaled filter coefficients $F_m(\alpha)$, the scaled bit depth has to be reconstructed to an original bit depth.

$$p(\alpha)=(\Sigma_{-M+1}{}^{M} F_m(\alpha) \cdot p_m + \text{offset}) \gg n \quad (2)$$

In this case, an offset may be $2^{n-1}$.

That is, since a scaled filtering result using a scaled interpolation filter has to be reduced by a scaling ratio, i.e., $2^n$, so as to be reconstructed to original bits, a bit depth of the scaled filtering result may be reduced by n bits.

If two-step interpolation filtering is performed by performing one-dimensional interpolation filtering in a horizontal direction and performing one-dimensional interpolation filtering in a vertical direction, a reduction may be made by a total of 2n bits. Accordingly, if a first one-dimensional interpolation filter is scaled by n1 bits and a second one-dimensional interpolation filter is scaled by n2 bits, after two-step interpolation filtering is performed by using the first and second one-dimensional interpolation filters, a reduction may be made by a sum of n1 and n2, i.e., 2n bits. The first one-dimensional interpolation filter may be an interpolation filter that is not scaled.

A sum of the filter coefficients $f_m(\alpha)$ is 1 as shown in Equation (3), $$\Sigma_{-M+1}{}^{M} f_m(\alpha)=1 \quad (3)$$

Thus, a condition for regularizing the filter coefficients $F_m(\alpha)$ of the scaled interpolation filter may need to satisfy equation 4.

$$\Sigma_{-M+1}{}^{M} F_m(\alpha)=2^n \quad (4)$$

However, the regularization condition according to Equation 4 may cause a rounding error. For regularization, some of the scaled filter coefficients $F_m(\alpha)$ may be adjusted within a predetermined range of original values. For example, some of the scaled filter coefficients $F_m(\alpha)$ may be adjusted within a range between −1 and 1 to correct a rounding error.

Filter coefficients of a de-noise filter for removing noise from a reference layer image for performing an inter-layer prediction according to one or more exemplary embodiments will be described below with reference FIGS. 9A and 9B.

Figures 9A, 9B:
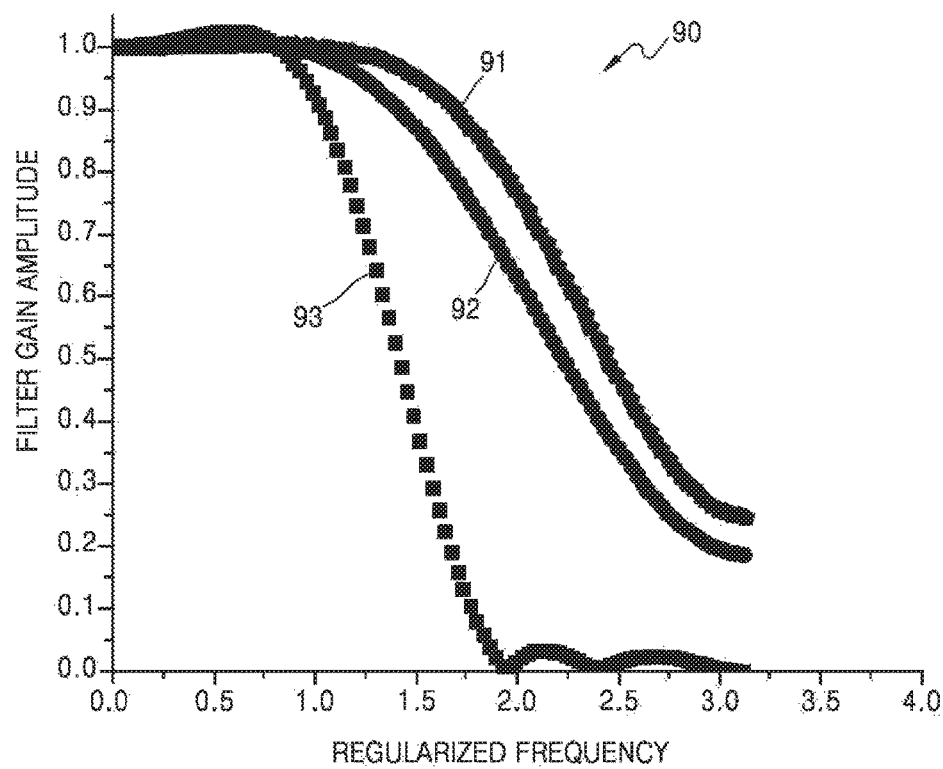
FIG. 9A is a diagram illustrating filter coefficients of a de-noise filter, according to one or more exemplary embodiments.
FIG. 9B is a diagram illustrating a response function of the de-noise filter illustrated in FIG. 9.

FIG. 9A is a diagram illustrating filter coefficients of a de-noise filter according to one or more exemplary embodiments.

The filter coefficients illustrated with reference to FIG. 9A are described in 8-tap filter coefficient formats, but may correspond to coefficients of 5-tap or 7-tap filters.

Filter coefficients of a 7-tap de-noise filter may include a first 7-tap set {1, −5, 11, 50, 11, −5, 1, 0} or a second 7-tap set {1, −5, 10, 52, 10, −5, 1, 0}.

Filter coefficients of a 5-tap de-noise filter may include a first 5-tap set {0, −4, 13, 46, 13, −4, 0, 0}/64, a second 5-tap set {0, −4, 14, 44, 14, −4, 0, 0}/64, a third 5-tap set {0, −4, 12, 48, 12, −4, 0, 0}/64, a fourth 5-tap set {0, −3, 8, 54, 8, −3, 0, 0}, or a fifth 5-tap set {0, −1, 3, 60, 3, −1, 0, 0}.

From among the filter coefficients of the 5-tap de-noise filter, the first 5-tap set {0, −4, 13, 46, 13, −4, 0, 0}/64 is transformed into filter coefficients of 5-bit accuracy, that is, the second 5-tap set {0, −4, 14, 44, 14, −4, 0, 0}/64. The second 5-tap set {0, −4, 14, 44, 14, −4, 0, 0}/64 may correspond to a 5-tap set {0, −2, 7, 22, 7, −2, 0, 0}/32 of 5-bit accuracy.

From among the filter coefficients of the 5-tap de-noise filter, the first 5-tap set {0, −4, 13, 46, 13, −4, 0, 0}/64 is transformed into filter coefficients of 4-bit accuracy, that is, the third 5-tap set {0, −4, 12, 48, 12, −4, 0, 0}/64. The third 5-tap set {0, −4, 12, 48, 12, −4, 0, 0}/64 may correspond to a 5-tap set {0, −1, 3, 12, 3, −1, 0, 0}/16 of four-bit accuracy.

FIG. 9B illustrates a response function of a de-noise filtering illustrated in FIG. 9A. In particular, from among the filter coefficients of the de-noise filter shown in FIG. 9A, amplitude frequency responses of the first 5-tap set and the first 7-tap set.

When a harmonic signal having a size of 1 is input into interpolation filters, amplitude frequency response graphs 90 of the interpolation filters may show interpolation filtering results.

The amplitude frequency response graphs 90 may include a first frequency response 91 of the 5-tap de-noise filter according to an exemplary embodiment, a second frequency response 92 of the 7-tap de-noise filter according to an exemplary embodiment, and a third frequency response 93 of a down-sampling filter based on 2× spatial scalability.

When it is assumed that a maximum frequency having an amplitude attenuation of 10% or less according to the filtering is a cut level, the frequency responses 91, 92, and 93 of the three kinds of filters have different cut levels from each other. Since the amplitude is greatly attenuated at a frequency that is higher than the cut level, the response value from the frequency higher than the cut level may be considered as a value deteriorated by the filtering.

In general, as the frequency is close to nt, a frequency response of a finite impulse response (FIR) filter is close to 0, and thus, the FIR filter may not generate radio frequency component. In addition, as a cut level of the interpolation level is low, the interpolation filter may not reconstruct detailed information of the reference image.

In the amplitude frequency response graphs 90, the first and second frequency responses 91 and 92 of the de-noise filters according to the one or more exemplary embodiments have higher cut level than that of the third frequency response 93 of the down-sampling filter. Thus, it may be expected that the interpolation result using the de-noise filter may reconstruct the reference image in greater detail in comparison with the down-sampling result.

The scalable video encoding apparatus 10 according to one or more exemplary embodiments may selectively determine whether to perform the de-noise filtering on the reference layer image for the inter-layer prediction. The scalable video encoding apparatus 10 may determine whether to perform the de-noise filtering for the inter-layer prediction on the current data unit, with respect to every picture, every slice, very maximum coding unit, every coding unit, or every prediction unit.

The scalable video decoding apparatus 20 according to one or more exemplary embodiments may acquire the inter-layer de-noise filtering parameter on the current data unit under predetermined conditions, for each picture, each slice, each maximum coding, unit, each coding unit, or each prediction unit. The scalable video decoding apparatus 20 obtains the inter-layer de-noise filtering parameter about the current data unit under the predetermined conditions, and may determine whether to perform the de-noise filtering on the reference layer image based on the parameter.

Hereinafter, various methods of using the inter-layer de-noise filtering parameter will be suggested with reference to FIGS. 10A, 10B, 11A, 11B, and 12.

FIGS. 10A, 10B, 11A, and 11B illustrate reference picture lists for enhancement layer image determined according to one or more exemplary embodiments.

Figure 10A:
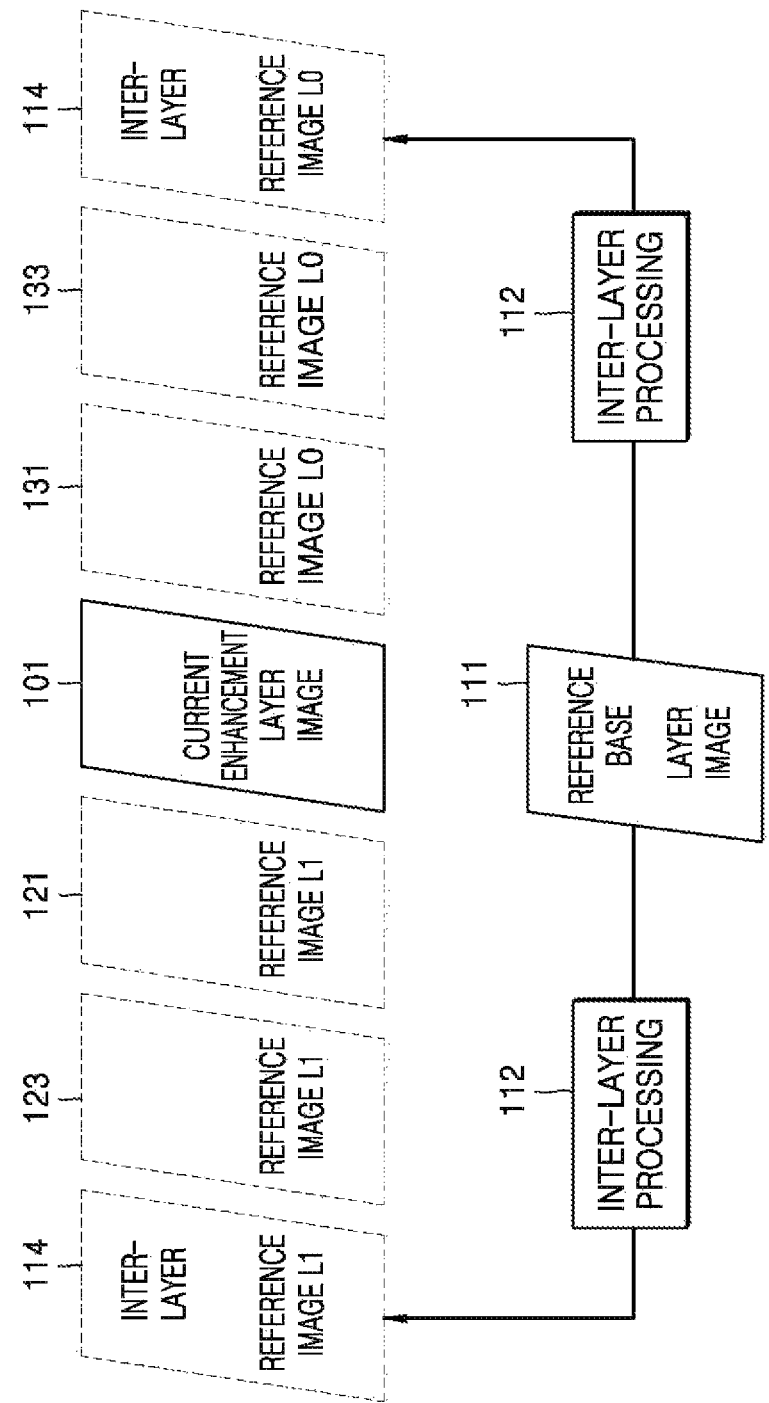
FIGS. 10A, 10B, 11A, and 11B are diagrams illustrating reference picture lists for an enhancement layer image determined according to one or more exemplary embodiments.

Referring to FIG. 10A, a reconstructed base layer image 111 that is collocated and correspond to a current enhancement layer image 101 may pass through an inter-layer processor 112 to determine an inter-layer reference image 114 for the current enhancement layer image 101. The inter-layer processor 112 may change a resolution of the reconstructed base layer image 111 by performing an upsampling filtering on the reconstructed base layer image 111, transform a motion vector field of a base layer into a motion vector field of an enhancement layer, transform a bit depth of the base layer into a bit depth of the enhancement layer, or transform a color space of the base layer into a color space of the enhancement layer.

The inter-layer processor 112 may transform the reconstructed base layer image 111 into the inter-layer reference image 114 by combining at least one processing operation of the upsampling filtering, the motion vector field transformation, the bit depth transformation, and the color space transformation.

The scalable video decoding apparatus 20 may determine whether images included in the reference picture list are enhancement layer reference images 121, 123, 131, and 133 for the inter prediction or inter-layer reference images 114, by using a reference index obtained from at least one of a picture parameter set (PPS) and a slice header.

As another example, the scalable video decoding apparatus 20 may determine whether the inter-layer prediction or the inter prediction is necessary, based on the reference index indicating the enhancement layer reference images 121, 123, 131, and 133 for the inter prediction and the inter-layer reference images 114 to be distinguished from each other.

Therefore, the scalable video decoding apparatus 20 may add the inter-layer reference images 114 to at least one of an L0 list or an L1 list including images that may be used to perform the inter prediction of the current enhancement layer image 101. Therefore, the reference picture list may further include one image, when being compared with the reference picture list only including images for the inter prediction.

Figure 10B:
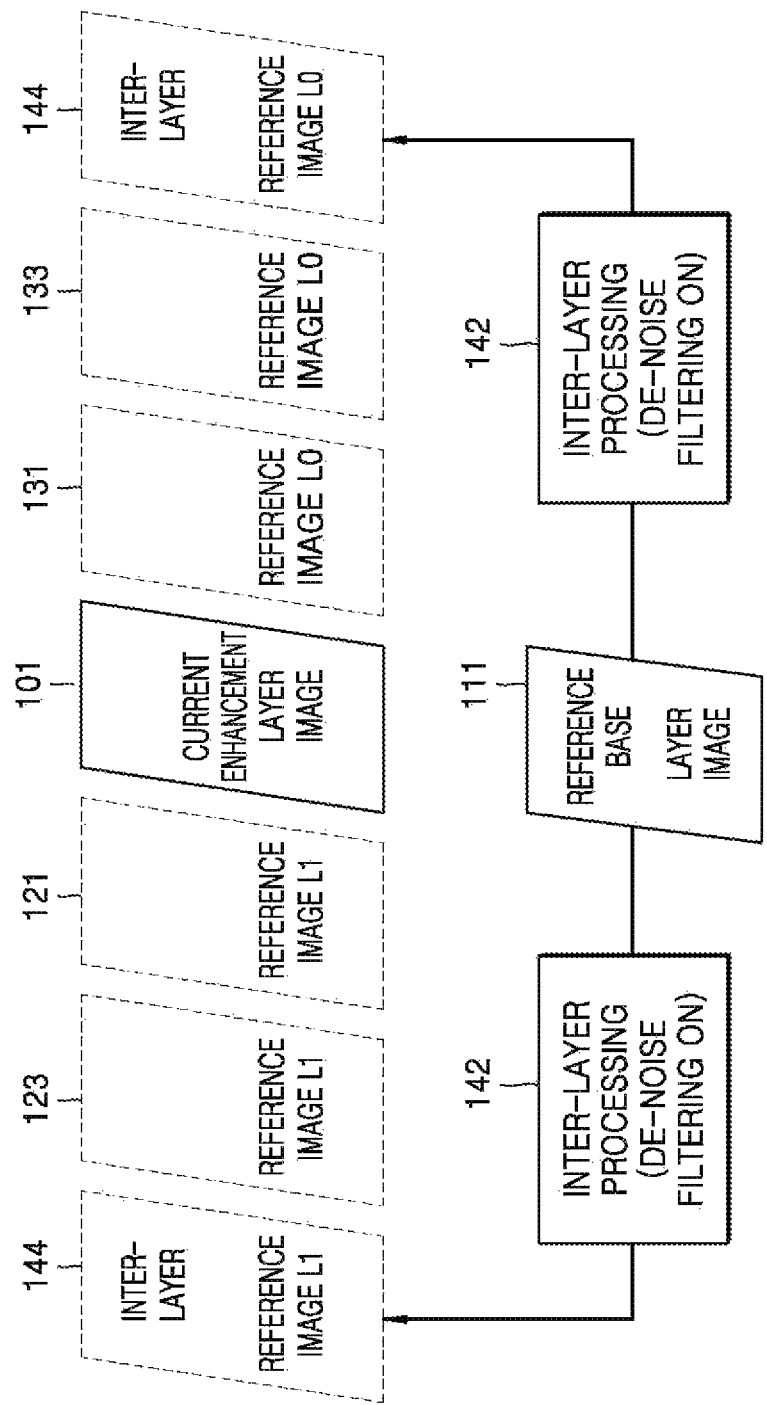

Referring to FIG. 10B, an inter-layer processor 142 may perform a de-noise filtering on the reconstructed base layer image 111 to generate an inter-layer reference image 144. For example, a filter having a phase difference of 0 and filter coefficients of {0, −4, 12, 48, 12, −4, 0, 0}/64 may be used as a de-noise filter.

Therefore, the inter-layer processor 142 may transform the reconstructed base layer image 111 into the inter-layer reference image 144 by combining at least one processing operation from among the de-noise filtering, the upsampling filtering, the motion vector field transformation, the bit depth transformation, and the color space transformation. Therefore, the reconstructed base layer image that has been de-noised may be added in the reference picture list as the inter-layer reference image 144.

The scalable video decoding apparatus 20 may determine whether the images included in the reference picture list are the enhancement layer reference images 121, 123, 131, and 133 for the inter prediction or the inter-layer reference image 144 by using a reference index obtained from at least one of the PPS and the slice header.

As another exemplary embodiment, the scalable video decoding apparatus 20 may determine whether the inter-layer prediction or the inter prediction is necessary, based on the reference index indicating the enhancement layer reference images 121, 123, 131, and 133 for the inter prediction and the inter-layer reference image 144 to be distinguished from each other.

Therefore, the scalable video decoding apparatus 20 may further add the inter-layer reference image 144 to at least one of the L0 list and the L1 list including the images that may be used to perform the inter prediction on the current enhancement layer image 101. Therefore, the reference picture list may further include one image, when compared with the general reference picture list only including the images for the inter prediction.

Figure 11A:
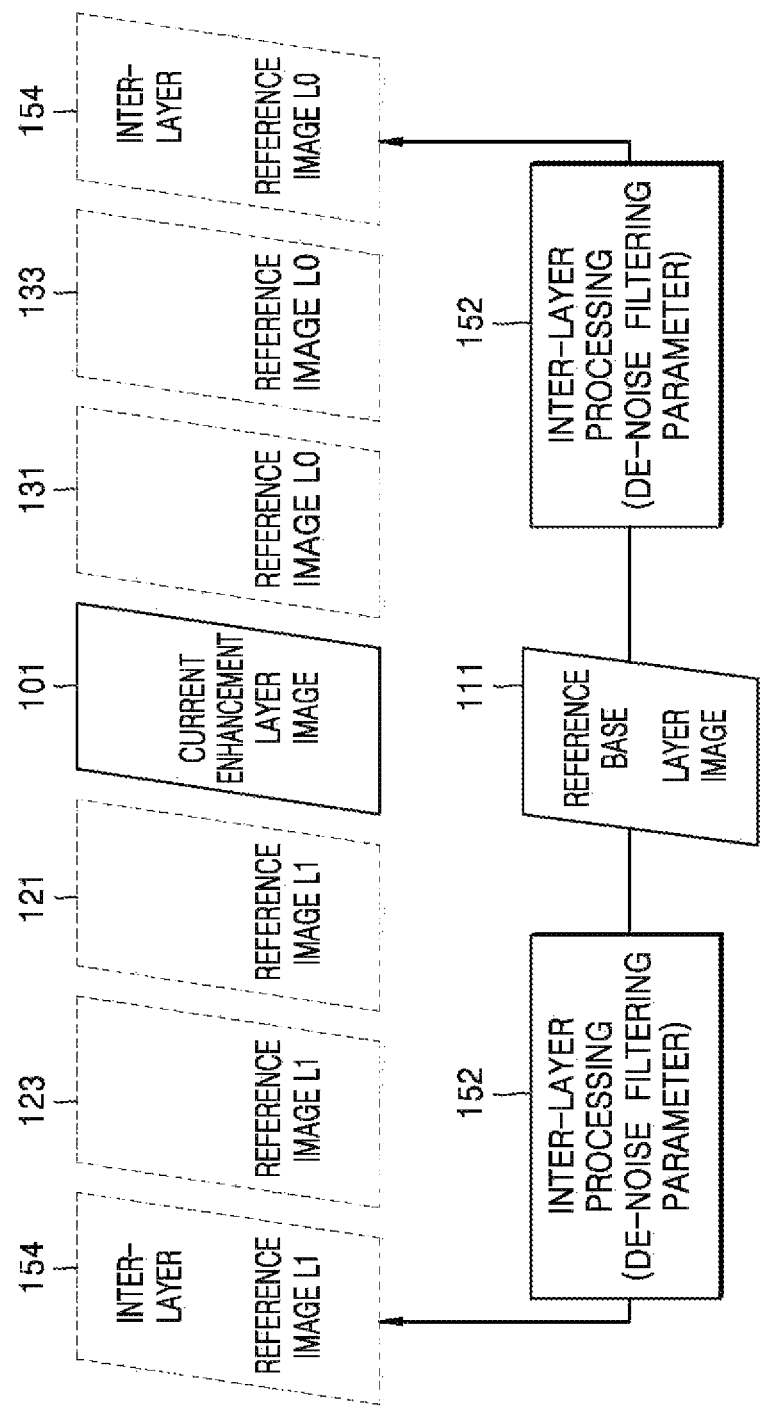

Referring to FIG. 11A, an inter-layer processor 152 may selectively perform a de-noise filtering on the reconstructed base layer image 111 in order to generate an inter-layer reference image 154. For example, a filter having a phase difference of 0 and filter coefficients of {0, −4, 12, 48, 12, −4, 0, 0}/64 may be used as a de-noise filter. However, the inter-layer processor 152 may determine whether to perform the de-noise filtering based on the inter-layer de-noise filtering parameter.

The inter-layer de-noise filtering parameter may be obtained from at least one of the PPS and the slice header.

Therefore, the inter-layer processor 152 may transform the reconstructed base layer image 111 into the inter-layer reference image 154 by combining at least one processing operation from among the de-noise filtering, the upsampling filtering, the motion vector field transformation, the bit depth transformation, and the color space transformation. Therefore, the inter-layer reference image 154 may be a reconstructed base layer image that has been de-noised by the inter-layer processor 152 or the reconstructed base layer image on which the de-noise filtering is omitted.

The scalable video decoding apparatus 20 may determine whether the images included in the reference picture list are the enhancement layer reference images 121, 123, 131, and 133 for the inter prediction or the inter-layer reference image 154 by using a reference index obtained from at least one of the PPS and the slice header.

As another exemplary embodiment, the scalable video decoding apparatus 20 may determine whether the inter-layer prediction or the inter prediction is necessary, based on the reference index indicating the enhancement layer reference images 121, 123, 131, and 133 for the inter prediction and the inter-layer reference image 154 to be distinguished from each other.

Therefore, the scalable video decoding apparatus 20 may further add the inter-layer reference image 154 to at least one of the L0 list and the L1 list including the images that may be used to perform the inter prediction on the current enhancement layer image 101. Therefore, the reference picture list may further include one image, when compared with the general reference picture list only including the images for the inter prediction.

Figure 11B:
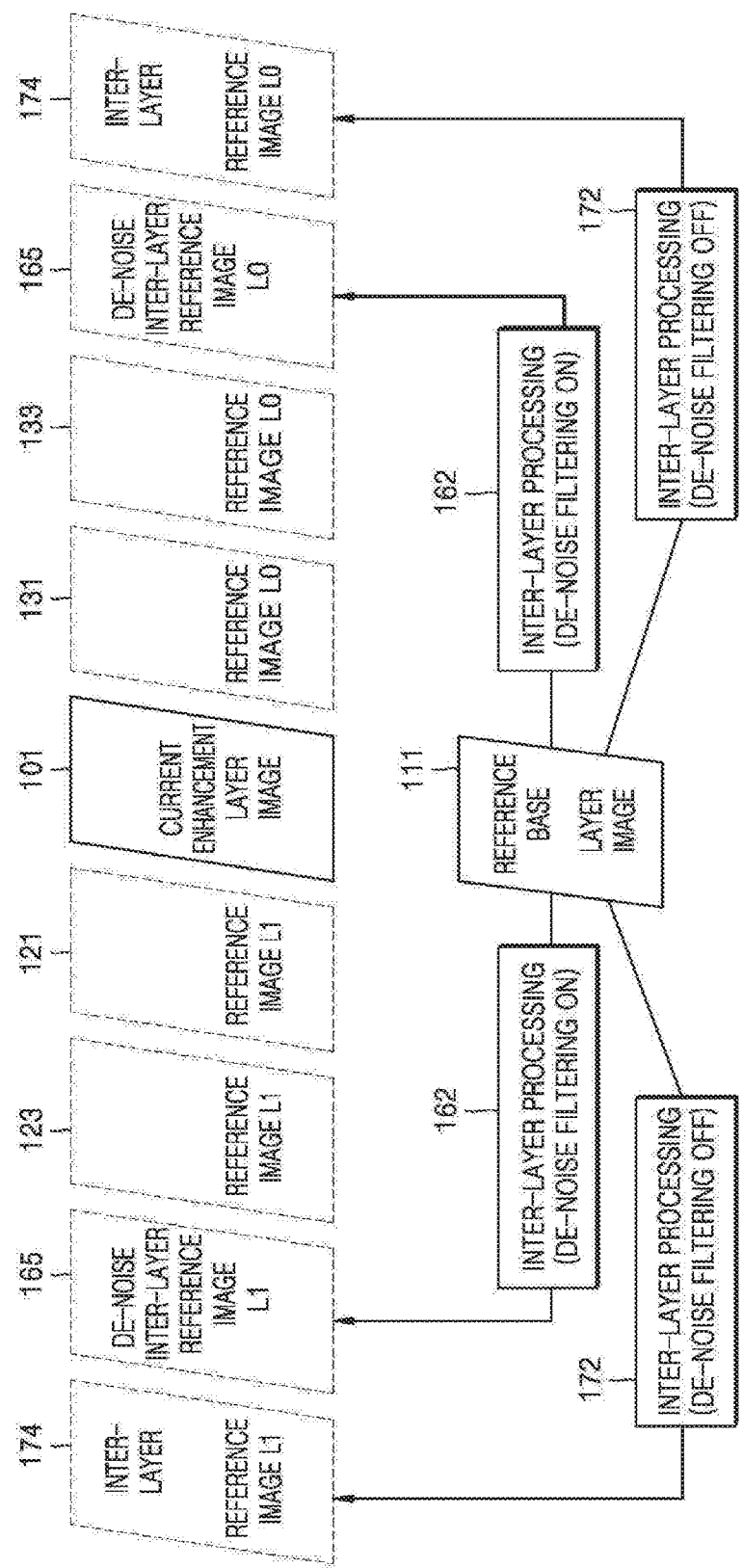

Referring to FIG. 11B, the inter-layer processor 162 may omit to perform the de-noise filtering on the reconstructed base layer image 111 to generate an inter-layer reference image 174. However, the inter-layer processor 162 may perform a de-noise filtering on the reconstructed base layer image 11 to generate an inter-layer reference image 165. For example, a filter having a phase difference of 0 and filter coefficients of {0, −4, 12, 48, 12, −4, 0, 0}/64 may be used as a de-noise filter.

The inter-layer de-noise filtering parameter may be obtained from at least one of the PPS and the slice header. The inter-layer processor 162 may determine whether to perform the de-noise filtering on each block based on the inter-layer de-noise filtering parameter.

Therefore, the inter-layer processor 152 may transform the reconstructed base layer image 111 into the inter-layer reference image 165 by combining at least one processing operation from among the de-noise filtering, the upsampling filtering, the motion vector field transformation, the bit depth transformation, and the color space transformation. Therefore, the inter-layer reference image 174 may be a reconstructed base layer image that has been de-noised by the inter-layer processor 162 or the reconstructed base layer image on which the de-noise filtering is omitted.

The scalable video decoding apparatus 20 may determine whether the images included in the reference picture list are the enhancement layer reference images 121, 123, 131, and 133 for the inter prediction or the inter-layer reference image 165 and 174 by using a reference index obtained from at least one of the PPS and the slice header.

As another exemplary embodiment, the scalable video decoding apparatus 20 may determine whether the inter-layer prediction or the inter prediction is necessary, based on the reference index indicating the enhancement layer reference images 121, 123, 131, and 133 for the inter prediction and the inter-layer reference images 165 and 174 to be distinguished from each other.

Therefore, the scalable video decoding apparatus 20 may further add the inter-layer reference image 165 that has been de-noised and the inter-layer reference image 174 to at least one of the L0 list and the L1 list including the images that may be used to perform the inter prediction on the current enhancement layer image 101. Therefore, the reference picture list may further include two images, when compared with the general reference picture list only including the images for the inter prediction.

According to the exemplary embodiments illustrated in FIGS. 10A, 10B, 11A, and 11B, the scalable video decoding apparatus 20 may reconstruct the current enhancement layer image 101 by performing at least one of the inter prediction and the inter-layer prediction after determining the reference image from at least one of the L0 list and the L1 list.

FIG. 12 illustrates a syntax including a de-noise filtering parameter according to an exemplary embodiment.

The scalable video decoding apparatus 20 according to the exemplary embodiment may parse a syntax 121 about a current coding unit shown in FIG. 12 from a received image bitstream. The scalable video decoding apparatus 20 may determine whether the inter-layer prediction may be performed in a coding unit that is not in a skip mode, based on the syntax 121 about the current coding unit.

If the inter-layer prediction may be performed on the current coding unit (texture_rl_flag[x0][y0]), a resolution of the current layer image may be compared with a resolution of a reference layer image. In order to compare the resolutions of the images of different layers with each other, a width nPicW and a height nPicH of the current layer image may be respectively compared with a width nPicWRL and a height nPicH of the reference layer image. In addition, it may be compared whether a difference deltaQP between a QP of the current layer image and a QP of the reference layer image is greater than a predetermined threshold value deltaQPThr (condition 123).

If the inter-layer prediction may be performed on the current coding unit of the enhancement layer, the width nPicW and the height nPicH of the current layer image are respectively equal to the width nPicWRL and the height nPicH of the reference layer image, and a value of deltaPQ is greater than deltaQRThr, the scalable video decoding apparatus 20 may acquire information denoising_flt_flag 125 indicating whether to perform the de-noise filtering from the image stream.

If the scalable video decoding apparatus 20 determines to apply the de-noise filtering based on the information denoising_flt_flag 125, the scalable video decoding apparatus 20 may perform the de-noise filtering on the reference layer image to perform the inter-layer prediction by using the de-noise reference layer image. The current coding unit and the collocated block are determined from the reference layer image that has been de-noised to be used in the inter-layer prediction.

However, if the inter-layer prediction is not performed, if the resolution of the enhancement layer image and the resolution of the base layer image are not equal to each other, if the value of deltaPQ is not greater than deltaQRThr, the scalable video decoding apparatus 20 may determine not to acquire the information denoising_flt_flag 125 and may omit to perform the de-noise filtering on the reference layer image.

The scalable video encoding apparatus 10 according to the exemplary embodiment may perform the inter-layer prediction for the current coding unit, and may determine whether to perform the de-noise filtering on the reference layer image if the width nPicW and the height nPicH of the current layer image are respectively equal to the width nPicWRL and the height nPicH of the reference layer image and the value of deltaPQ is greater than deltaQRThr.

Accordingly, the scalable video encoding apparatus 10 performs the inter-layer prediction, and may add a parameter indicating whether to perform the de-noise filtering on the reference layer image in the syntax 121 for the current coding unit, if the width nPicW and the height nPicH of the current layer image are respectively equal to the width nPicWRL and the height nPicH of the reference layer image and the value of deltaPQ is greater than deltaQRThr.

FIG. 13 is a flowchart illustrating a scalable video encoding method according to one or more exemplary embodiments.

In operation S 131, the scalable video encoding apparatus 10 determines a reference picture list including at least one of a reconstructed base layer image corresponding to a current enhancement layer image and a de-noise reconstructed base layer image. The scalable video encoding apparatus 10 may determine a collocated reconstructed base layer image at the same location as the current enhancement layer image. While the reference picture list for performing a prediction on the current enhancement layer image is being determined, at least one of the reconstructed base layer image and the de-noise reconstructed base layer image may be included in the reference picture list.

In operation S 133, the scalable video encoding apparatus 10 may perform an inter-layer prediction on the current enhancement layer image by using the reference image determined from the reference picture list.

In operation S 135, the scalable video encoding apparatus 10 generates an enhancement layer image stream including encoding symbols generated by the inter-layer prediction. In addition, in operation S 135, the scalable video encoding apparatus 10 may generate an enhancement layer image stream including an inter-layer de-noise filtering parameter that indicates whether the de-noise filtering is performed on the reconstructed base layer image.

In operation S 137, the scalable video encoding apparatus 10 generates a base layer image stream by encoding base layer images corresponding to enhancement layer images.

Referring back to operation S 133, it may be determined whether to perform the de-noise filtering on each of the blocks in the current enhancement layer images. Therefore, in operation S 135, it may be also determine whether to generate the inter-layer de-noise filtering parameter for each block of the current enhancement layer images. For example, if a resolution of the enhancement layer image and a resolution of the reconstructed base layer image are equal to each other, the scalable video encoding apparatus 10 may determine to perform the de-noise filtering on the reconstructed base layer image.

As another example, if the resolution of the enhancement layer image and the resolution of the reconstructed base layer image are equal to each other, the scalable video encoding apparatus 10 may add the inter-layer de-noise filtering parameter in the enhancement layer image stream. Therefore, if a difference between a quantization parameter QP for the current block of the current enhancement layer image and a QP of a reference block of the reconstructed base layer image is greater than a predetermined threshold value, the scalable video encoding apparatus 10 may determine to perform the de-noise filtering on the reconstructed base layer image. If the difference between the QPs is greater than the predetermined threshold value, the scalable video encoding apparatus 10 may add the inter-layer de-noise filtering parameter in the enhancement layer image stream.

As another example, if the inter-layer prediction is not performed, if the resolutions of the enhancement layer image and the base layer image are not equal to each other, or if the value of deltaPQ is not greater than deltaQRThr, the scalable video encoding apparatus 10 may not perform the de-noise filtering on the reference layer image without acquiring the information denoising_flt_flag 125.

FIG. 14 is a flowchart illustrating a scalable video decoding method according to one or more exemplary embodiments.

In operation S 141, the scalable video decoding apparatus 20 generates reconstructed base layer images from a base layer image stream.

In operation S 143, the scalable video decoding apparatus 20 determines a reference picture list including at least one of a reconstructed base layer image corresponding to the current enhancement layer image and a de-noise reconstructed base layer image from among the reconstructed base layer images, from the enhancement layer image stream.

For example, the scalable video decoding apparatus 20 may acquire an inter-layer de-noise filtering parameter from the enhancement layer image stream. For example, if the de-noise filtering is performed based on the de-noise filtering parameter, the reference picture list may include the de-noise reconstructed base layer image.

In operation S 145, the scalable video decoding apparatus 20 reconstructs the current enhancement layer image by using a reference image determined from the reference picture list.

The scalable video decoding apparatus 20 may obtain the inter-layer de-noise filtering parameter for each block of the current enhancement layer image.

For example, if the resolutions of the enhancement layer image and the reconstructed base layer image are equal to each other, the inter-layer de-noise filtering parameter may be obtained from the enhancement layer image stream.

As another example, if a difference between a QP for the current block of the current enhancement layer image and a QP of the reference block of the reconstructed base layer image is greater than a predetermined threshold value, the inter-layer de-noise filtering parameter may be obtained from the enhancement layer image stream.

As another example, if the inter-layer prediction is performed, the resolutions of the enhancement layer image and the base layer image are equal to each other, and the value of deltaPQ is not greater than deltaQRThr, the scalable video decoding apparatus 20 may obtain the information denoising_flt_flag 125. If the inter-layer prediction is not performed, the resolutions of the enhancement layer image and the base layer image are not equal to each other, or the value of deltaPQ is not greater than the deltaQRThr, the scalable video decoding apparatus 20 may not perform the de-noise filtering on the reference layer image without obtaining the information denoising_flt_flag 125.

For example, an enhancement layer image that is de-noised through the de-noise filtering using a 4-bit accuracy filter having filter coefficients of {0, −4, 12, 48, 12, −4, 0, 0}/64 may be included in the reference picture list for the inter-layer prediction.

As described above, the scalable video encoding apparatus 10 and the scalable video decoding apparatus 20 according to the exemplary embodiments split blocks of divided video data into coding units of a tree structure, and encoding units, prediction units, and transformation units are used for inter-layer prediction or inter-prediction of the coding unit. Hereinafter, with reference to FIGS. 15 to 27, a video encoding method and apparatus therefor, and a video decoding method and apparatus therefor, based on coding units and transformation units of a tree structure, are described.

Basically, in an encoding/decoding procedure for a multilayer video, an encoding/decoding procedure for base layer images, and an encoding/decoding procedure for enhancement layer images are separately performed. That is, when inter-layer prediction occurs in the multilayer video, encoding/decoding results of a single layer video may be mutually referred to, but an encoding/decoding procedure is performed for each of single layer videos.

Therefore, for convenience of description, a video encoding procedure and a video decoding procedure based on coding units of a tree structure that are described later with reference to FIGS. 15 to 27 are a video encoding procedure and a video decoding procedure for a single layer video, thus, inter-prediction and motion compensation are described in detail. However, as described above with reference to FIGS. 1 to 8, 9A, 9B, 10A, 10B, 11A, 11B, and 12 to 14, for encoding/decoding a video stream, inter-layer prediction and compensation between base layer images and enhancement layer images are performed.

Figure 15:
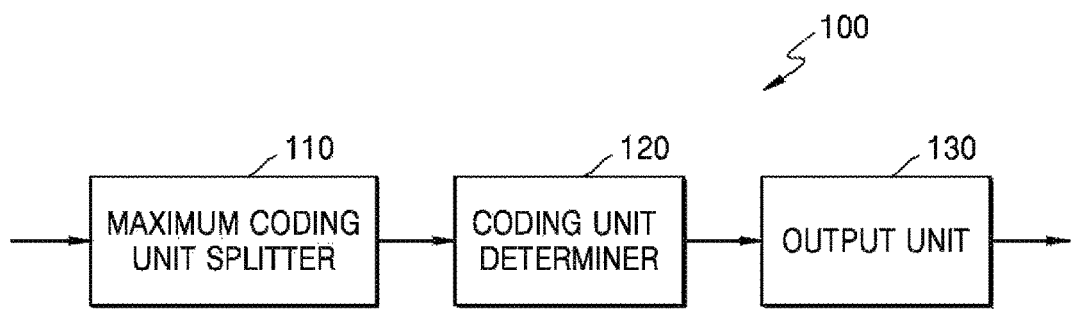
FIG. 15 is a block diagram of a video encoding apparatus based on coding units having a tree structure, according to one or more exemplary embodiments.

Therefore, in order for the layer encoder 12 of the scalable video encoding apparatus 10 according to the exemplary embodiment to encode a multilayer video, based on coding units of a tree structure, the encoder 12 may include video encoding apparatuses 100 of FIG. 15 corresponding to the number of layers of a multilayer video to perform video encoding on each of single layer videos, and may control the video encoding apparatuses 100 to encode the single layer videos, respectively. Also, the scalable video encoding apparatus 10 may perform inter-view prediction by using encoding results with respect to discrete single views obtained by the video encoding apparatuses 100. Accordingly, the encoder 12 of the scalable video encoding apparatus 10 may generate a base layer video stream and an enhancement layer video stream that include an encoding result of each layer.

Figure 16:
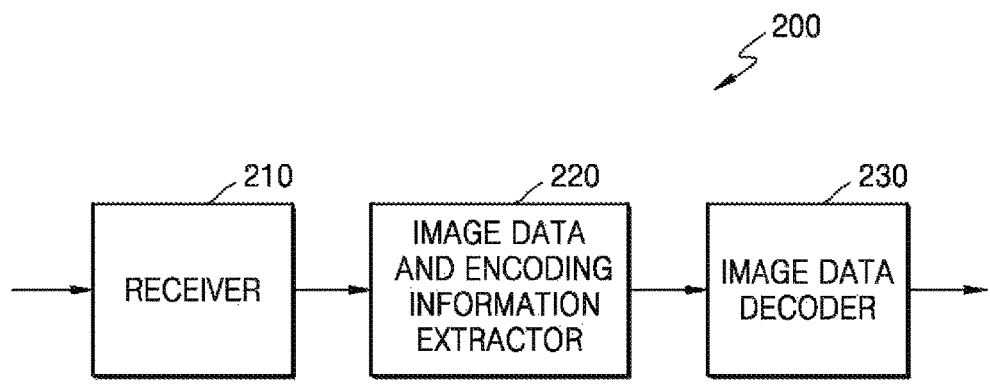
FIG. 16 is a block diagram of a video decoding apparatus based on coding units having a tree structure, according to one or more exemplary embodiments.

Similarly, in order for the decoder 26 of the scalable video decoding apparatus 20 to decode a multilayer video, based on coding units of a tree structure, the decoder 26 may include video decoding apparatuses 200 of FIG. 16 corresponding to the number of layers of a multilayer video to perform video decoding on each of layers of a received base layer video stream and a received enhancement layer video stream, and may control the video decoding apparatuses 200 to decode single layer videos, respectively. Then, the scalable video decoding apparatus 20 may perform inter-layer compensation by using decoding results with respect to discrete single layers obtained by the video decoding apparatuses 200. Accordingly, the decoder 26 of the scalable video decoding apparatus 20 may generate base layer images and enhancement layer images that are reconstructed for each of the layers.

FIG. 15 is a block diagram of a video encoding apparatus 100 based on coding units of a tree structure, according to an exemplary embodiment.

The video encoding apparatus involving video prediction based on coding units of the tree structure 100 includes a coding unit determiner 120 and an output unit 130. Hereinafter, for convenience of description, the video encoding apparatus involving video prediction based on coding units of the tree structure 100 is referred as 'video encoding apparatus 100'.

The coding unit determiner 120 may split a current picture based on a maximum coding unit that is a coding unit having a maximum size for a current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and length in squares of 2.

A coding unit according to an exemplary embodiment may be characterized by a maximum size and a depth. The depth denotes the number of times the coding unit is spatially split from the maximum coding unit, and as the depth deepens, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of the each coding unit, separately. Accordingly, even when image data is included in one maximum coding unit, the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting times from a maximum coding unit to a minimum coding unit. A first maximum depth according to an exemplary embodiment may denote the total number of splitting times from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3, and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding, including the prediction encoding and the transformation, is performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit to perform the prediction encoding on the image data in the coding unit.

In order to perform prediction encoding in the maximum coding unit, the prediction encoding may be performed based on a coding unit corresponding to a coded depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one selected from a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one selected from an intra mode, a inter mode, and a skip mode. For example, the intra mode or the inter mode may be performed on the partition of 2N×2N, 2N×N, N×x2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the data unit for the transformation may include a data unit for an intra mode and a data unit for an inter mode.

The transformation unit in the coding unit may be recursively split into smaller sized transformation units in the similar manner as the coding unit according to the tree structure. Thus, residual data in the coding unit may be divided according to the transformation unit having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a maximum coding unit and methods of determining a prediction unit/partition, and a transformation unit, according to exemplary embodiments, will be described in detail later with reference to FIGS. 17 to 27.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a square data unit obtained by splitting the minimum coding unit constituting the lowermost depth by 4. Alternatively, the minimum unit according to an exemplary embodiment may be a maximum square data unit that may be included in all of the coding units, prediction units, partition units, and transformation units included in the maximum coding unit.

For example, the encoding information output by the output unit 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction during an inter mode, about a reference image index of the inter mode, about a motion vector, about a chroma component of an intra mode, and about an interpolation method during the intra mode.

Information about a maximum size of the coding unit defined according to pictures, slices, or GOPs, and information about a maximum depth may be inserted into a header of a bitstream, a sequence parameter set, or a picture parameter set (PPS).

In addition, information about a maximum size of the transformation unit permitted with respect to a current video, and information about a minimum size of the transformation unit may also be output through a header of a bitstream, a sequence parameter set, or a picture parameter set. The output unit 130 may encode and output reference information, prediction information, and slice type information that are related to prediction.

According to the simplest exemplary embodiment for the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit with the current depth having a size of 2N×2N may include a maximum of 4 of the coding units with the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having a high resolution or a large data amount is encoded in a related art macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100 according to the exemplary embodiment, image compression efficiency may be increased since a coding unit is adjusted while considering characteristics of an image while increasing a maximum size of a coding unit while considering a size of the image.

The scalable video encoding apparatus 10 described above with reference to FIG. 1 may include the video encoding apparatuses 100 corresponding to the number of layers to encode single layer images in each of the layers of a multilayer video. For example, the base layer encoder 12 may include one video encoding apparatus 100, and the enhancement layer encoder 14 may include the video encoding apparatuses 100 corresponding to the number of enhancement layers.

When the video encoding apparatuses 100 encode base layer images, the coding unit determiner 120 may determine a prediction unit for inter-image prediction for each of coding units of a tree structure according to each maximum coding unit, and may perform the inter-image prediction on each prediction unit.

When the video encoding apparatuses 100 encode enhancement layer images, the coding unit determiner 120 may determine prediction units and coding units of a tree structure according to each maximum coding unit, and may perform inter-prediction on each of the prediction units.

FIG. 16 is a block diagram of a video decoding apparatus based on coding units of a tree structure 200, according to one or more exemplary embodiments.

The video decoding apparatus involving video prediction based on coding units of the tree structure 200 according to the present exemplary embodiment includes a receiver 210, an image data and encoding information extractor 220, and an image data decoder 230. Hereinafter, for convenience of description, the video decoding apparatus involving video prediction based on coding units of the tree structure 200 according to the present exemplary embodiment is referred to as 'video decoding apparatus 200'.

Definitions of various terms, such as a coding unit, a depth, a prediction unit, a transformation unit, and information about various encoding modes, for decoding operations of the video decoding apparatus 200 according to the present exemplary embodiment are identical to those described with reference to FIG. 15 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. That is, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may reconstruct an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. If information about a coded depth and encoding mode of a corresponding maximum coding unit is recorded according to predetermined data units, the predetermined data units to which the same information about the coded depth and the encoding mode is assigned may be inferred to be the data units included in the same maximum coding unit.

The image data decoder 230 reconstructs the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation.

The image data decoder 230 may perform intra prediction or motion compensation according to a partition and a prediction mode of each coding unit, based on the information about the partition type and the prediction mode of the prediction unit of the coding unit according to coded depths.

In addition, the image data decoder 230 may read information about a transformation unit according to a tree structure for each coding unit to perform inverse transformation based on transformation units for each coding unit, for inverse transformation for each maximum coding unit. Via the inverse transformation, a residue component of a spatial domain of the coding unit may be reconstructed.

The image data decoder 230 may determine a coded depth of a current maximum coding unit by using split information according to depths. If the split information indicates that image data is no longer split in the current depth, the current depth is a coded depth. Accordingly, the image data decoder 230 may decode encoded data in the current maximum coding unit by using the information about the partition type of the prediction unit, the prediction mode, and the size of the transformation unit for each coding unit corresponding to the coded depth.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

The scalable video decoding apparatus 20 described above with reference to FIG. 2 may include the video decoding apparatuses 200 corresponding to the number of views, so as to decode a received base layer image stream and a received enhancement layer image stream and to reconstruct base layer images and enhancement layer images.

When the base layer image stream is received, the image data decoder 230 of the video decoding apparatus 200 may split samples of the base layer images, which are extracted from the base layer image stream by an extractor 220, into coding units according to a tree structure of a maximum coding unit. The image data decoder 230 may perform motion compensation, based on prediction units for the inter-image prediction, on each of the coding units according to the tree structure of the samples of the base layer images, and may reconstruct the base layer images.

When the enhancement layer image stream is received, the image data decoder 230 of the video decoding apparatus 200 may split samples of the enhancement layer images, which are extracted from the enhancement layer image stream by the extractor 220, into coding units according to a tree structure of a maximum coding unit. The image data decoder 230 may perform motion compensation, based on prediction units for the inter-image prediction, on each of the coding units of the samples of the enhancement layer images, and may reconstruct the enhancement layer images.

Thus, the video decoding apparatus 200 may obtain information about at least one coding unit that generates the minimum encoding error when encoding is recursively performed for each maximum coding unit, and may use the information to decode the current picture. That is, the coding units having the tree structure determined to be the optimum coding units in each maximum coding unit may be decoded.

Accordingly, even if an image has high resolution or has an excessively large data amount, the image may be efficiently decoded and reconstructed by using a size of a coding unit and an encoding mode, which are adaptively determined according to characteristics of the image, by using information about an optimum encoding mode received from an encoder.

Figure 17:
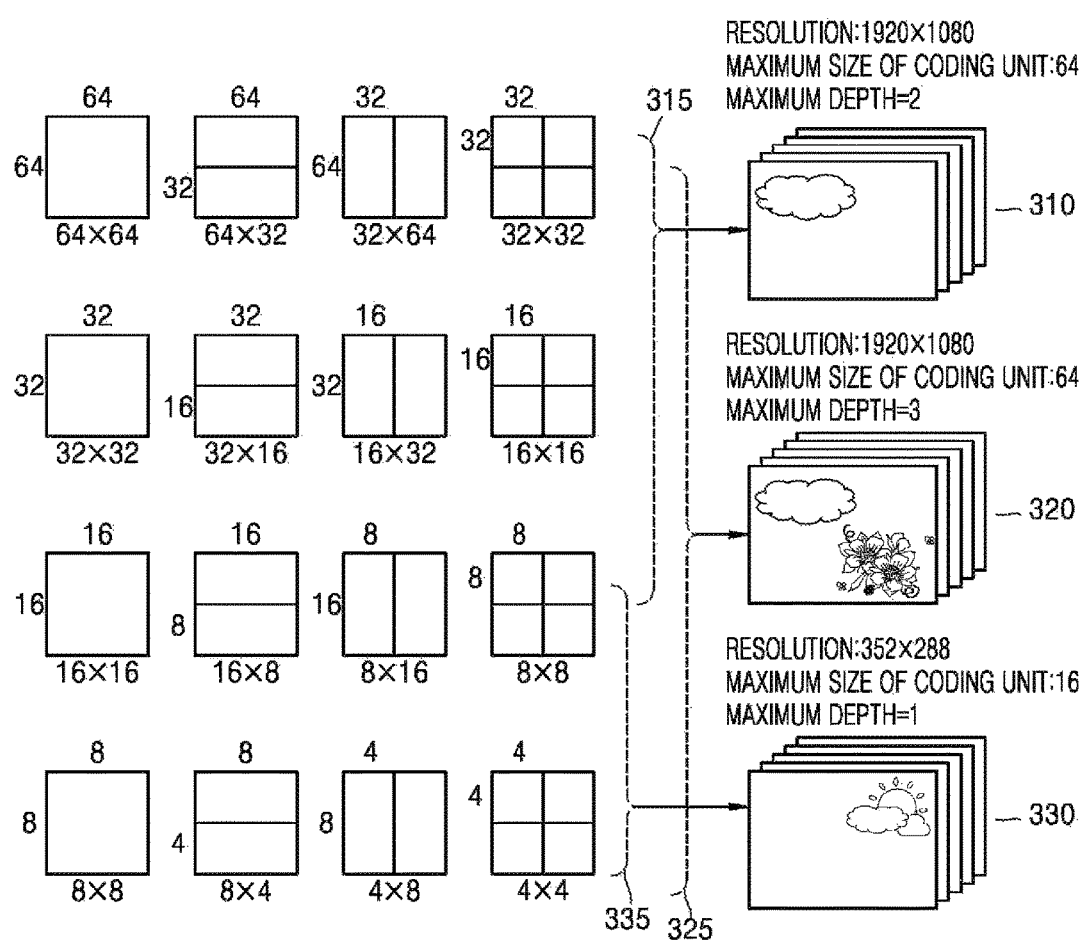
FIG. 17 is a diagram for describing a concept of coding units according to one or more exemplary embodiments.

FIG. 17 is a diagram for describing a concept of coding units according to one or more exemplary embodiments.

A size of a coding unit may be expressed by width x height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 17 denotes the total number of splits from a maximum coding unit to a minimum decoder.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are deepened to two layers by splitting the maximum coding unit twice. On the other hand, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since depths are deepened to 3 layers by splitting the maximum coding unit three times. As a depth deepens, an expression capability with respect to detailed information may be improved.

Figure 18:
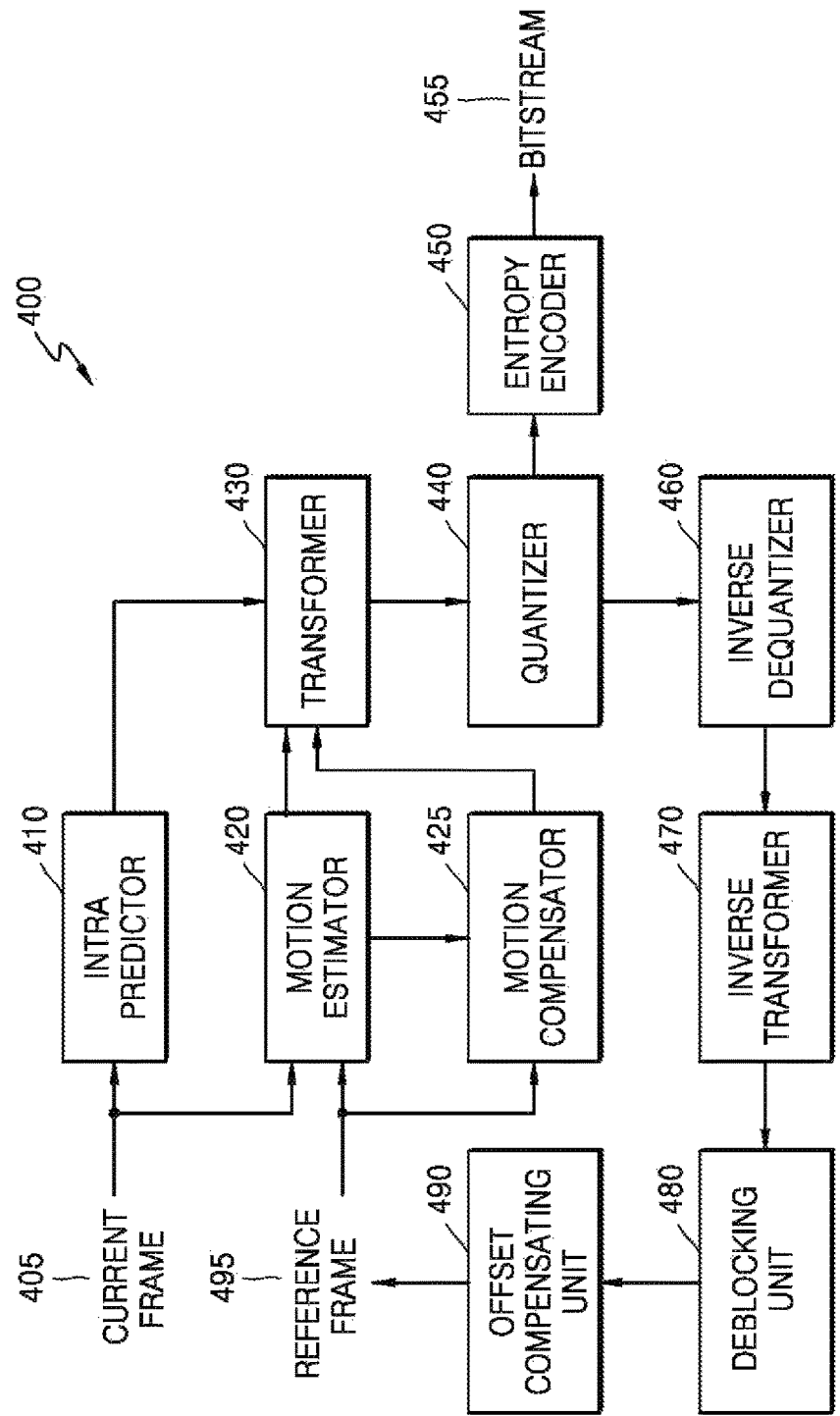
FIG. 18 is a block diagram of an image encoder based on coding units, according to one or more exemplary embodiments.

FIG. 18 is a block diagram of an image encoder 400 based on coding units, according to one or more exemplary embodiments.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 respectively perform inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is reconstructed as a residue component in a spatial domain through an inverse quantizer 460 and an inverse transformer 470, and the reconstructed residue component of the spatial domain is combined with the reference frame 495 that is a reconstructed image of the previous frame to generate a reconstructed image. The reconstructed image may be output after being post-processed through a deblocking unit 480 and an offset compensating unit 490. The output reconstructed image may be used as a reference frame 495 of a next frame. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the offset compensating unit 490 perform operations based on each coding unit among coding units having a tree structure while the maximum depth of each maximum coding unit is considered.

In particular, the intra predictor 410, the motion estimator 420, and the motion compensator 425 determine partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 19:
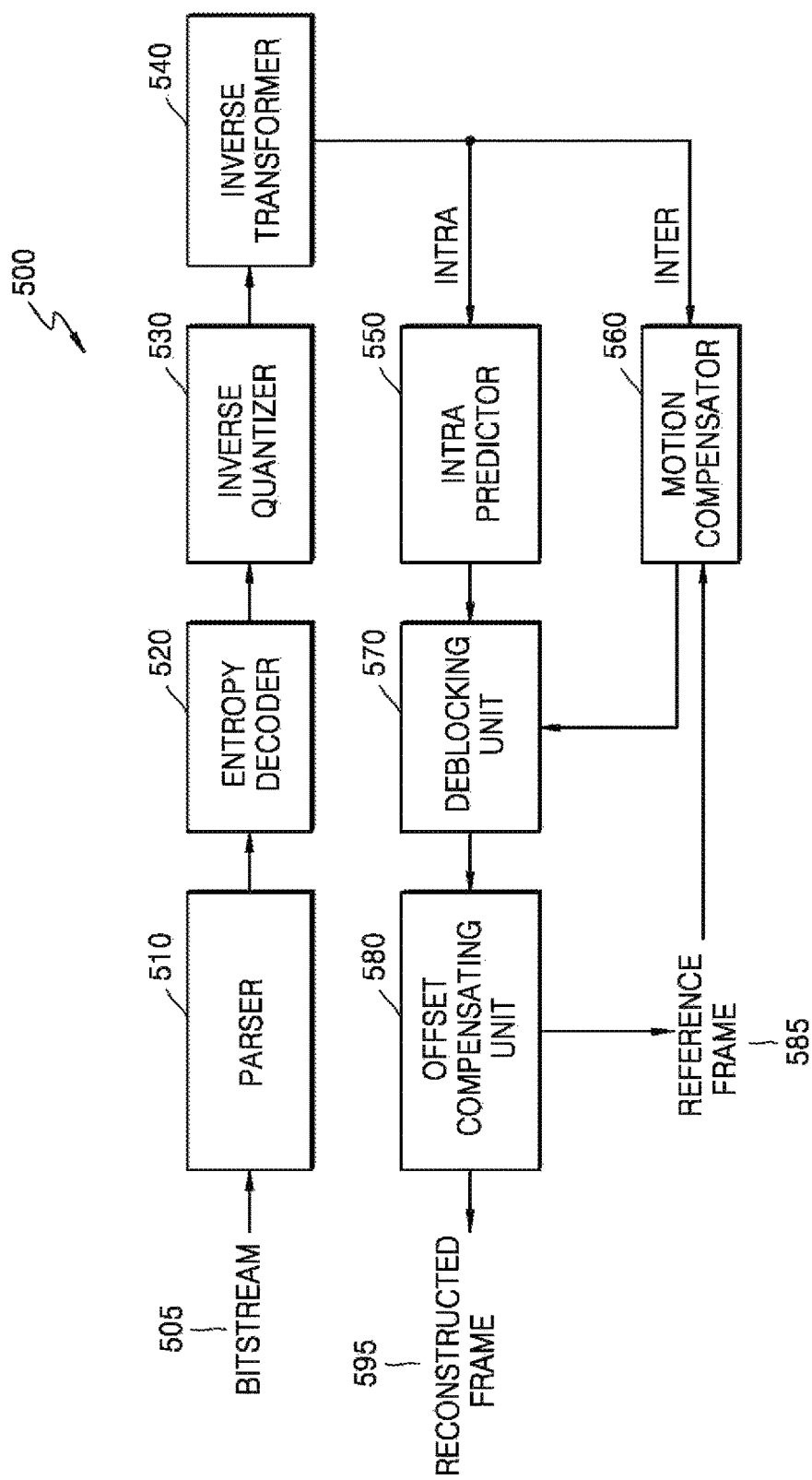
FIG. 19 is a block diagram of an image decoder based on coding units, according to one or more exemplary embodiments.

FIG. 19 is a block diagram of an image decoder 500 based on coding units, according to one or more exemplary embodiments.

A parser 510 parses encoded image data to be decoded and information about encoding required for decoding from a bitstream 505. The encoded image data is output as inverse quantized data through an entropy decoder 520 and an inverse quantizer 530, and the residue component of the spatial domain is reconstructed through an inverse transformer 540.

An intra predictor 550 performs intra prediction on coding units in an intra mode to generate the image data in the spatial domain, and a motion compensator 560 performs motion compensation on coding units in an inter mode and generates image data of the spatial domain by combining a reference frame 585 with the residue component of the spatial domain.

The image data in the spatial domain, which passed through the intra predictor 550 and the motion compensator 560, may be output as a reconstructed frame 595 after being post-processed through a deblocking unit 570 and an offset compensating unit 580. Also, the image data that is post-processed through the deblocking unit 570 and the offset compensating unit 580 may be output as the reference frame 585 for a next frame.

In order to decode the image data in the image data decoder 230 of the video decoding apparatus 200, the image decoder 500 according to the exemplary embodiment may perform operations that are performed after the parser 510.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the offset compensating unit 580 perform operations based on coding units having a tree structure for each maximum coding unit.

In particular, the intra predictor 550 and the motion compensator 560 have to determine partitions and a prediction mode for each of the coding units having a tree structure, and the inverse transformer 540 have to determine a size of a transformation unit for each coding unit.

The encoding operation of FIG. 18 and the decoding operation of FIG. 19 are described as a video stream encoding operation and a video stream decoding operation, respectively, in a single layer. Therefore, if the scalable video encoding apparatus 10 of FIG. 1 encodes a video stream having at least two layers, the base layer encoder 11 may include the image encoder 400 for each of layers. Similarly, if the scalable video decoding apparatus 20 of FIG. 2 decodes a video stream having at least two layers, the enhancement layer decoder 23 may include the image decoder 500 for each of layers.

Figure 20:
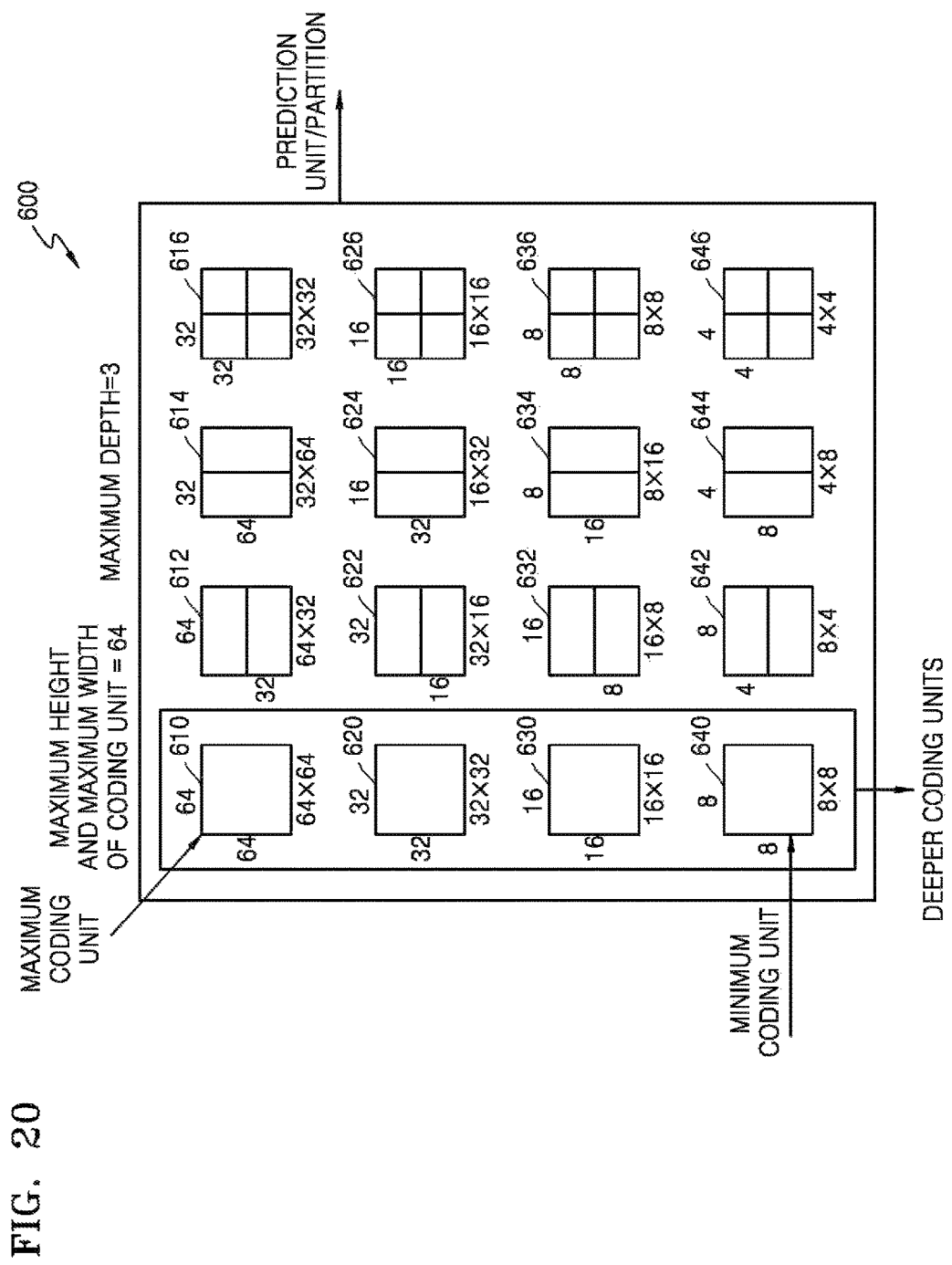
FIG. 20 is a diagram illustrating coding units according to depths, and partitions, according to one or more exemplary embodiments.

FIG. 20 is a diagram illustrating deeper coding units according to depths, and partitions, according to one or more exemplary embodiments.

The video encoding apparatus 100 and the video decoding apparatus 200 use hierarchical coding units to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 3. In this case, the maximum depth refers to a total number of times the coding unit is split from the maximum coding unit to the minimum coding unit. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having the size of 8×8 and the depth of 3 is a minimum coding unit.

The prediction unit and the partitions of a coding unit are arranged along the horizontal axis according to each depth. In other words, if the coding unit 610 having a size of 64×64 and a depth of 0 is a prediction unit, the prediction unit may be split into partitions include in the encoder 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

In order to determine the at least one coded depth of the coding units constituting the maximum coding unit 610, the coding unit determiner 120 of the video encoding apparatus 100 according to the exemplary embodiment performs encoding for coding units corresponding to each depth included in the maximum coding unit 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error that is a representative encoding error may be selected for the current depth by performing encoding for each prediction unit in the coding units corresponding to the current depth, along the horizontal axis of the hierarchical structure 600. Alternatively, the minimum encoding error may be searched for by comparing representative encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

FIG. 21 is a diagram for describing a relationship between a coding unit 710 and transformation units 720, according to one or more exemplary embodiments.

The video encoding apparatus 100 or the video decoding apparatus 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error with respect to an original image may be selected.

FIG. 22 illustrates a plurality of pieces of encoding information according to depths, according to an exemplary embodiment.

The output unit 130 of the video encoding apparatus 100 may encode and transmit partition type information 800, prediction mode information 810, and transformation unit size information 820 for each coding unit corresponding to a coded depth, as information about an encoding mode.

The partition type information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the partition type information 800 is set to indicate one of the partition 804 having a size of 2N×N, the partition 806 having a size of N×2N, and the partition 808 having a size of N×N.

The prediction mode information 810 indicates a prediction mode of each partition. For example, the prediction mode information 810 may indicate a mode of prediction encoding performed on a partition indicated by the partition type information 800, i.e., an intra mode 812, an inter mode 814, or a skip mode 816.

The transformation unit size information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 210 of the video decoding apparatus 200 may extract and use the partition type information 800, the prediction mode information 810, and the transformation unit size information 820 for decoding, according to each deeper coding unit.

Figure 23:
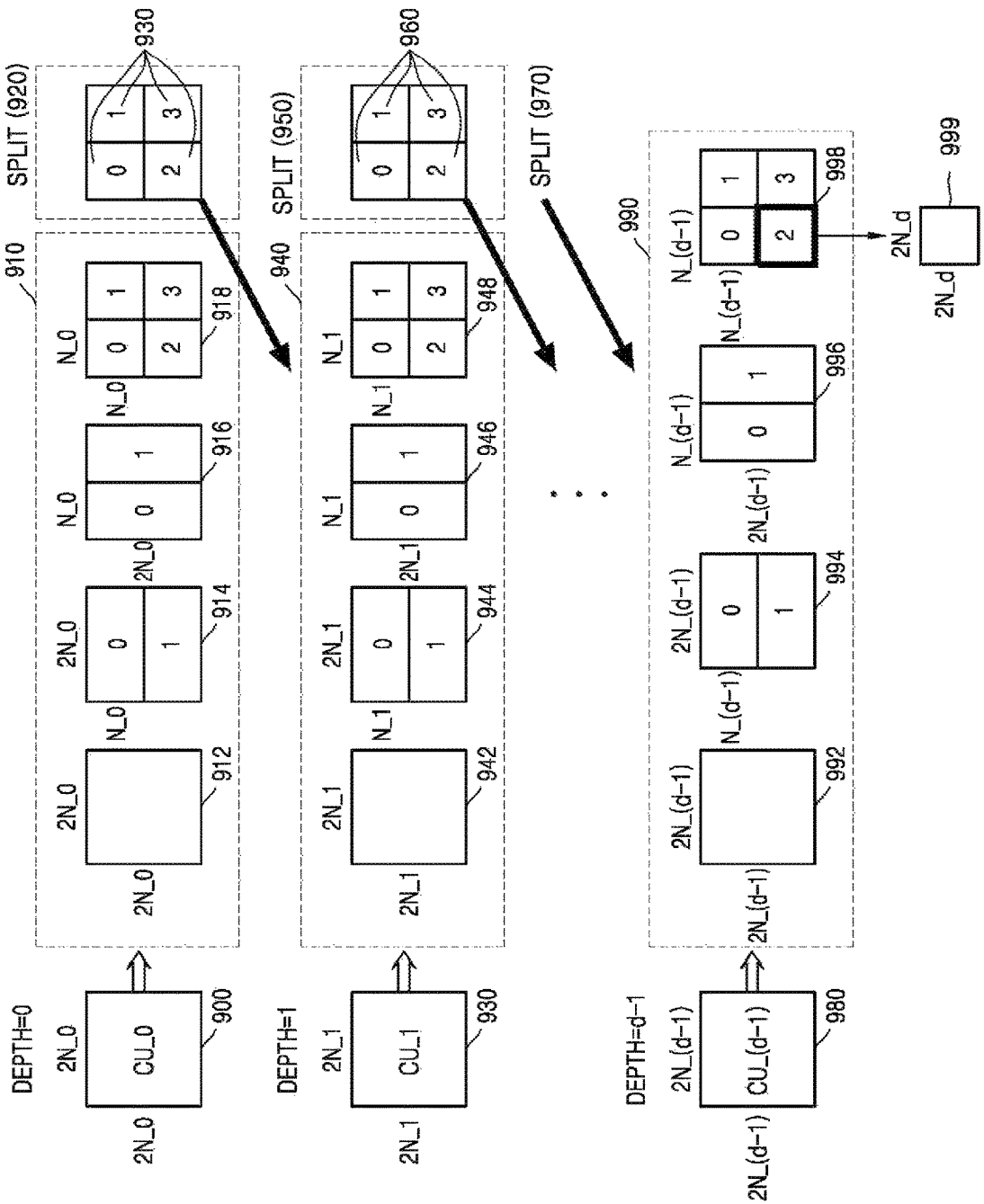
FIG. 23 is a diagram of deeper coding units according to depths, according to one or more exemplary embodiments.

FIG. 23 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 23 only illustrates the partition types 912, 914, 916, and 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition types 912, 914, and 916 having the sizes of 2N_0×2N_0, 2N_0×N_0 and N_0×2N_0, the prediction unit 910 may not be split into a lower depth.

If the encoding error is the smallest in the partition type 918 having the size of N_0×N_0, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948 having the size of N_1×N_1, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 having the size of N_(d−1)×N_(d−1) has the minimum encoding error, since a maximum depth is d, a coding unit CU_(d−1) having a depth of d−1 is no longer split into a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d, split information for the coding unit 952 having a depth of 3−1 is not set.

A data unit 999 may be a 'minimum unit' for the current maximum coding unit. A minimum unit according to the exemplary embodiment may be a square data unit obtained by splitting a minimum coding unit 980 having a lowermost coded depth by 4. By performing the encoding repeatedly, the video encoding apparatus 100 according to the present exemplary embodiment may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 0, 1, . . . , d−1, d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to '0', and split information of depths excluding the coded depth is set to '1'.

The image data and encoding information extractor 220 of the video decoding apparatus 200 according to the present exemplary embodiment may extract and use the information about the coded depth and the prediction unit of the coding unit 900 to decode the partition 912. The video decoding apparatus 200 according to the present exemplary embodiment may determine a depth, in which split information is '0', as a coded depth by using split information according to depths, and use information about an encoding mode of the corresponding depth for decoding.

Figure 24:
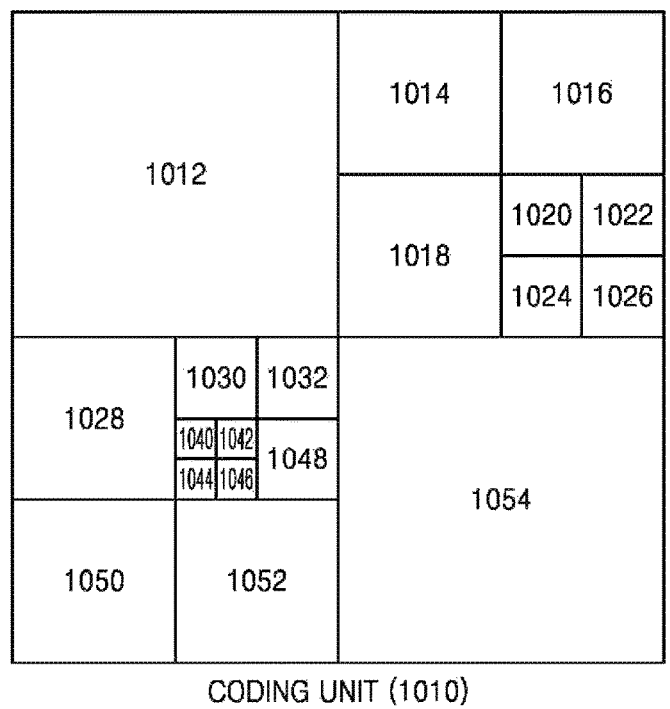
FIGS. 24 to 26 are diagrams for describing a relationship between coding units, prediction units, and transformation units, according to one or more exemplary embodiments.
Figure 25:
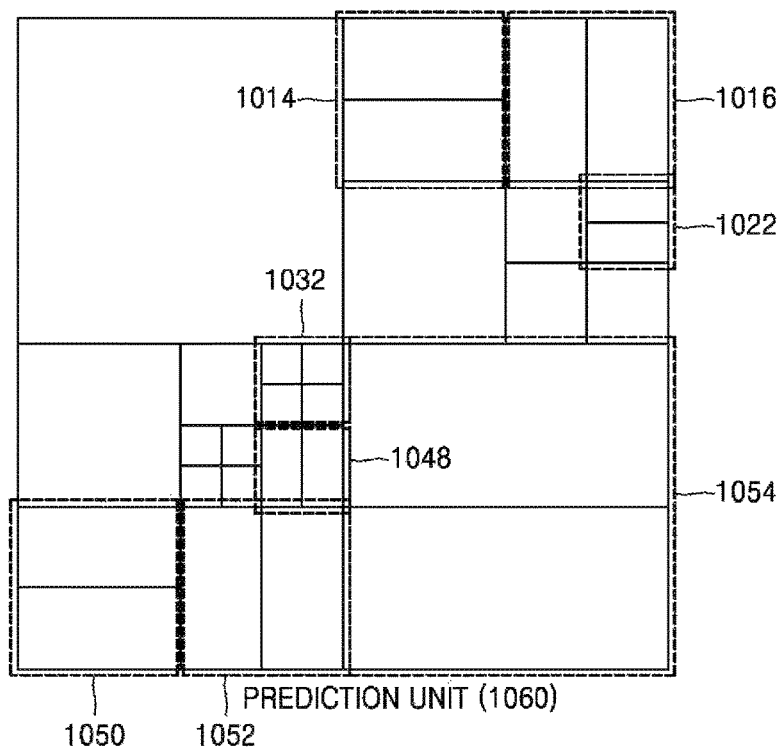
Figure 26:
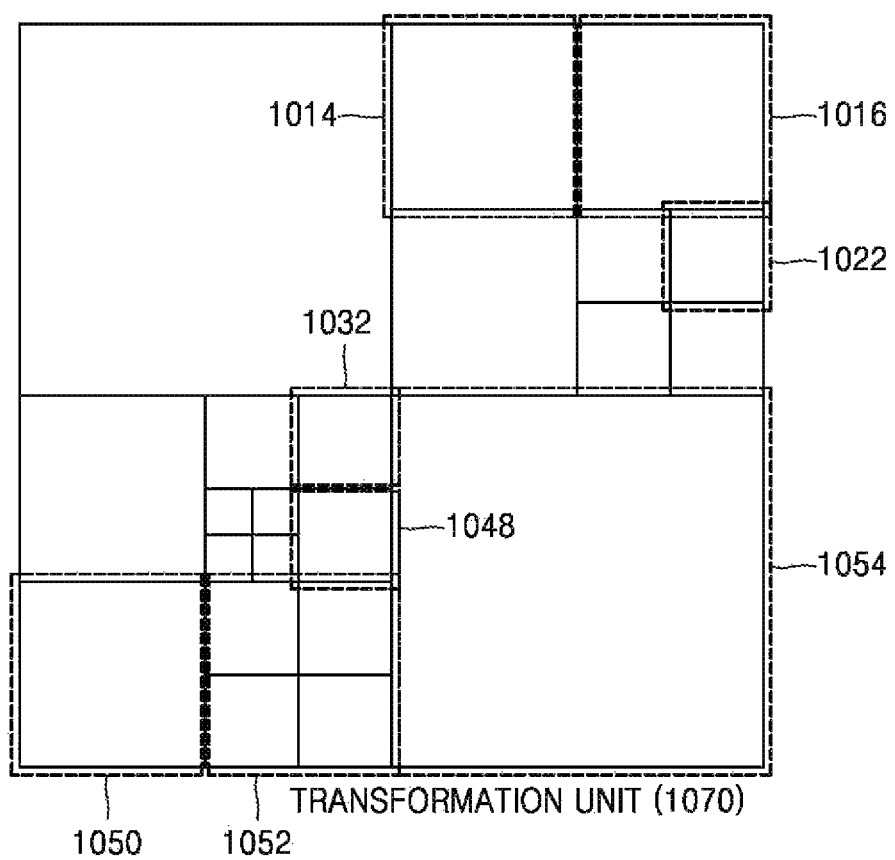

FIGS. 24, 25, and 26 are diagrams for describing a relationship between coding units, prediction units, and transformation units, according to one or more exemplary embodiments.

Coding units 1010 are deeper coding units according to depths determined by the video encoding apparatus 100, in a maximum coding unit. Prediction units 1060 are partitions of prediction units of each of the coding units 1010, and transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some partitions 1014, 1016, 1022, 1032, 1048, 1050, 1052, and 1054 are obtained by splitting the coding units. That is, partitions 1014, 1022, 1050, and 1054 are partition types of a size of 2N×N, partitions 1016, 1048, and 1052 are partition types of a size of N×2N, and a partition 1032 is a partition type of a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the transformation units 1014, 1016, 1022, 1032, 1048, 1050, and 1052 are different from those in the prediction units 1060 in terms of sizes and shapes. In other words, the video encoding apparatus 100 and the video decoding apparatus 200 according to the exemplary embodiments may perform intra prediction/motion estimation/motion compensation/and transformation/inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 below shows the encoding information that may be set by the video encoding apparatus 100 and the video decoding apparatus 200 according to the exemplary embodiments.

TABLE 1

| | Split Information 0 (Encoding on Coding Unit having Size of 2N × 2N and Current Depth of d) | | | | | Split Information 1 |
|---|---|---|---|---|---|---|
| | | Partition Type | | Size of Transformation Unit | | |
| | | | | Split Information 0 of Transformation Unit | Split Information 1 of Transformation Unit | |
| Prediction Mode | Symmetrical Partition Type | Asymmetrical Partition Type | | | | |
| Intra Inter Skip (Only 2N × 2N) | 2N × 2N 2N × N N × 2N N × N | 2N × nU 2N × nD nL × 2N nR × 2N | | 2N × 2N | N × N (Symmetrical Partition Type) N/2 × N/2 (Asymmetrical Partition Type) | Repeatedly Encode Coding Units having Lower Depth of d + 1 |

The output unit 130 of the video encoding apparatus 100 according to the exemplary embodiment may output the encoding information about the coding units having a tree structure, and the image data and encoding information extractor 220 of the video decoding apparatus 200 according to the exemplary embodiment may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1.

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure according to the exemplary embodiment may be assigned to at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

In another exemplary embodiment, if a current coding unit is predicted based on encoding information of adjacent data units, data units adjacent to the current coding unit are searched using encoded information of the adjacent deeper coding units, and the searched adjacent coding units may be referred for predicting the current coding unit in the deeper coding units.

Figure 27:
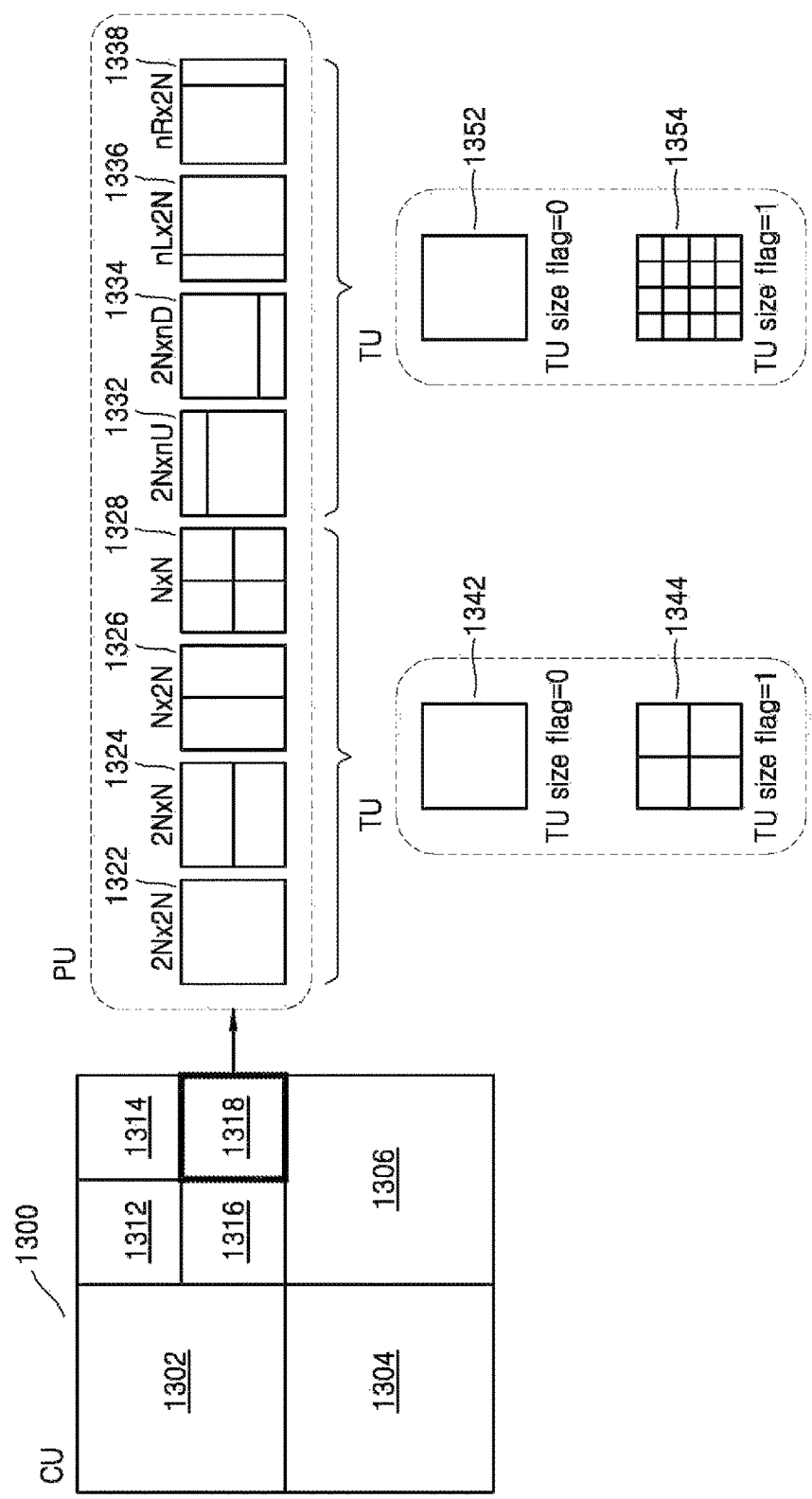
FIG. 27 is a diagram for describing a relationship between a coding unit, a prediction unit, and a transformation unit, according to encoding information of Table 1.

FIG. 27 is a diagram for describing a relationship between a coding unit, a prediction unit, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of partition types including 2N×2N 1322, 2N×N 1324, N×2N 1326, N×N 1328, 2N×nU 1332, 2N×nD 1334, nL×2N 1336, and nR×2N 1338.

Transformation unit split information (TU size flag) is a type of a transformation index. A size of a transformation unit corresponding to the transformation index may be changed according to a prediction unit type or partition type of the coding unit.

For example, when the information about the partition type is set to be one of symmetrical partition types 2N×2N 1322, 2N×N 1324, N×2N 1326, and N×N 1328, if the transformation unit split information is 0, a transformation unit 1342 having a size of 2N×2N is set, and if the transformation unit split information is 1, a transformation unit 1344 having a size of N×N is set.

When the information about the partition type is set to be one of asymmetrical partition types 2N×nU 1332, 2N×nD 1334, nL×2N 1336, and nR×2N 1338, if the transformation unit split information is 0, a transformation unit 1352 having a size of 2N×2N may be set, and if the transformation unit split information is 1, a transformation unit 1354 having a size of N/2×N/2 may be set.

As described above with reference to FIG. 27, the transformation unit split information (TU size flag) is a flag having a value or 0 or 1, but the transformation unit split information is not limited to a flag having 1 bit, and the transformation unit may be hierarchically split while the transformation unit split information increases in a manner of 0, 1, 2, 3 . . . etc., according to setting. The transformation unit split information may be an example of the transformation index.

In this case, the size of a transformation unit that has been actually used may be expressed by using the transformation unit split information according to the exemplary embodiment, together with a maximum size of the transformation unit and a minimum size of the transformation unit. The video encoding apparatus 100 according to the exemplary embodiment is capable of encoding maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 200 according to the exemplary embodiment may decode video by using the maximum transformation unit size information, the minimum transformation unit size information, and the maximum transformation unit split information.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Expression (1):

$$\text{CurrMinTuSize} = \max(\text{MinTransformSize}, \text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. That is, in Equation (1), 'RootTuSize/($2^{\text{MaxTransformSizeIndex}}$)' denotes a transformation unit size when the transformation unit size 'RootTuSize', when the TU size flag is 0, is split by the number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (2) below. In Expression (2), 'MaxTransformSize' denotes a maximum transformation unit size, and 'PUSize' denotes a current prediction unit size.

$$RootTuSize=\min(MaxTransformSize,PUSize) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Expression (3) below. In Expression (3), 'PartitionSize' denotes the size of the current partition unit.

$$RootTuSize=\min(MaxTransformSize,PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an exemplary embodiment, and a factor for determining the current maximum transformation unit size is not limited thereto.

According to the video encoding method based on coding units of a tree structure described above with reference to FIGS. 15 to 27, image data in a spatial domain is encoded in each of the coding units of the tree structure, and the image data in the spatial domain is reconstructed in a manner that decoding is performed on each maximum coding unit according to the video decoding method based on the coding units of the tree structure, so that a video that is formed of pictures and picture sequences may be reconstructed. The reconstructed video may be reproduced by a reproducing apparatus, may be stored in a storage medium, or may be transmitted via a network.

The one or more exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

For convenience of description, the scalable video encoding methods and/or the video encoding method, which are described with reference to FIGS. 1 to 27, will be collectively referred to as 'the video encoding method'. Also, the scalable video decoding methods and/or the video decoding method, which are described with reference to FIGS. 1 to 27, will be collectively referred to as 'the video decoding method'.

Also, a video encoding apparatus including the scalable video encoding apparatus 10, the video encoding apparatus 100, or the image encoder 400, which is described with reference to FIGS. 1 to 27, will be collectively referred as a 'video encoding apparatus'. Also, a video decoding apparatus including the scalable video decoding apparatus 20, the video decoding apparatus 200, or the image decoder 500, which is described with reference to FIGS. 1 to 27, will be referred to as a 'video decoding apparatus'.

A computer-readable recording medium storing a program, e.g., a disc 26000, according to an exemplary embodiment will now be described in detail.

Figure 28:
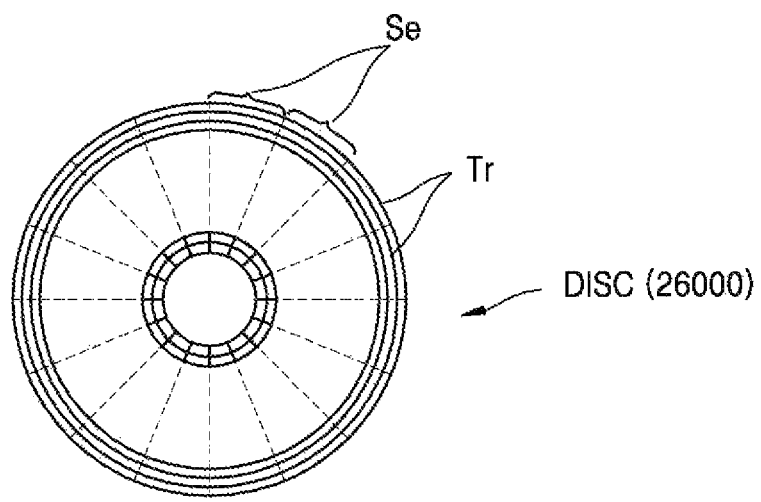
FIG. 28 is a diagram of a physical structure of a disc in which a program is stored, according to one or more exemplary embodiments.

FIG. 28 is a diagram of a physical structure of the disc 26000 in which a program is stored, according to one or more exemplary embodiments. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantized parameter determining method, the video encoding method, and the video decoding method described above may be assigned and stored.

A computer system embodied using a storage medium that stores a program for executing the video encoding method and the video decoding method as described above will now be described with reference to FIG. 29.

Figure 29:
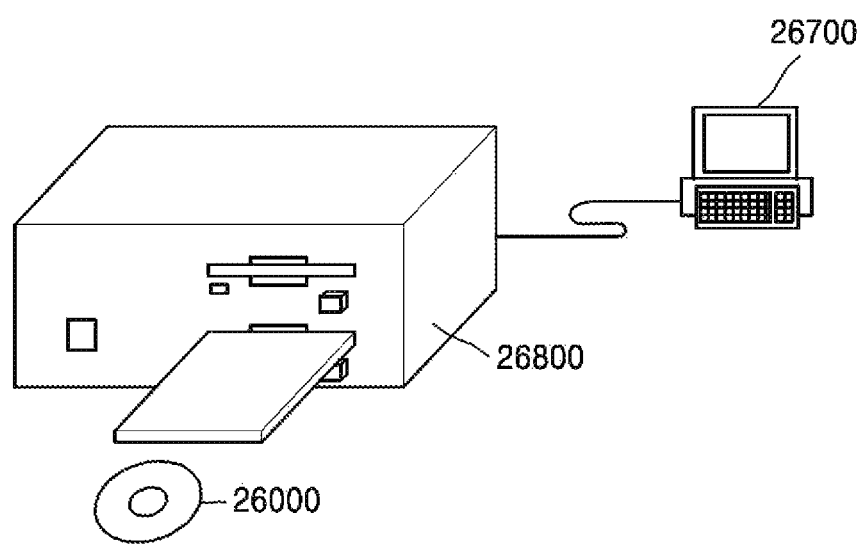
FIG. 29 is a diagram of a disc drive for recording and reading a program by using a disc.

FIG. 29 is a diagram of a disc drive 26800 for recording and reading a program by using the disc 26000. A computer system 26700 may store a program that executes at least one of a video encoding method and a video decoding method according to an exemplary embodiment, in the disc 26000 via the disc drive 26800. To run the program stored in the disc 26000 in the computer system 26700, the program may be read from the disc 26000 and be transmitted to the computer system 26700 by using the disc drive 26800.

The program that executes at least one of a video encoding method and a video decoding method according to an exemplary embodiment may be stored not only in the disc 26000 illustrated in FIGS. 28 and 29 but also may be stored in a memory card, a ROM cassette, or a solid state drive (SSD).

A system to which the video encoding method and the video decoding method described above are applied will be described below.

Figure 30:
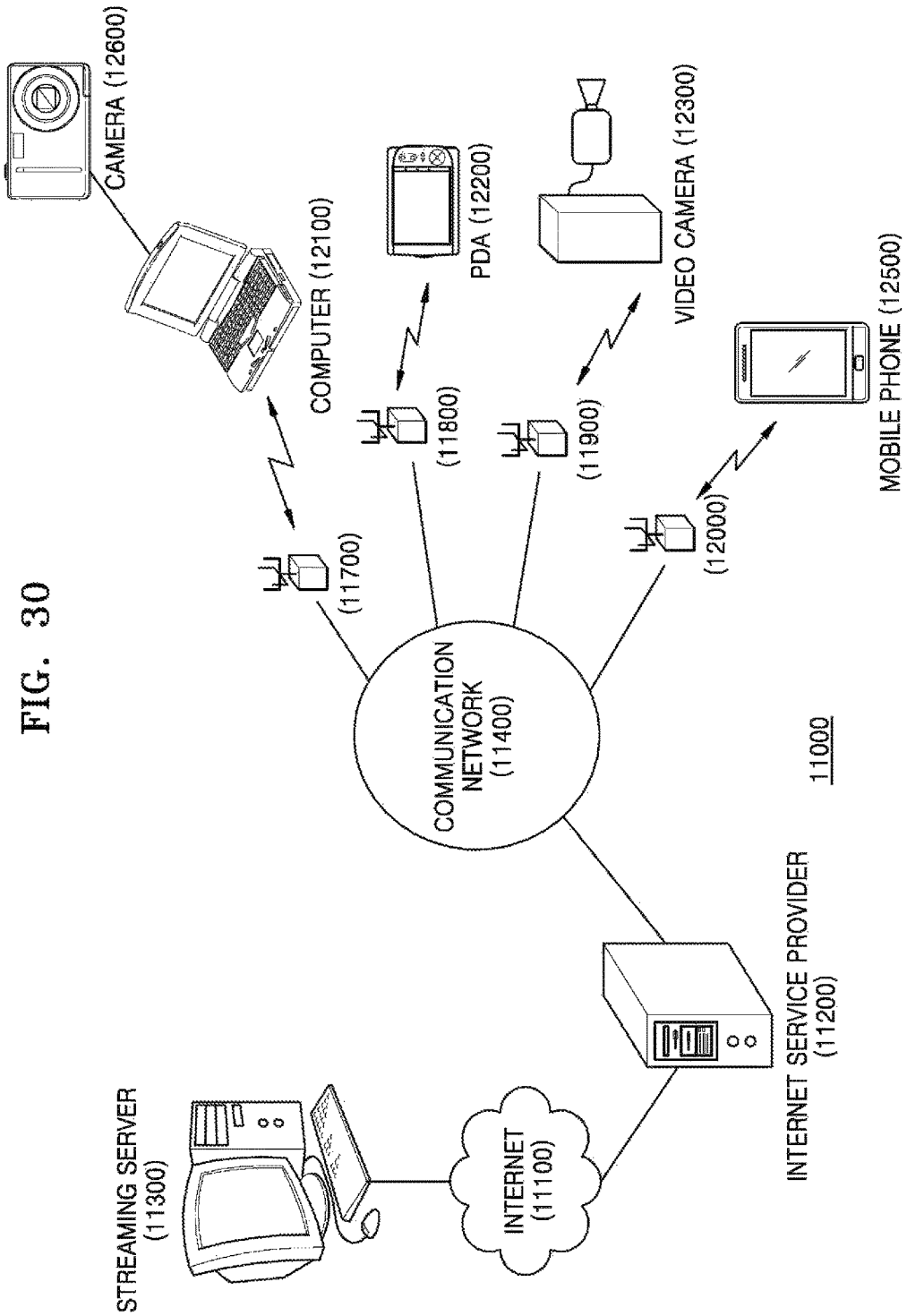
FIG. 30 is a diagram of an overall structure of a content supply system for providing a content distribution service.

FIG. 30 is a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as illustrated in FIG. 30, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

A video encoding apparatus and a video decoding apparatus according to exemplary embodiments may be applied to encoding and decoding operations of the plurality of independent devices included in the content supply system 11000.

Figure 31:
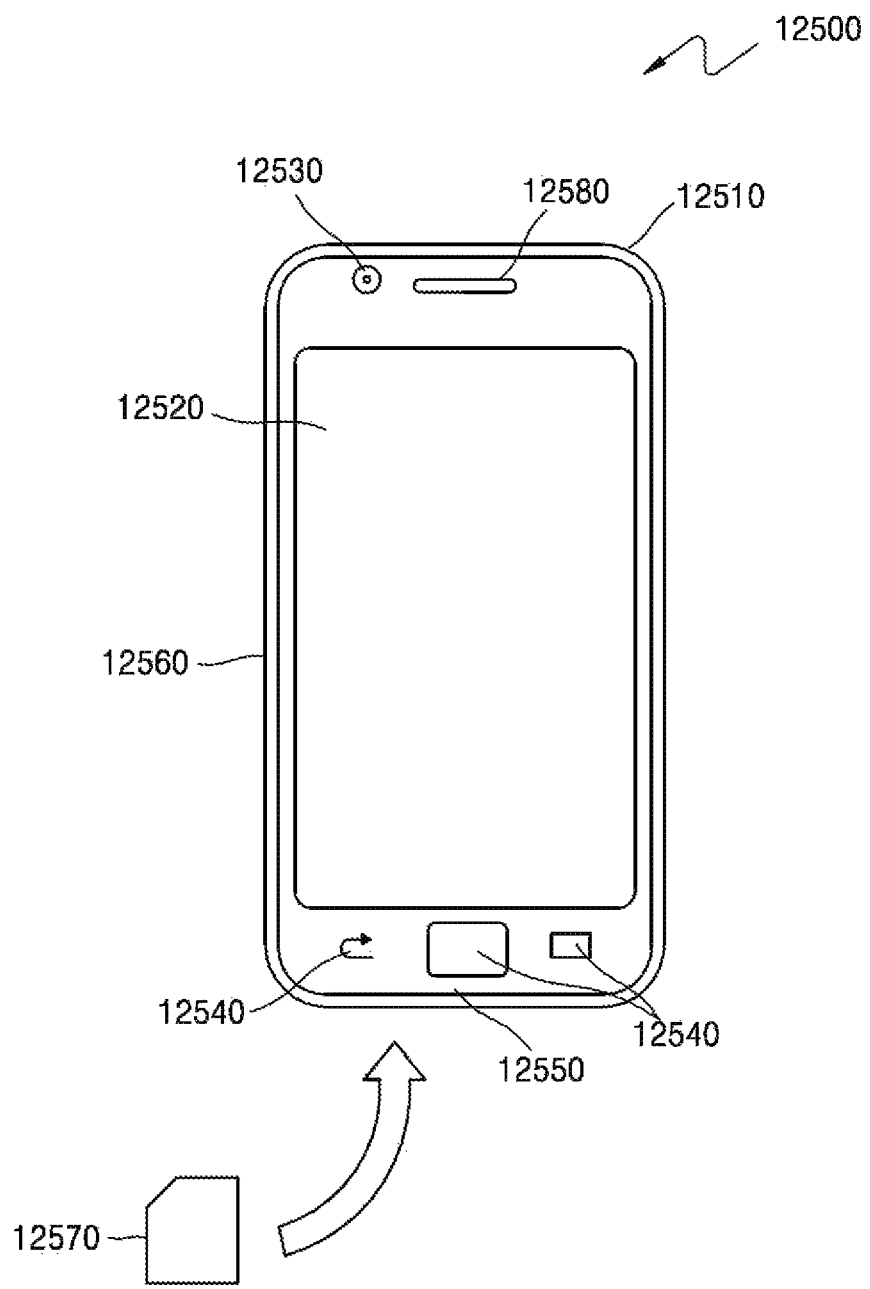
FIGS. 31 and 32 are diagrams respectively of an external structure and an internal structure of a mobile phone to which a video encoding method and a video decoding method according to one or more exemplary embodiments are applied.
Figure 32:
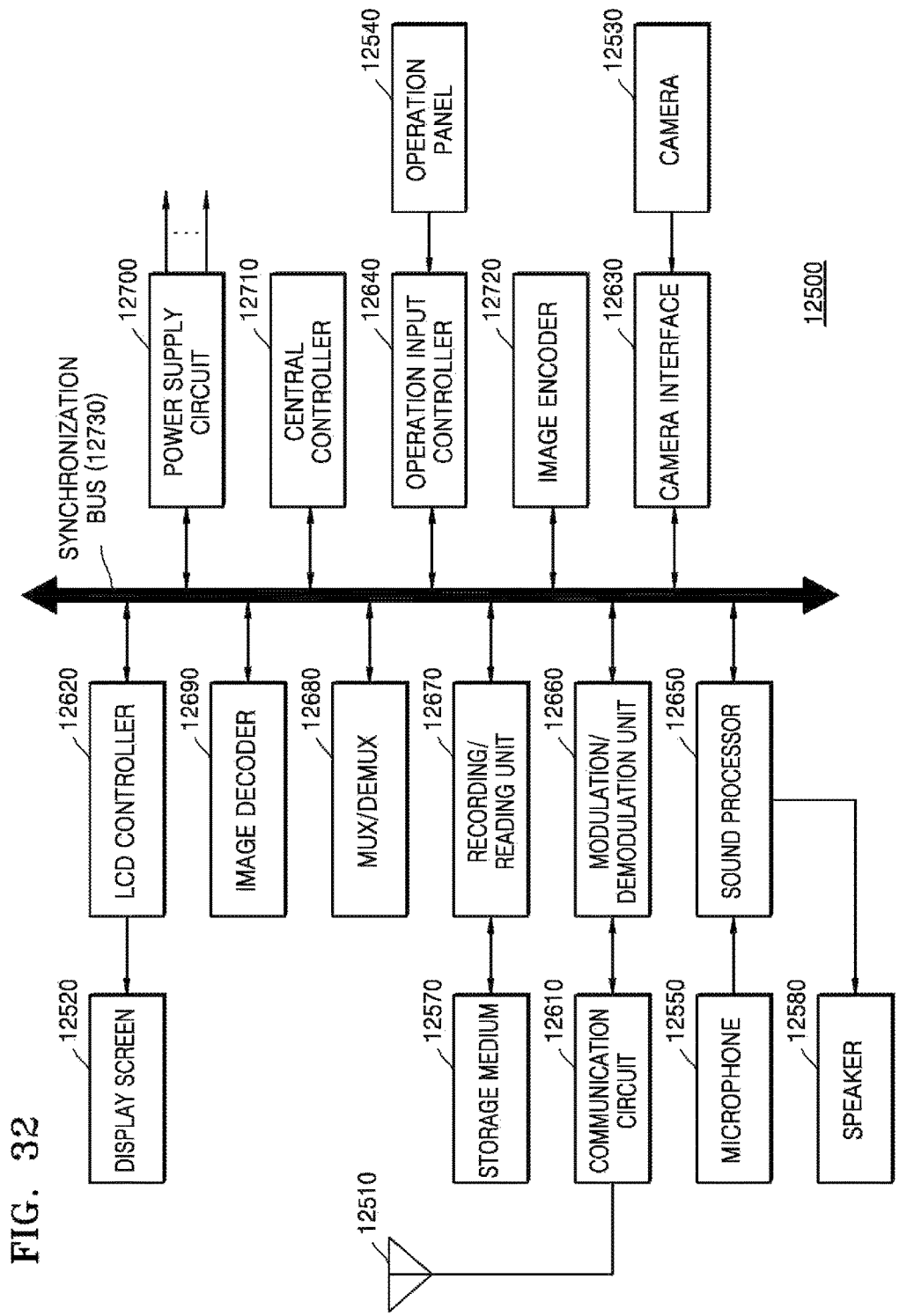

With reference to FIGS. 31 and 32, the mobile phone 12500 included in the content supply system 11000 according to one or more exemplary embodiments will now be described in detail.

FIG. 31 illustrates an external structure of the mobile phone 12500 to which a video encoding method and a video decoding method are applied, according to one or more exemplary embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of a sound output unit, and a microphone 12550 for inputting voice and sound or another type of a sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

FIG. 32 illustrates an internal structure of the mobile phone 12500. In order to systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 to an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulation/demodulation unit 12660 by control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, by control of the central controller 12710. The digital sound signal may be transformed into a transformation signal via the modulation/demodulation unit 12660 and the communication circuit 12610, and may be transmitted via the antenna 12510.

When a text message, e.g., email, is transmitted during a data communication mode, text data of the text message is input via the operation panel 12540 and is transmitted to the central controller 12610 via the operation input controller 12640. By control of the central controller 12610, the text data is transformed into a transmission signal via the modulation/demodulation unit 12660 and the communication circuit 12610 and is transmitted to the wireless base station 12000 via the antenna 12510.

In order to transmit image data during the data communication mode, image data captured by the camera 12530 is provided to the image encoder 12720 via the camera interface 12630. The image data captured by the camera 12530 may be directly displayed on the display screen 12520 via the camera interface 12630 and the LCD controller 12620.

A structure of the image encoder 12720 may correspond to that of the video encoding apparatus 100 described above. The image encoder 12720 may transform the image data received from the camera 12530 into compressed and encoded image data according to the aforementioned video encoding method, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulation/demodulation unit 12660 modulates a frequency band of the digital signal. The frequency-band modulated digital signal is transmitted to the video decoder 12690, the sound processor 12650, or the LCD controller 12620, according to the type of the digital signal.

During the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, by control of the central controller 12710.

When during the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoder 12690 and the sound processor 12650, respectively.

A structure of the image decoder 12690 may correspond to that of the video decoding apparatus described above. The image decoder 12690 may decode the encoded video data to obtain reconstructed video data and provide the reconstructed video data to the display screen 12520 via the LCD controller 12620, by using the aforementioned video decoding method according to the exemplary embodiment.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to an exemplary embodiment, may be a transmitting terminal including only the video encoding apparatus, or may be a receiving terminal including only the video decoding apparatus.

Figure 33:
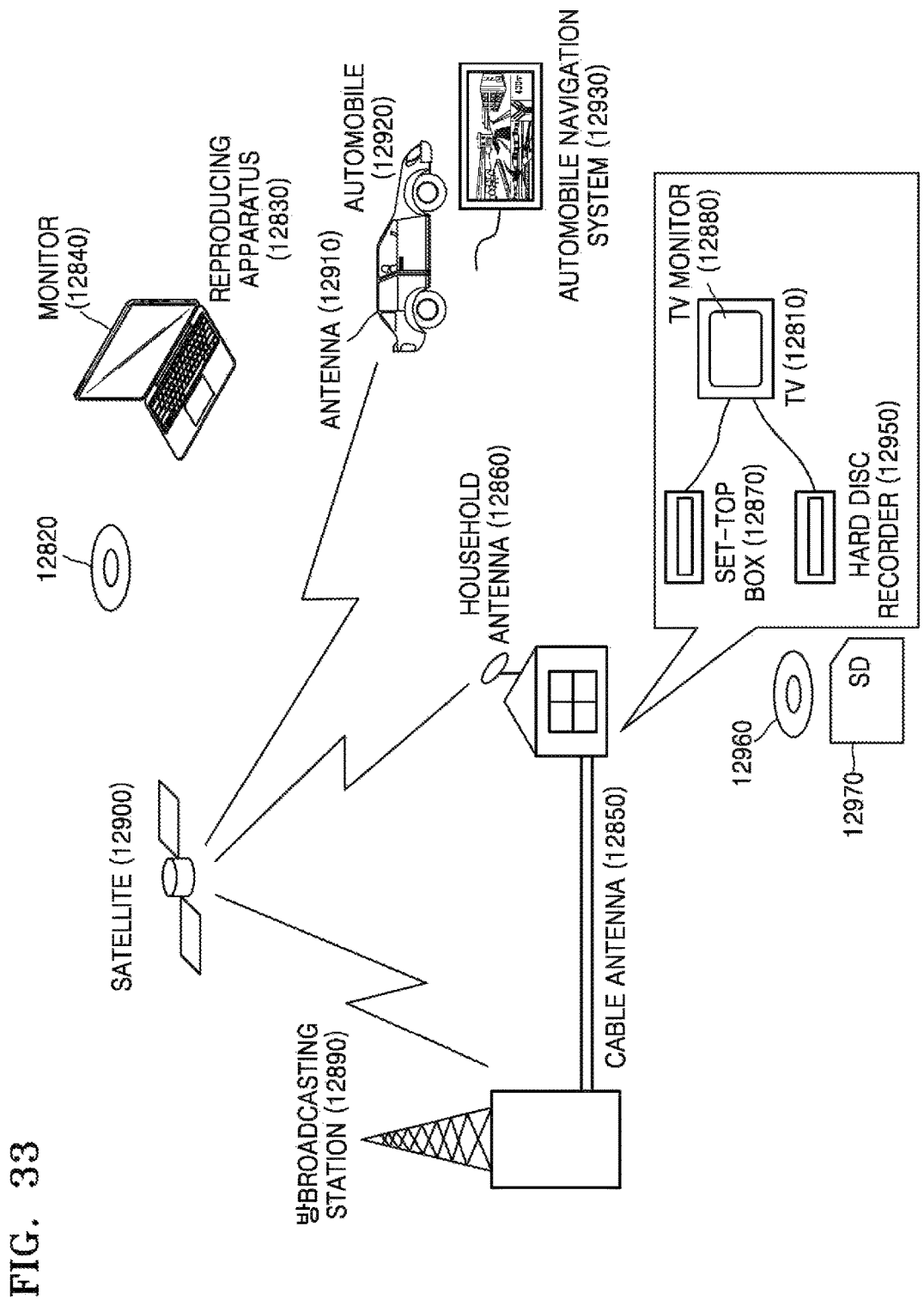
FIG. 33 is a diagram of a digital broadcast system to which a communication system is applied.

A communication system according to an exemplary embodiment is not limited to the communication system described above with reference to FIG. 31. For example, FIG. 33 illustrates a digital broadcasting system employing a communication system, according to an exemplary embodiment. The digital broadcasting system of FIG. 33 may receive a digital broadcast transmitted via a satellite or a terrestrial network by using the video encoding apparatus and the video decoding apparatus according to the exemplary embodiments.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus according to the exemplary embodiment is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus according to the exemplary embodiment may be installed. Data output from the set-top box 12870 may also be reproduced on a TV monitor 12880.

As another example, the video decoding apparatus according to the exemplary embodiment may be installed in the TV receiver 12810 instead of the set-top box 12870.

An automobile 12920 that has an appropriate antenna 12910 may receive a signal transmitted from the satellite 12900 or the wireless base station 11700. A decoded video may be reproduced on a display screen of an automobile navigation system 12930 installed in the automobile 12920.

A video signal may be encoded by the video encoding apparatus according to the exemplary embodiment and may then be stored in a storage medium. In more detail, an image signal may be stored in a DVD disc 12960 by a DVD recorder or may be stored in a hard disc by a hard disc recorder 12950. As another example, the video signal may be stored in an SD card 12970. If the hard disc recorder 12950 includes the video decoding apparatus according to the exemplary embodiment, a video signal recorded on the DVD disc 12960, the SD card 12970, or another storage medium may be reproduced on the TV monitor 12880.

The automobile navigation system 12930 may not include the camera 12530, the camera interface 12630, and the image encoder 12720 of FIG. 32. For example, the computer 12100 and the TV receiver 12810 may not include the camera 12530, the camera interface 12630, and the image encoder 12720 of FIG. 32.

Figure 34:
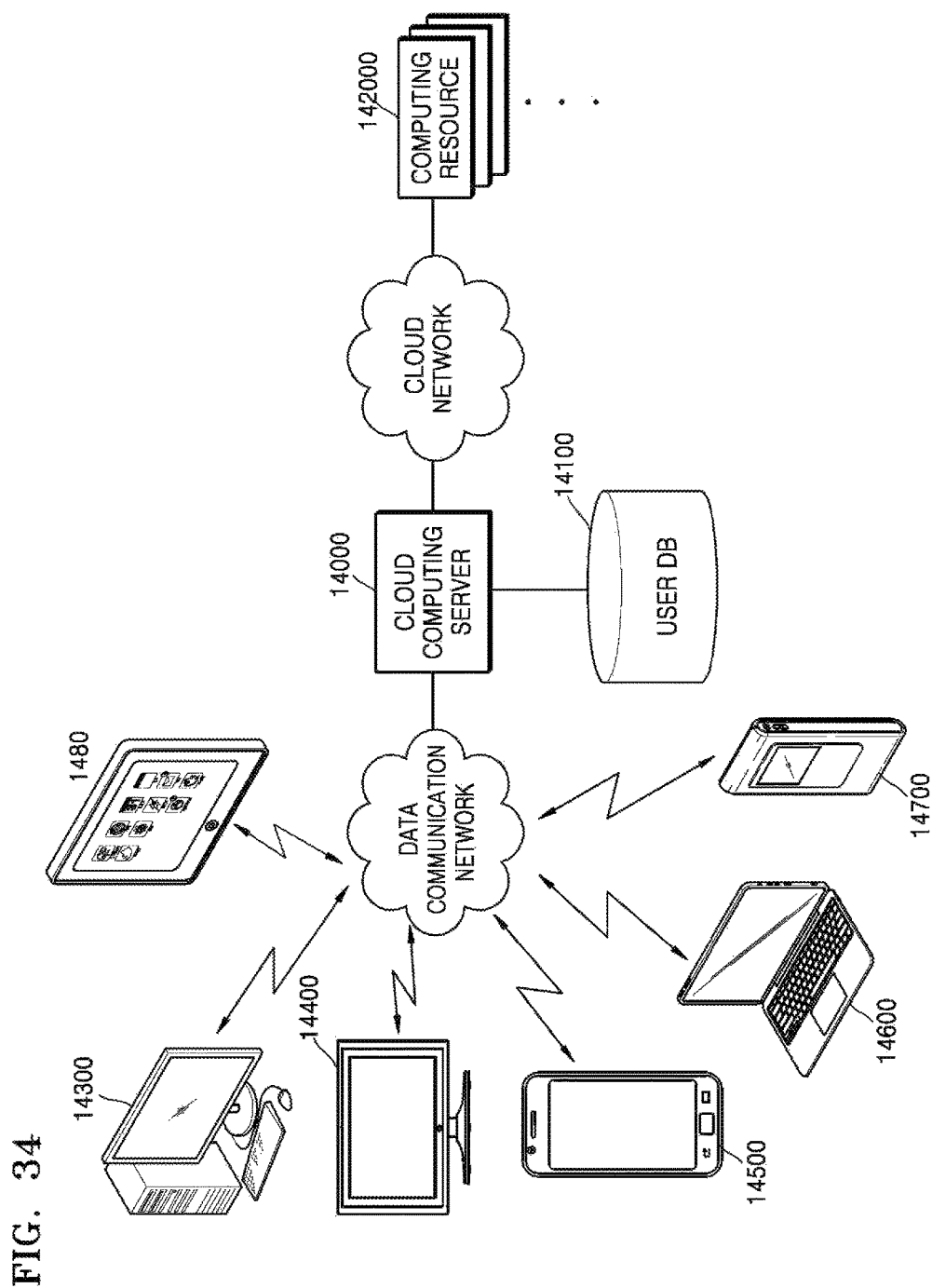
FIG. 34 is a diagram illustrating a network structure of a cloud computing system using a video encoding apparatus and a video decoding apparatus according to one or more exemplary embodiments.

FIG. 34 is a diagram illustrating a network structure of a cloud computing system using a video encoding apparatus and a video decoding apparatus, according to an exemplary embodiment.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security software, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing video by decoding the video data stream is similar to an operation of the mobile phone 12500 described above with reference to FIG. 32.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include the video decoding apparatus as described above with reference to FIGS. 1 to 8, 9A, 9B, 10A, 10B, 11A, 11B, and 12 to 27. In another example, the user terminal may include the video encoding apparatus as described above with reference to FIGS. 1 to 27. Alternatively, the user terminal may include both the video decoding apparatus and the video encoding apparatus as described above with reference to FIGS. 1 to 8, 9A, 9B, 10A, 10B, 11A, 11B, and 12 to 27.

Various applications of the video encoding method, the video decoding method, the video encoding apparatus, and the video decoding apparatus according to the exemplary embodiments described above with reference to FIGS. 1 to 8, 9A, 9B, 10A, 10B, 11A, 11B, and 12 to 27 are described above with reference to FIGS. 28 to 34. However, methods of storing the video encoding method and the video decoding method in a storage medium or methods of implementing the video encoding apparatus and the video decoding apparatus in a device described above with reference to FIGS. 1 to 8, 9A, 9B, 10A, 10B, 11A, 11B, and 12 to 27 are not limited to the exemplary embodiments described above with reference to FIGS. 28 to 34.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

The invention claimed is:

1. A scalable video decoding method comprising:
   generating reconstructed base layer images from a base layer image stream;
   obtaining, from an enhancement layer image stream, an inter-layer de-noise filtering parameter that indicates whether to perform a de-noise filtering on a reconstructed base layer image to perform an inter-layer prediction of a current enhancement layer image, based on a quantization parameter for a current block of the current enhancement layer image and a quantization parameter of a reference block of the reconstructed base layer image;
   in response to the de-noise filtering being performed on the reconstructed base layer image based on the inter-layer de-noise filtering parameter, determining a reference picture list including a de-noise reconstructed base layer image that corresponds to a current enhancement layer image; and
reconstructing the current enhancement layer image based on a reference image that is included on the reference picture list.

2. The scalable video decoding method of claim 1, wherein the obtaining the inter-layer de-noise filtering parameter comprises determining whether the inter-layer de-noise filtering parameter is obtained from each of blocks in the current enhancement layer image or from a syntax associated with at least one data unit selected from a picture, a slice segment, a maximum coding unit, a coding unit, and a prediction unit.

3. The scalable video decoding method of claim 1, wherein the determining whether the inter-layer de-noise filtering parameter is obtained comprises obtaining the inter-layer de-noise filtering parameter from the enhancement layer image stream in response to a resolution of the enhancement layer image being equal to a resolution of the reconstructed base layer image.

4. The scalable video decoding method of claim 1, wherein the obtaining the inter-layer de-noise filtering parameter comprises obtaining the inter-layer de-noise filtering parameter from the enhancement layer image stream in response to a difference between the quantization parameter for the current block of the current enhancement layer image and the quantization parameter of the reference block of the reconstructed base layer image being greater than a predetermined threshold value.

5. The scalable video decoding method of claim 1, wherein the de-noise filtering is performed based on a 4-bit accuracy filter having filter coefficients of $\{0, -4, 12, 48, 12, -4, 0, 0\}/64$ or $\{0, -1, 3, 12, 3, -1, 0, 0\}/16$.

6. A scalable video encoding method comprising:
in response to a de-noise filtering being performed on a reconstructed base layer image based on a quantization parameter for a current block of a current enhancement layer image and a quantization parameter of a reference block of the reconstructed base layer image, determining a reference picture list including a de-noise reconstructed base layer image that corresponds to a current enhancement layer image;
performing an inter-layer prediction on the current enhancement layer image based on a reference image included on the reference picture list; and
generating an enhancement layer image stream including encoding symbols that are generated via the inter-layer prediction and an inter-layer de-noise filtering parameter that indicates whether to perform the de-noise filtering on the reconstructed base layer image to perform an inter-layer prediction of the current enhancement layer image.

7. The scalable video encoding method of claim 6, wherein the inter-layer de-noise filtering parameter is included in a syntax associated with at least one data unit selected from a picture, a slice segment, a maximum coding unit, a coding unit, and a prediction unit.

8. The scalable video encoding method of claim 7, wherein the determining whether to perform the de-noise filtering comprises performing the de-noise filtering on the reconstructed base layer image in response to a resolution of an enhancement layer image being equal to a resolution of the reconstructed base layer image.

9. The scalable video encoding method of claim 7, wherein the determining whether to perform the de-noise filtering comprises performing the de-noise filtering on the reconstructed base layer image in response to a difference between the quantization parameter for the current block of the current enhancement layer image and the quantization parameter of the reference block of the reconstructed base layer image being greater than a predetermined threshold value.

10. A scalable video decoding apparatus comprising:
a base layer decoder configured to generate reconstructed base layer images from a base layer image stream; and
an enhancement layer decoder configured to obtain, from an enhancement layer image stream, an inter-layer de-noise filtering parameter that indicates whether to perform a de-noise filtering on a reconstructed base layer image to perform an inter-layer prediction of a current enhancement layer image, based on a quantization parameter for a current block of the current enhancement layer image and a quantization parameter of a reference block of the reconstructed base layer image, determine a reference picture list including de-noise reconstructed base layer image that corresponds to a current enhancement layer image in response to the de-noise filtering being performed on the reconstructed base layer image based on the inter-layer de-noise filtering parameter, and reconstruct the current enhancement layer image based on a reference image included on the reference picture list.

11. A scalable video encoding apparatus comprising:
a base layer encoder configured to generate a reconstructed base layer image corresponding to a current enhancement layer image; and
an enhancement layer encoder configured to determine a reference picture list including a de-noise reconstructed base layer image that corresponds to the current enhancement layer image in response to a de-noise filtering being performed on a reconstructed base layer image based on a quantization parameter for a current block of the current enhancement layer image and a quantization parameter of a reference block of the reconstructed base layer image, determine a reference picture list including at least one of the reconstructed base layer image and a de-noise reconstructed base layer image, and generate an enhancement layer image stream including encoding symbols and an inter-layer de-noise filtering parameter that indicates whether to perform the de-noise filtering on the reconstructed base layer image to perform an inter-layer prediction of the current enhancement layer image, the encoding symbols being generated via an inter-layer prediction performed on the current enhancement layer image based on a reference image that is included on the reference picture list.

12. A non-transitory computer readable storage medium storing a program executable by a computer to perform the scalable video decoding method of claim 1.

13. A non-transitory computer readable storage medium storing a program executable by a computer to perform the scalable video encoding method of claim 6.

14. A scalable video decoding method comprising:
generating from a base layer image stream a reconstructed base layer image that corresponds to a current enhancement layer image;
upsampling the reconstructed base layer image in response to a resolution of the reconstructed base layer image being different from a resolution of the enhancement layer image;
applying a de-noise filter to the reconstructed base layer image in response to the resolution of the reconstructed base layer image being equal to the resolution of an enhancement layer image and in response to a difference between the quantization parameter for the current block of the current enhancement layer image and the quantization parameter of the reference block of the reconstructed base layer image being greater than a predetermined threshold value; and reconstructing the current enhancement layer image based on a reference image that corresponds to the upsampled base layer image or the de-noise filtered base layer image.

15. The scalable video decoding method of claim 14, further comprising applying an interpolation filter to the reconstructed base layer image based on an interpolation location of each sub-pet unit of the reconstructed base layer image.

* * * * *